(12) United States Patent
Chong et al.

(10) Patent No.: US 11,824,410 B1
(45) Date of Patent: Nov. 21, 2023

(54) ELECTRICAL MACHINES FOR AIRCRAFT POWER AND PROPULSION SYSTEMS

(71) Applicant: Rolls-Royce Deutschland Ltd & Co KG, Blankenfelde-Mahlow (DE)

(72) Inventors: Ellis F H Chong, Derby (GB); Andreas Reeh, Nuremberg (DE); Johannes Gabriel Bauer, Neuried (DE); Anton Rudenko, Ottobrunn (DE)

(73) Assignee: Rolls-Royce Deutschland Ltd & Co KG, Blankenfelde-Mahlow (DE)

( * ) Notice: Subject to any disclaimer, the term of this patent is extended or adjusted under 35 U.S.C. 154(b) by 0 days.

(21) Appl. No.: 18/201,619

(22) Filed: May 24, 2023

(30) Foreign Application Priority Data

Jan. 11, 2023 (GB) .................................. 2300383

(51) Int. Cl.
*H02K 21/24* (2006.01)
*B64D 27/24* (2006.01)
(Continued)

(52) U.S. Cl.
CPC ......... *H02K 21/24* (2013.01); *B64C 29/0033* (2013.01); *B64D 27/24* (2013.01);
(Continued)

(58) Field of Classification Search
CPC .......... H02K 21/24; H02K 1/145; H02K 3/24; H02K 2201/12; H02K 2213/03; B64C 29/0033; B64D 27/24
See application file for complete search history.

(56) References Cited

U.S. PATENT DOCUMENTS

| 7,138,734 B2 | 11/2006 | Kim et al. |
| 7,868,510 B2 | 1/2011 | Rittenhouse |

(Continued)

FOREIGN PATENT DOCUMENTS

| AT | 504456 A1 | 5/2008 |
| CN | 113162350 A * | 7/2021 |

(Continued)

OTHER PUBLICATIONS

Weh (DE 3927453 A1) English Translation (Year: 1991).*
Nikolaevich (CN-113162350-A) English Translation) (Year: 2021).*

*Primary Examiner* — Tulsidas C Patel
*Assistant Examiner* — Robert E Mates
(74) *Attorney, Agent, or Firm* — Lempia Summerfield Katz LLC

(57) ABSTRACT

An electrical propulsion unit (EPU) for a vertical take-off and landing (VTOL) aircraft is provided. The EPU includes a propeller or a fan and an electric motor. The electric motor includes a stator comprising coils configured to carry current and a rotor arranged to interact with the stator. The rotor is configured to generate a torque for driving rotation of the propeller or the fan. The coils of the stator have a cumulated conductor volume $V_{conductor}$. The stator, the rotor, or the stator and the rotor include a flux guiding iron material configured to guide magnetic flux generated by the coils of the stator, wherein the flux guiding iron material has a cumulated iron volume $V_{iron}$, and wherein the electric motor has a machine parameter $\Gamma$ that is greater than or equal to 0.25, $\Gamma$ being defined as: $\Gamma = V_{conductor}/V_{iron}$.

17 Claims, 21 Drawing Sheets

(51) Int. Cl.
B64C 29/00 (2006.01)
H02K 3/24 (2006.01)
H02K 1/14 (2006.01)

(52) U.S. Cl.
CPC ............ H02K 1/145 (2013.01); H02K 3/24 (2013.01); H02K 2201/12 (2013.01); H02K 2213/03 (2013.01)

(56) References Cited

U.S. PATENT DOCUMENTS

| | | |
|---|---|---|
| 2007/0152528 A1 | 7/2007 | Kang et al. |
| 2008/0211326 A1 | 9/2008 | Kang et al. |
| 2011/0133485 A1 | 6/2011 | Gieras et al. |
| 2011/0309699 A1 | 12/2011 | Woolmer et al. |
| 2013/0015733 A1 | 1/2013 | Rasch et al. |
| 2013/0113320 A1 | 5/2013 | Calley et al. |
| 2014/0139161 A1 | 5/2014 | Ueda |
| 2017/0047798 A1 | 2/2017 | Klassen |
| 2021/0099036 A1 | 4/2021 | Bauer et al. |
| 2021/0188066 A1* | 6/2021 | McGrew ........... B60K 17/08 |
| 2021/0344255 A1* | 11/2021 | Said ............... H02K 5/225 |

FOREIGN PATENT DOCUMENTS

| | | |
|---|---|---|
| DE | 3927453 A1 * | 2/1991 |
| DE | 102019215015 A1 | 4/2021 |
| DE | 102020215668 A1 | 6/2022 |
| DE | 102022109871 A1 | 10/2022 |
| EP | 2605367 A1 | 6/2013 |
| EP | 3736943 A1 | 11/2020 |
| WO | 2012113654 A2 | 8/2012 |
| WO | 2021163156 A1 | 8/2021 |
| WO | 2022035940 A1 | 2/2022 |
| WO | 2022223246 A1 | 10/2022 |
| WO | 2023117585 A1 | 6/2023 |
| WO | 2023117586 A1 | 6/2023 |

* cited by examiner

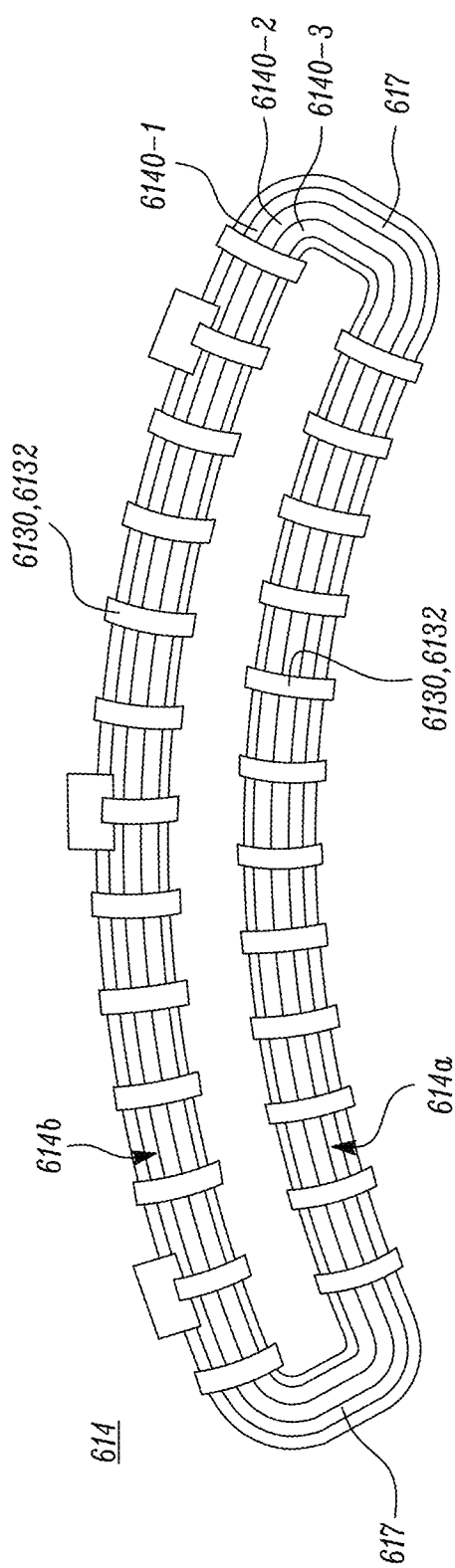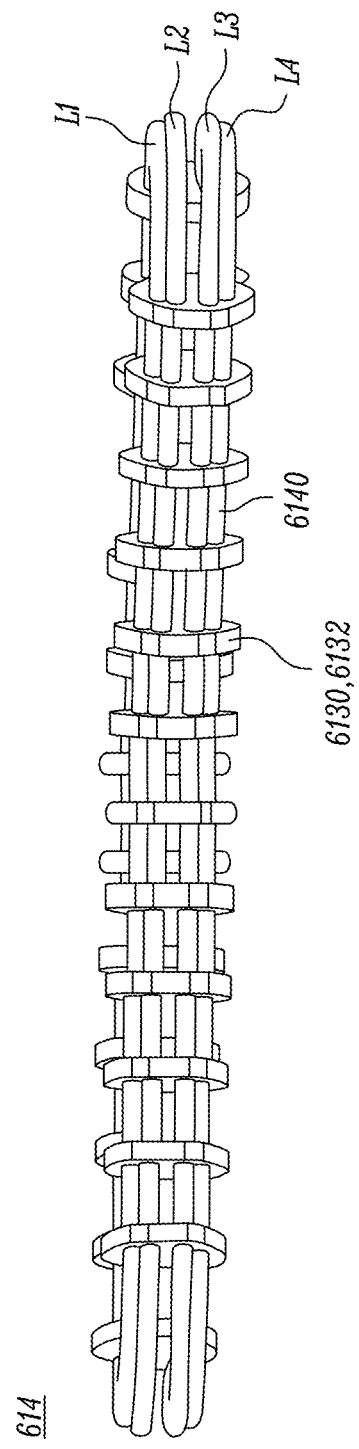
FIG. 20A
FIG. 20B

ELECTRICAL MACHINES FOR AIRCRAFT POWER AND PROPULSION SYSTEMS

The present patent document claims the benefit of United Kingdom Patent Application No. 2300383.3, filed Jan. 11, 2023, which is hereby incorporated by reference in its entirety.

TECHNICAL FIELD

This disclosure relates to rotary electrical machines for use in aircraft electrical power systems, and particularly, but not exclusively, to rotary electrical machines for use in the propulsion systems of vertical take-off and landing (VTOL) aircraft. The disclosure also relates to aircraft and aircraft electrical propulsion units (EPUs) including such rotary electrical machines.

BACKGROUND

In aerospace, the desire to reduce greenhouse emissions combined with improvements in the underlying electrical technologies has created interest in new types of aircraft and aircraft propulsion systems. This includes purely electric aircraft having an onboard power source that includes batteries and/or fuel cells. The purely electric aircraft includes one or more electrical propulsion units (EPUs) in which an electric motor drives rotation of a propulsive propeller or fan. This also includes hybrid-electric aircraft having an onboard power source that include one or more engines (e.g., gas turbine engines). An engine of a hybrid-electric aircraft may drive an electric generator to provide electrical power for an EPU, or the engine may provide propulsive thrust with driving assistance from a motor coupled to a shaft of the engine.

Electric and hybrid-electric aircraft may be of a conventional type (e.g., Conventional Take-Off and Landing [CTOL]) or may have Vertical Take-Off and Landing (VTOL) capabilities. VTOL aircraft may be used for Urban Air Mobility (UAM) applications. UAM refers to the use of VTOL aircraft to transport a relatively small number of passengers relatively short distances (e.g., of the order of tens of, or perhaps a few hundred, kilometers, such as in or between urban environments).

The design requirements of electrical machines (e.g., motors and generators) used in aerospace applications are somewhat different from those in other industries, due in part to the criticality of their function and the resulting requirements for certification. For example, the expected failure rate is to be low, and the tolerance of the machine, and indeed the wider tolerance of the system, to a failure is to be high. While many of these design requirements remain in place for the electrical machines of the new aircraft types mentioned above, the electrical machines used for the new aircraft types have new design requirements that cannot be met by established aerospace electrical machine designs. For example, the widely used radial flux wound field machines and radial flux permanent magnet alternators (PMAs) used to generate electrical power from, and in some cases start, aircraft gas turbine engines cannot meet the power density or torque density requirements of an EPU for a VTOL aircraft. It will therefore be necessary to adopt new aerospace electrical machine designs for these new aircraft.

Until superconducting electrical machine technology matures to a point where such technology may be used in safety critical aerospace applications, it is likely that permanent magnet electrical machines will be used for electric and hybrid-electric aircraft due to their favorable power density compared with other machine types. Various permanent magnet electrical machine designs have been proposed for aerospace applications, most of which are of the radial flux type. However, work remains to further improve and refine these designs for aerospace applications. This includes, for example, reducing their failure rate and improving their fault tolerance while also optimizing their levels of torque production, mass, and efficiency.

SUMMARY

The scope of the present disclosure is defined solely by the appended claims and is not affected to any degree by the statements within this summary. The present embodiments may obviate one or more of the drawbacks or limitations in the related art.

Herein, unless specified otherwise, where a value of a measured or measurable quantity is dependent on measurement conditions such as ambient temperature and pressure, the measurement conditions are ISA (International Standard Atmosphere) sea level conditions. ISA sea level conditions correspond to an ambient temperature of 288 K (15° C., 59° F.) and an ambient pressure of 101.325 kPa (1,013.25 mbar, 14.7 psi).

According to a first aspect, an electrical machine for an aircraft electrical power system is provided. The electrical machine includes a stator having coils for carrying current and a rotor arranged to interact with the stator to produce a torque for driving the rotor to rotate or to generate electrical power in the coils of the stator.

According to a second aspect, an aircraft electrical power system including an electrical machine according to the first aspect is provided. The rotor of the electrical machine is mechanically coupled, directly or indirectly, to a rotary shaft of a propulsor of the aircraft. The rotary shaft may be an engine shaft (e.g., a shaft or spool of a gas turbine engine) or a shaft of an electrical propulsion unit (EPU). The electrical power system may be a purely electric aircraft power system or a hybrid-electric aircraft power system. The electrical power system may be a power and propulsion system.

According to a third aspect, an electrical propulsion unit (EPU) for an aircraft is provided. The EPU includes a propeller or fan and an electrical machine according to the first aspect. The electrical machine is configured as an electric motor, and the rotor of the electrical machine is mechanically coupled, directly or indirectly, to the propeller or fan and arranged to drive rotation of the propeller or fan.

According to a fourth aspect, an aircraft including the electrical machine of the first aspect, the electrical power system of the second aspect, or the EPU of the third aspect is provided. In one group of embodiments, the aircraft is a Vertical Take-Off and Landing (VTOL) aircraft including one or more of the EPUs. The VTOL aircraft may be a purely electric aircraft (e.g., electric VTOL or eVTOL aircraft) or a hybrid-electric VTOL aircraft. In other embodiments, the aircraft may be a Conventional Take-Off and Landing (CTOL) aircraft. The aircraft may include a plurality of the EPUs.

In one group of embodiments, the electrical machine is a transverse flux electrical machine.

The stator and the rotor of the transverse flux electrical machine define magnetic circuits along which magnetic flux flows. The magnetic flux paths may be three-dimensional.

The stator of the transverse flux electrical machine may include flux guiding stator iron defining one or more stator slots housing the stator coils. In some examples, there are a plurality of stator slots, and each of the stator slots houses one of the coils. Each of the one or more stator slots may be circumferentially extending, and current may flow through the coil in a circumferential direction relative to an axis of rotation of the electrical machine. The three-dimensional magnetic flux paths may flow around (e.g., helically around) the stator slots. The one or more stator slots may be annular in shape.

Each of the one or more stator slots may be an open slot. The term "open slot" refers to a slot that is not hermetically sealed or fully enclosed, such that the coil is exposed to the environment of the stator. For example, the flux guiding stator iron may include orifices or spaces that expose the coil to the environment of the stator.

Each of the one or more stator slots may have an angular extent in the circumferential direction of at least 10 degrees, at least 20 degrees, at least 30 degrees, or at least 40 degrees. In an example, each of the one or more stator slots has an angular extent in the circumferential direction in a range of 25 to 65 degrees.

Each of the one or more stator slots and each coil may include a first portion extending in a circumferential direction and a second portion spaced apart from the first portion and extending in a circumferential direction. In one group of examples, the first portion and the second portion are radially spaced apart. In another group of examples, the first portion and the second portion are axially spaced apart. Each of the one or more stator slots and each stator coil may be banana shaped, (e.g., may approximate the shape of a circumferential segment of an annulus).

For each of the one or more stator slots, the flux guiding stator iron may include circumferentially arranged flux guiding stator elements. Each of the one or more stator slots may be associated with two sets of flux guiding stator elements: a first set of flux guiding stator elements defining the first slot portion; and a second set of flux guiding stator elements defining the second slot portion.

A stator slot of the one or more stator slots, the associated stator iron (e.g., two sets of stator elements), and the coil housed within the slot may be referred to as a stator segment or stator module. The stator segment or stator module may be a replaceable module that may be easily exchanged in case of maintenance or failure, for example. A plurality (e.g., six) of stator segments may be arranged along the circumference of the stator.

Each stator element may be an elongated and at least partially curved shaped. Each stator element may be C-shaped or claw-shaped. Each flux guiding stator element may have a body portion and a pair of projections that project from the body portion (e.g., a pair of pole heads). In one example, the stator elements are oriented so the projections project radially from the body portion. In another example, the stator elements are oriented so the projections project axially from the body portion. The projections of circumferentially adjacent flux guiding stator elements may be arranged in radial or axial opposition so that the circumferentially adjacent flux guiding stator elements define a slot cross-section perpendicular to the circumferential direction.

Each stator slot or stator slot portion may have a circular, polygonal, rectangular, or other cross section in a plane perpendicular to a direction of current flow.

Each stator slot may have a slot fill factor, defined as a cumulated cross-sectional area of a current carrying coil in a slot divided by the cross-sectional area of the slot housing the coil. The slot fill factor may be less than or equal to 70%. The slot fill factor may be less than or equal to 60%, less than or equal to 50%, less than or equal to 40%, or less than or equal to 35%. The slot fill factor may be greater than or equal to 10%, greater than or equal to 15%, greater than or equal to 20%, or greater than or equal to 25%. The slot fill factor may in the range of 10% to 50% or in the range of 20% to 40%.

The stator may include at least two slots and associated coils per phase of the electrical machine. Coils of the same phase may be electrically connected together (e.g., in series or parallel), and coils of the same phase may be circumferentially spaced apart by $2\pi/N_c$ radians, where $N_c$, is the number of coils per phase. The stator coils of different phases may be connected in a star configuration or in a delta configuration.

Each stator coil may have a plurality of winding turns formed from a continuous length of conductor. Each stator coil may include a plurality of (e.g., two) winding packages, each winding package including a subset of winding turns of the plurality of winding turns. The winding packages of the coil may be spaced apart (e.g., axially spaced apart and/or radially spaced apart) to define a cooling channel therebetween, through which the flow of air may pass.

The rotor of the transverse flux electrical machine may include a plurality of permanent magnets (e.g., rotor magnets) circumferentially distributed about the rotor. The plurality of permanent magnets may define a plurality of circumferentially arranged rotor magnet poles, with circumferentially adjacent poles being of opposite polarity. The plurality of permanent magnets of the rotor may face and be separated from the stator by an air gap. The air gap may be a radial air gap (e.g., the rotor magnets may be radially spaced from the stator), or the air gap may be axial (e.g., the rotor magnets may be axially spaced from the stator).

The rotor may be a dual rotor including a first rotor portion (e.g., an inner rotor portion) and a second rotor portion (e.g., an outer rotor portion), with the stator located between the first rotor portion and the second rotor portion. In one example, the first rotor portion and the second rotor portion are a radially inner rotor portion and a radially outer rotor portion, respectively, with the stator located radially between the radially inner rotor portion and the radially outer rotor portion. In another example, the first rotor portion and the second rotor portion are axially spaced rotor portions with the stator located axially between the axially spaced rotor portions. The first rotor portion may include a first set of permanent magnets, and the second rotor portion may include a second set of permanent magnets. The first set of permanent magnets may face and be separated from a first side of the stator by a first air gap, and the second set of permanent magnets may face and be separated from a second side of the stator by a second air gap, the first side and the second side of the stator being opposing sides. The first air gap and the second air gap (e.g., first and second magnetic air gaps) may be radial air gaps, or the first and second magnetic air gaps may be axial air gaps.

Each set of permanent magnets may include a first group of permanent magnets and a second group of permanent magnets. The first group of permanent magnets may be located opposite a first slot portion of a slot of the stator, and the second group of permanent magnets may be opposite a second slot portion of a slot of the stator.

The rotor may be ironless. Where the rotor is a dual rotor, both the first rotor portion and the second rotor portion may be ironless.

The permanent magnets of each set or each group may be arranged in a Halbach array.

The transverse flux electrical machine may be a multi-lane electrical machine. In other words, the electrical machine may include at least two (e.g., two or four) sub-machines, each sub-machine of the at least two sub-machines having an electrically independent set of stator coils. For example, the electrical machine may have a first three-phase sub-machine and a second three-phase sub-machine.

In one example, the multi-lane transverse flux electrical machine has: a first sub-machine having a first stator and a first rotor arranged to interact with the first stator; and a second sub-machine having a second stator and a second rotor arranged to interface with the second stator. Axes of rotation of the first rotor and the second rotor may be coaxial, but the first sub-machines and the second sub-machine are axially spaced apart from each other. The first rotor and the second rotor may be mechanically coupled so that the first rotor and the second rotor rotate together.

In another example of a multi-lane electrical machine, a stator is circumferentially divided into a first sector and a second sector. The first sector includes a first set of stator slots and corresponding stator coils belonging to a first sub-machine. The second sector includes a second set of stator slots and corresponding stator coils belonging to a second sub-machine. The first sub-machine and the second sub-machine are arranged to interact with a common rotor.

In yet another example, the multi-lane transverse flux electrical machine has at least four lanes (e.g., at least four sub-machines). The electrical machine has a first stator and a corresponding first rotor, and a second stator and a corresponding second rotor. Axes of rotation of the first rotor and the second rotor are aligned (e.g., coincident/coaxial), but the first stator and first rotor are axially spaced apart from the second stator and the second rotor. The first rotor and the second rotor may be mechanically coupled so that the first rotor and the second rotor rotate together. The first stator is circumferentially divided into a first sector and a second sector. The first sector includes a first set of stator slots and corresponding stator coils belonging to a first sub-machine. The second sector includes a second set of stator slots and corresponding stator coils belonging to a second sub-machine. The first sub-machine and the second sub-machine share and interact with the first rotor. The second stator is circumferentially divided into a third sector and a fourth sector. The third sector includes a third set of stator slots and corresponding stator coils belonging to a third sub-machine. The fourth sector includes a fourth set of stator slots and corresponding stator coils belonging to a fourth sub-machine. The third sub-machine and the fourth sub-machine share and interact with the second rotor.

The transverse flux electrical machine may have a cooling system for removing heat, including from the stator coils. In one group of examples, the cooling system is an air cooling system that uses ambient air to cool the stator coils. In one example, the cooling system is a direct air cooling system in which heat is transferred directly from the stator coils into the cooling air, without an intermediate heat exchanger, to increase a rate of heat transfer from the stator coils to the air.

The motor may include one or more air inlets through which cooling air enters the motor, and one or more cooling channels (e.g., passages or conduits) arranged to direct the flow of cooling air towards the stator coils. In one example, the motor includes a plurality of circumferentially arranged cooling channels arranged to direct the flow of cooling air radially outward towards the stator coils. The cooling air may flow in a radial direction through circumferential spaces defined between circumferentially adjacent flux guiding stator elements.

The motor may include an air accelerating mechanism or device (e.g., an air accelerator) for generating and/or accelerating the flow of cooling air. The accelerator may be or include a fan that may be driven by the motor.

Where direct air cooling is used, each current carrying coil may include an effective cooling surface area that is directly exposed to the flow of cooling air. The directly exposed surface area of the coil may be at least 20% of a total surface area of the coil. In other words, at least 20% of the total surface area of the conductor that forms the coil may be directly exposed to the flow of cooling air. The effective cooling surface area may be at least 25%, at least 35%, at least 40%, or at least 50% of the total surface area of the coil. The effective cooling surface area may be less than or equal to 90%, less than or equal to 80%, less than or equal to 70%, or less than or equal to 60% of the total surface area of the coil. The effective cooling surface area may be in a range of 20% to 80% of the total surface area of the coil, in a range of 25% to 80% of the total surface area of the coil, in a range of 30% to 70% of the total surface area of the coil, in a range of 35% to 65% of the total surface area of the coil, or in a range of 40% to 60% of the total surface area of the coil. In a specific example, the effective cooling surface area is in a range of 25% to 45% of the total surface area of the coil.

Where a directly cooled electrical machine is used, the aircraft (e.g., an EPU of the aircraft) may include an air inlet for receiving air proximate to the aircraft for supplying the flow of cooling air to the coils.

In another group of embodiments, the electrical machine is a radial flux electrical machine.

The stator and the rotor of the radial flux electrical machine define magnetic circuits along which magnetic flux flows. The magnetic flux paths may be two-dimensional and lie in a plane perpendicular to an axis of rotation of the electrical machine.

The stator of the radial flux electrical machine may include a plurality of circumferentially distributed and radially extending stator teeth defining slots therebetween. Each stator coil may be wound around a tooth so as to occupy two circumferentially adjacent slots (e.g., a concentrated winding arrangement). In another example, each stator coil is wound around more than one (e.g., two) teeth so as to occupy more than one slot (e.g., a distributed winding arrangement).

The rotor of the radial flux electrical machine may include a plurality of permanent magnets circumferentially distributed about the rotor. The permanent magnets of the rotor may face and be separated from the stator by an air gap. The air gap may be a radial air gap (e.g., the rotor magnets may be radially spaced from the stator).

The radial flux electrical machine may be a multi-lane electrical machine. In other words, the electrical machine may include at least two (e.g., two or four) sub-machines, each sub-machine having an electrically independent set of stator coils. For example, the electrical machine may have a first three-phase sub-machine and a second three-phase sub-machine.

In one example, the multi-lane radial flux electrical machine has a first sub-machine having a first stator and a first rotor arranged to interact with the first stator, and a second sub-machine having a second stator and a second rotor arranged to interact with the second stator. Axes of rotation of the first rotor and the second rotor are coaxial, but the first sub-machine and the second sub-machine are axially spaced apart from each other. The first rotor and the second rotor may be mechanically coupled so that the first rotor and the second rotor rotate together.

In another example, a stator includes a first set of stator teeth and associated stator coils belonging to a first sub-machine, and the stator includes a second set of stator teeth and associated stator coils belonging to a second sub-machine. The first set of stator teeth and the second set of stator teeth and coils are arranged to interact with a common rotor.

In yet another example, the multi-lane radial flux electrical machine has at least four lanes (e.g., at least four sub-machines). The electrical machine has a first stator and a corresponding first rotor, and a second stator and a corresponding second rotor. Axes of rotation of the first rotor and the second rotor are coaxial, but the first stator and the first rotor are axially spaced apart from the second stator and the second rotor. The first rotor and the second rotor may be mechanically coupled so that the first rotor and the second rotor rotate together. The first stator includes a first set of stator teeth and associated stator coils belonging to a first sub-machine, and the first stator includes a second set of stator teeth and associated stator coils belonging to a second sub-machine. The first set of stator teeth, the second set of stator teeth, and stator coils are arranged to interact with the first rotor. The second stator includes a third set of stator teeth and associated stator coils belonging to a third sub-machine, and the second stator includes a fourth set of stator teeth and associated stator coils belonging to a fourth sub-machine. The third set of stator teeth, the fourth set of stator teeth, and stator coils are arranged to interact with the second rotor.

The following may be applied to in any of the above aspects, singularly and, except where mutually exclusive, in combination.

The electrical machine may be a motor and may be configured to produce a peak rated torque of $\tau_{peak}$ and a maximum continuous rated torque of $\tau_{max,cont}$. Those skilled in the art will understand that the peak rated torque is the highest torque the motor is rated to produce for short periods (e.g., for transients). For example, $\tau_{peak}$ may be the highest torque the motor can produce for three seconds at ISA sea level conditions. Sustained operation at the peak rated torque is not possible and will result in, for example, overheating and damage to the motor. In contrast, the maximum continuous rated torque is the highest torque the motor can produce and sustain at ISA sea level conditions without exceeding a rated temperature of the motor. For example, $\tau_{max,cont}$ may be the highest torque the motor can produce for at least three minutes at ISA sea level conditions.

The electrical machine has an active parts mass, $m_{act}$. The active parts mass is a cumulated (e.g., total) mass of components of the electrical machine that contribute to producing the torque (or, equivalently, generating electrical power where the electrical machine is configured as a generator). The active parts mass, matt, includes any flux guiding material included in the stator and/or the rotor. This material may be referred to as "iron," though those skilled in the art will appreciate that the stator iron and/or rotor iron is not elemental iron in many examples (e.g., the iron may include laminations of a ferromagnetic material such as CoFe). The active parts mass, $m_{act}$, also includes the mass of the stator coils. Herein, the mass of the stator coils includes the mass of end windings of the stator coils and the mass of insulating material surrounding the conductor that forms the stator coils. Although the end windings and the insulating material do not add to the torque produced by the motor, zero torque would be produced in their absence and so their mass is included in the active parts mass. The active parts mass, $m_{act}$, also includes the mass of any flux generating components of the rotor. In a permanent magnet electric machine, this is the permanent magnets of the rotor. If the rotor includes current-carrying coils, these are included in the active parts mass.

An active parts torque density of the electrical machine, $p_{act}$, is defined as a ratio of the peak rated torque and the active parts mass:

$$\rho_{act} = \frac{\tau_{peak}}{m_{act}} \tag{1}$$

According to the present disclosure, a value of $p_{act}$ may be greater than or equal to 50 Nmkg$^{-1}$ (50 Newton meters per kilogram). For example, $p_{act}$ may be in the range of 50 to 165 Nmkg$^{-1}$.

The active parts torque density, $p_{act}$ may be greater than or equal to 55 Nmkg$^{-1}$, greater than or equal to 60 Nmkg$^{-1}$, greater than or equal to 65 Nmkg$^{-1}$, greater than or equal to 70 Nmkg$^{-1}$, greater than or equal to 75 Nmkg$^{-1}$, greater than or equal to 80 Nmkg$^{-1}$, greater than or equal to 85 Nmkg$^{-1}$, or greater than or equal to 90 Nmkg$^{-1}$. $P_{act}$ may be less than or equal to 160 Nmkg$^{-1}$, less than or equal to 150 Nmkg$^{-1}$, less than or equal to 140 Nmkg$^{-1}$, less than or equal to 130 Nmkg$^{-1}$, or less than or equal to 120 Nmkg$^{-1}$. $p_{act}$ may be in the range of 60 to 150 Nmkg$^{-1}$, in the range of 70 to 140 Nmkg$^{-1}$, in the range of 75 to 130 Nmkg$^{-1}$, or in the range of 80 to 120 Nmkg$^{-1}$. In a specific example, the active parts torque density, $p_{act}$, is in the range of 90 to 110 Nm kg$^{-1}$.

The electrical machine may further include a cooling system for removing heat from the electrical machine. The cooling system may have a cooling system mass, $m_{cool}$ The cooling system mass, $m_{cool}$, is a cumulated mass of components of the electrical machine that contribute to cooling the stator and/or rotor of the electrical machine. The components included in this mass depend on the type and design of the cooling system. For a liquid-cooled electrical machine (e.g., an oil-cooled machine), the cooling system mass includes the mass of the coolant, the mass of the tank and conduits (e.g., piping) that contain the coolant, the mass of the pump(s) that circulate the coolant, and the mass of any heat exchanger(s) included in the cooling system. The cooling system mass also includes the mass of additional components such as filters and valves, if present. For an air-cooled electrical machine, the cooling system may, for example, include the mass of one or more air filters, one or more flow guiding mechanisms or devices (e.g., air ducts or channels), and/or one or more structurally integrated fans. For an indirectly air-cooled electrical machine, the cooling system mass may further include the mass of one or more heat exchangers.

A torque density parameter $p_{act+cool}$ may be defined as:

$$\rho_{act+cool} = \frac{\tau_{peak}}{m_{act} + m_{cool}} \tag{2}$$

According to the present disclosure, a value of $p_{act+cool}$ may be greater than or equal to 40 Nmkg$^{-1}$ (e.g., $p_{act+cool}$ may be in the range of 40 to 150 Nmkg$^{-1}$).

The torque density parameter $p_{act+cool}$ may be greater than or equal to 45 Nmkg$^{-1}$, greater than or equal to 50 Nmkg$^{-1}$, greater than or equal to 55 Nmkg$^{-1}$, greater than or equal to 65 Nmkg$^{-1}$, or greater than or equal to 70 Nmkg$^{-1}$. $p_{act+cool}$ may be less than or equal to 140 Nmkg$^{-1}$, less than or equal to 130 Nmkg$^{-1}$, less than or equal to 120 Nmkg$^{-1}$, less than or equal to 110 Nmkg$^{-1}$, less than or equal to 100 Nmkg$^{-1}$, or less than or equal to 90 Nmkg$^{-1}$. $p_{act+cool}$ may be in the range of 45 to 130 Nmkg$^{-1}$, in the range of 55 to 120 Nmkg$^{-1}$, in the range of 60 to 110 Nmkg$^{-1}$, or in the range of 65 to 95 Nmkg$^{-1}$. In a specific example, the active parts torque density, $P_{act+cool}$, is in the range of 70 to 85 Nmkg$^{-1}$.

The stator of the electrical machine may include flux guiding stator iron (e.g., flux guiding stator elements) defining one or more stator slots that house the stator coils. When producing the peak rated torque, $\tau_{peak}$, a slot current density of each slot may be equal to $J_{slot,peak}$.

A machine parameter $\Lambda$ may be defined as:

$$\Lambda = \frac{\tau_{peak}}{m_{act} \times J_{slot,peak}} \quad (3)$$

According to the present disclosure, a value of $\Lambda$ may be greater than or equal to 5 µNm$^3$ kg$^{-1}$A$^{-1}$ (5×10$^{-6}$ Newton meters-cubed per kilogram per Ampere). For example, $\Lambda$ may be in the range of 5 to 35 µNm$^3$ kg$^{-1}$A$^{-1}$.

The value of $\Lambda$ may be greater than or equal to 6 µNm$^3$ kg$^{-1}$A$^{-1}$, greater than or equal to 7 µNm$^3$ kg$^{-1}$A$^{-1}$, greater than or equal to 8 µNm$^3$ kg$^{-1}$A$^{-1}$, greater than or equal to 9 µNm$^3$ kg$^{-1}$A$^{-1}$, greater than or equal to 10 µNm$^3$ kg$^{-1}$A$^{-1}$, greater than or equal to 11 µNm$^3$ kg$^{-1}$A$^{-1}$, or greater than or equal to 12 µNm$^3$ kg$^{-1}$A$^{-1}$. The value of $\Lambda$ may be less than or equal to 30 µNm$^3$ kg$^{-1}$A$^{-1}$, less than or equal to 25 µNm$^3$ kg$^{-1}$A$^{-1}$, less than or equal to 20 µNm$^3$ kg$^{-1}$A$^{-1}$, or less than or equal to 15 µNm$^3$ kg$^{-1}$A$^{-1}$. The value of $\Lambda$ may be in the range of 6 to 22 µNm$^3$ kg$^{-1}$A$^{-1}$, in the range of 7 to 21 µNm$^3$ kg$^{-1}$A$^{-1}$, in the range of 8 to 20 µNm$^3$ kg$^{-1}$A$^{-1}$, in the range of 9 to 19 µNm$^3$ kg$^{-1}$A$^{-1}$ or in the range of 10 to 18 µNm$^3$ kg$^{-1}$A$^{-1}$. In a specific example, $\Lambda$ may be in the range of 11 to 17 µNm$^3$ kg$^{-1}$A$^{-1}$.

Where the electrical machine has a cooling system with cooling system mass $m_{cool}$, a machine parameter $\Lambda^*$ may be defined as:

$$\Lambda^* = \frac{\tau_{peak}}{(m_{act} + m_{cool}) \times J_{slot,peak}} \quad (4)$$

According to the present disclosure, a value of $\Lambda^*$ may be greater than or equal to 4 µNm$^3$ kg$^{-1}$A$^{-1}$ (e.g., $\Lambda^*$ may be in the range of 4 to 25 µNm$^3$ kg$^{-1}$A$^{-1}$).

The value of $\Lambda^*$ may be greater than or equal to 5 µNm$^3$ kg$^{-1}$A$^{-1}$, greater than or equal to 6 µNm$^3$ kg$^{-1}$A$^{-1}$, greater than or equal to 7 µNm$^3$ kg$^{-1}$A$^{-1}$, greater than or equal to 8 µNm$^3$ kg$^{-1}$A$^{-1}$, greater than or equal to 9 µNm$^3$ kg$^{-1}$A$^{-11}$, or greater than or equal to 10 µNm$^3$ kg$^{-1}$A$^{-1}$. The value of $\Lambda^*$ may be less than or equal to 20 µNm$^3$ kg$^{-1}$A$^{-1}$, less than or equal to 17 µNm$^3$ kg$^{-1}$A$^{-1}$, less than or equal to 15 µNm$^3$ kg$^{-1}$A$^{-1}$, or less than or equal to 13 µNm$^3$ kg$^{-1}$A$^{-1}$. The value of $\Lambda^*$ may be in the range of 5 to 20 µNm$^3$ kg$^{-1}$A$^{-1}$, in the range of 6 to 19 µNm$^3$ kg$^{-1}$A$^{-1}$, in the range of 7 to 17 µNm$^3$ kg$^{-1}$A$^{-1}$, or in the range of 8 to 15 µNm$^3$ kg$^{-1}$A$^{-1}$. In a specific example, $\Lambda^*$ may be in the range of 9 to 12 µNm$^3$ kg$^{-1}$A$^{-1}$.

The active parts torque density, $p_{act}$, may be in the range of 50 to 165 Nmkg$^{-1}$, while the slot current density, $J_{slot,peak}$, may be in the range of 3 to 11 A(mm)$^{-2}$. $p_{act}$ may be in the range of 60 to 140 Nmkg$^{-1}$, while $J_{slot,peak}$ may be in the range of 4 to 10 A(mm)$^{-2}$. $P_{act}$ may be in the range of 70 to 130 Nmkg$^{-1}$, while $J_{slot,peak}$ may be in the range of 5 to 9 A(mm)$^{-2}$. $p_{act}$ may be in the range of 80 to 120 Nmkg$^{-1}$, while $J_{slot,peak}$ may be in the range of 6 to 8 A(mm)$^{-2}$. Herein, the unit "A(mm)$^{-2}$" is "Amperes per square millimeter" (i.e., 10$^6$×Amperes per square meter).

The stator coils include an electrically conductive material, and a cumulated volume of the conductor material is equal to $V_{conductor}$. The stator and/or rotor may include iron material configured to guide magnetic flux in magnetic circuits through the rotor and the stator, and a cumulated volume of the iron material of the stator and the rotor is equal to $V_{iron}$.

A dimensionless machine parameter $\Gamma$ may be defined as:

$$\Gamma = \frac{V_{conductor}}{V_{iron}} \quad (5)$$

According to the present disclosure, the value of $\Gamma$ may be greater than or equal to 0.25 (e.g., $\Gamma$ may be in the range 0.25 to 3).

The value of $\Gamma$ may be greater than or equal to 0.3, greater than or equal to 0.35, greater than or equal to 0.4, greater than or equal to 0.45, greater than or equal to 0.5, greater than or equal to 0.55, or greater than or equal to 0.6. The value of r may be less than or equal to 3.0, less than or equal to 2.5, less than or equal to 2, less than or equal to 1.5, less than or equal to 1, or less than or equal to 0.75. $\Gamma$ may be in the range of 0.3 to 2.0, in the range of 0.3 to 1.0, in the range of 0.35 to 1.0, in the range of 0.35 to 0.9, in the range of 0.4 to 0.8, or in the range of 0.45 to 0.75. In a specific example, $\Gamma$ is in the range of 0.5 to 0.7.

Where the electrical machine is a multi-lane electrical machine, the conductor volume $V_{conductor}$ is the cumulated volume of the stator coils of all sub-machines (e.g., the first and the second sub-machines of a dual-lane machine). Likewise, $V_{iron}$ is the cumulated mass of iron material of the rotor and stator of all sub-machines.

The electrical machine has a power factor equal to cos($\phi$), $\phi$ being a steady-state phase difference between stator coil current and a stator coil voltage.

A machine parameter $\Delta$ may be defined as:

$$\Delta = \frac{\rho_{act}}{\cos(\phi)} \quad (6)$$

According to the present disclosure, a value of $\Delta$ may be greater than or equal to 65 Nmkg$^{-1}$ (e.g., $\Delta$ may be in the range 65 to 275 Nmkg$^{-1}$).

The value of $\Delta$ may be greater than or equal to 75 Nmkg$^{-1}$, greater than or equal to 85 Nmkg$^{-1}$, greater than or equal to 95 Nmkg$^{-1}$, greater than or equal to 105 Nmkg$^{-1}$, greater than or equal to 115 Nmkg$^{-1}$, or greater than or equal to 125 Nmkg$^{-1}$. The value of $\Delta$ may be less than or equal to 275 Nmkg$^{-1}$, less than or equal to 250 Nmkg$^{-1}$, less than or equal to 225 Nmkg$^{-1}$, less than or equal to 200 Nmkg$^{-1}$, less than or equal to 175 Nmkg$^{-1}$, or less than or equal to 150 Nmkg$^{-1}$. $\Delta$ may be in the range of 70 to 200 Nmkg$^{-1}$, in the range of 75 to 200 Nmkg$^{-1}$, in the range of 80 to 190 Nmkg$^{-1}$, in the range of 90 to 180 Nmkg$^{-1}$, in the range of 100 to 170 Nmkg$^{-1}$, or in the range of 110 to 160 Nmkg$^{-1}$. In a specific example, $\Delta$ is in the range of 130 to 150 Nmkg$^{-1}$.

Where the electrical machine has a cooling system with cooling system mass $m_{cool}$, a machine parameter $\Delta^*$ may be defined as:

$$\Delta^* = \frac{\tau_{peak}}{(m_{act} + m_{cool}) \times \cos(\phi)} \quad (7)$$

According to the present disclosure, a value of $\Delta^*$ may be greater than or equal to 50 Nmkg$^{-1}$. For example, $\Delta^*$ may be in the range of 50 to 190 Nmkg$^{-1}$.

The value of $\Lambda^*$ may be greater than or equal to 60 Nmkg$^{-1}$, greater than or equal to 70 Nmkg$^{-1}$, greater than or equal to 80 Nmkg$^{-1}$, greater than or equal to 90 Nmkg$^{-1}$, or greater than or equal to 100 Nmkg$^{-1}$. The value of $\Delta^*$ may be less than or equal to 175 Nmkg$^{-1}$, less than or equal to 150 Nmkg$^{-1}$, less than or equal to 140 Nmkg$^{-1}$, less than or equal to 130 Nmkg$^{-1}$, or less than or equal to 120 Nmkg$^{-1}$. $\Delta^*$ may be in the range of 55 to 195 Nmkg$^{-1}$, in the range of 75 to 145 Nmkg$^{-1}$, in the range of 80 to 140 Nmkg$^{-1}$, in the range of 85 to 135 Nmkg$^{-1}$, or in the range of 90 to 130 Nmkg$^{-1}$. In a specific example, $\Lambda^*$ is in the range of 100 to 120 Nmkg$^{-1}$.

Those skilled in the art will appreciate that the power factor, $\cos(\phi)$, of an electrical machine may alternatively be defined as a ratio of the main magnetic flux and the total magnetic flux. The total magnetic flux is the sum of the main magnetic flux and the leakage flux. Specifically:

$$\cos(\phi) = \frac{\text{Main Flux}}{\text{Main Flux} + \text{Leakage Flux}} = \frac{\text{Total Flux} - \text{Leakage Flux}}{\text{Total Flux}} \quad (8)$$

Where the electrical machine is a permanent magnet synchronous electrical machine, the rotor includes a plurality of circumferentially distributed permanent magnets forming a number, $N_P$, of rotor poles. The rotor poles have a pole pitch angle, $P_\theta$, equal to 2π divided by the number of poles, $N_p$. Equivalently, the pole pitch angle, $P_\theta$, is equal to π divided by the number of pole pairs, $N_{Pairs}$. The permanent magnets rotor poles further define a pole arc length, $P_L$, equal to a length of an arc at the active parts diameter, $D_{act}$, of the electrical machine corresponding to one pole. The active parts diameter is a diameter corresponding to a radially outermost component of the electrical machine that contributes to producing the torque (or contributes to generating the electrical power if the machine is configured to operate as an electric generator).

The electrical machine has an air gap separating the rotor from the stator and having an air gap distance $G_{Air}$. In some examples, the air gap is a radial air gap (e.g., the air gap distance is defined perpendicular to an axis of rotation of the rotor of the electrical machine). In other examples, the air gap is an axial air gap (e.g., the air gap distance is defined parallel to the axis of rotation of the rotor of the electrical machine).

A machine parameter $\gamma$ may be defined as:

$$\gamma = P_\theta \times G_{Air} \quad (9)$$

According to the present disclosure, a value of $\gamma$ may be less than or equal to 100 micro radian-meters. For example, $\gamma$ may be in the range of 5 to 100 micro radian-meters.

The value of $\gamma$ may be less than or equal to 90 micro radian-meters, less than or equal to 80 micro radian-meters, less than or equal to 70 micro radian-meters, less than or equal to 60 micro radian-meters, less than or equal to 50 micro radian-meters, less than or equal to 40 micro radian-meters, or less than or equal to 30 micro radian-meters. The value of $\gamma$ may be greater than or equal to 6 micro radian-meters, greater than or equal to 8 micro radian-meters, greater than or equal to 10 micro radian-meters, greater than or equal to 12 micro radian-meters, greater than or equal to 15 micro radian-meters, or greater than or equal to 18 micro radian-meters. $\gamma$ may be in the range of 7 to 90 micro radian-meters, in the range of 9 to 75 micro radian-meters, in the range of 11 to 60 micro radian-meters, or in the range of 12 to 40 micro radian-meters. In a specific example, $\gamma$ is in the range of 15 to 30 micro radian-meters.

In a specific example, the electrical machine is a transverse flux electrical machine with a dual rotor. The dual rotor includes a first rotor portion and a second rotor portion spaced apart from the first rotor portion. The stator is located between the first rotor portion and the second rotor portion. The first rotor portion has a first plurality of permanent magnets distributed about a circumference of the first rotor portion, the permanent magnets of the first plurality forming $N_p$ rotor poles having a pole pitch angle $P_\theta$. The second rotor portion has a second plurality of permanent magnets distributed about a circumference of the second rotor portion, the permanent magnets of the second plurality forming $N_p$ rotor poles having a pole pitch angle $P_\theta$. A first air gap separates the first rotor portion from a first side of the stator by a first air gap distance $G_{Air,1}$. A second air gap separates the second rotor portion from a second side of the stator by a second air gap distance $G_{Air,2}$. In this example, for each of the first air gap and the second air gap, the machine parameter $\gamma$ is less than or equal to 100 micro radian-meters.

A machine parameter $\gamma$ may be defined as:

$$\gamma^* = P_L \times G_{Air} \quad (10)$$

According to the present disclosure, a value of $\gamma$ may be less than or equal to 40 μm$^2$ (40×10$^{-6}$ square-meters). For example, $\gamma^*$ may be in the range of 1 to 40 μm$^2$.

The value of $\gamma^*$ may be less than or equal to 35 μm$^2$, less than or equal to 30 μm$^2$, less than or equal to 25 μm$^2$, less than or equal to 20 μm$^2$, less than or equal to 15 μm$^2$, or less than or equal to 10 μm$^2$. The value of $\gamma^*$ may be greater than or equal to 1.5 μm$^2$, greater than or equal to 2 μm$^2$, or greater than or equal to 2.5 μm$^2$. $\gamma^*$ may be in the range 1.5 to 30 μm$^2$, in the range 2 to 20 μm$^2$, in the range 2.5 to 15, or in the range 3 to 10 μm$^2$. In a specific example, $\gamma$ is in the range 3.5 to 7.5 μm$^2$.

If configured as a motor, the electrical machine may, in use, be configured to receive current from a DC:AC power electronics converter (e.g., an inverter). The maximum frequency of the current received during use of the electrical machine may be equal to $f_{max}$. The term "maximum frequency of the current" refers to the highest value of the fundamental frequency of the current received during use, and not to the maximum frequency of a harmonic component of the current.

A machine parameter Π may be defined as:

$$\Pi = \frac{P_L}{f_{max}} \quad (11)$$

According to the present disclosure, a value of Π may be less than or equal to 30 μms (30×10$^{-6}$ meter-seconds). For example, Π may be in the range of 1 to 30 μms.

The value of Π may be less than or equal to 25 μms, less than or equal to 20 μms, less than or equal to 15 μms, less than or equal to 10 μms, or less than or equal to 7.5 μms. Π may be greater than or equal to 1 μms, greater than or equal 1.5 µms, greater than or equal to 2.0 µms, greater than or equal to 2.5 µms, greater than or equal to 3.0 µms, or greater than or equal to 3.5 µms. The value of Π may be in the range of 1.5 to 20 µms, in the range of 2.0 to 15 µms, in the range of 2.5 to 12 µms, or in the range of 3.0 to 9 µms. In a specific example, the value of Π is in the range of 3.5 to 7.5 µms.

A steady-state mechanical speed of rotation of the rotor when the stator coils are receiving current at the maximum electrical frequency, $f_{max}$, may be less than or equal to 1,500 rpm. The speed may be less than or equal to 1,400 rpm, less than or equal to 1,300 rpm, less than or equal to 1,200 rpm, less than or equal to 1,100 rpm, less than or equal to 1,000 rpm, or less than or equal to 900 rpm. The speed may be greater than or equal to 500 rpm, greater than or equal to 600 rpm, or greater than or equal to 700 rpm. In other examples, the speed may be in a range of 500 to 1,500 rpm, in a range of 600 to 1,400 rpm, in a range of 700 to 1,300 rpm, or in a range of 900 to 1,200 rpm.

As noted previously, the electrical machine may have a cooling system configured to supply, in use, a flow of coolant to remove heat from the electrical machine (e.g., from the stator coils and, optionally, the rotor). The coolant has a specific heat capacity of $C_p$ at ISA sea level conditions. The coolant may be a liquid (e.g., an oil) or air (e.g., ambient air). The coolant may be supplied at a mass flow rate of $\dot{m}_{coolant}$ (measured in kgs$^{-1}$) that may vary during operation. A cooling rate, $C_{cool}$, that may be referred to as the heat capacity cooling rate (with units of Js$^{-1}$K$^{-1}$) is defined as a product of the coolant heat capacity $C_p$ and the mass flow rate $\dot{m}_{coolant}$.

The cooling system may be configured to supply the flow of coolant at a mass flow rate of at least $\dot{m}_{coolant} = \dot{m}_{max,cont}$ when the electrical machine is producing the maximum continuous rated torque, $T_{max,cont}$. The mass flow rate $\dot{m}_{max,cont}$ is the minimum mass flow rate of the coolant, which has specific heat capacity $C_p$ at ISA sea level conditions, required to maintain the insulation of the stator coils at or below a maximum rated insulation temperature $\theta_{ins,max}$.

The maximum continuous rated torque $T_{max,cont}$ may be greater than or equal to 650 Nm and yet a cooling rate $C_{max,cont}$, defined as the product of the coolant specific heat capacity, $C_p$, at ISA sea level conditions and the mass flow rate, $\dot{m}_{max,cont}$, may be less than or equal to 680 Js$^{-1}$K$^{-1}$. Additionally, or alternatively, a ratio defined as the maximum continuous rated torque $T_{max,cont}$ divided by the cooling rate $C_{max,cont}$ may be greater than or equal to 2 sK (e.g., in the range 2 to 10 sK).

A machine parameter $\nabla$ may be defined as:

$$\nabla = \frac{\tau_{max,cont}}{m_{act} \times C_{max,cont}} \quad (12)$$

According to the present disclosure, a value of $\nabla$ may be greater than or equal to 0.1 Kskg$^{-1}$ (Kelvin-seconds per kilogram) (e.g., $\nabla$ may be in the range of 0.1 to 0.8 Kskg$^{-1}$).

The value of $\nabla$ may be greater than or equal to 0.15 Kskg$^{-1}$, greater than or equal to 0.18 Kskg$^{-1}$, greater than or equal to 0.20 Kskg$^{-1}$, greater than or equal to 0.22 Kskg$^{-1}$, greater than or equal to 0.25 Kskg$^{-1}$, or greater than or equal to 0.30 Kskg$^{-1}$. The value of $\nabla$ may be less than or equal to 0.7 Kskg$^{-1}$, less than or equal to 0.65 Kskg$^{-1}$, less than or equal to 0.6 Kskg$^{-1}$, less than or equal to 0.5 Kskg$^{-1}$, or less than or equal to 0.4 Kskg$^{-1}$. $\nabla$ may be in the range of 0.11 to 0.7 Kskg$^{-1}$, in the range of 0.14 to 0.65 Kskg$^{-1}$, or in the range of 0.18 to 0.4 Kskg$^{-1}$. In a specific example, $\nabla$ is in the range of 0.22 to 0.35 Kskg$^{-1}$.

A machine parameter $\nabla^*$ may be defined as:

$$\nabla^* = \frac{\tau_{max,cont}}{(m_{act} + m_{cool}) \times C_{max,cont}} \quad (13)$$

According to the present disclosure, a value of $\nabla^*$ may be greater than or equal to 0.08 Kskg$^{-1}$ (e.g., $\nabla^*$ may be in the range of 0.08 to 0.7 Kskg$^{-1}$).

The value of $\nabla^*$ may be greater than or equal to 0.10 Kskg$^{-1}$, greater than or equal to 0.12 Kskg$^{-1}$, greater than or equal to 0.14 Kskg$^{-1}$, greater than or equal to 0.15 Kskg$^{-1}$, greater than or equal to 0.16 Kskg$^{-1}$, or greater than or equal to 0.17 Kskg$^{-1}$. The value of $\nabla^*$ may be less than or equal to 0.6 Kskg$^{-1}$, less than or equal to 0.55 Kskg$^{-1}$, less than or equal to 0.5 Kskg$^{-1}$, less than or equal to 0.4 Kskg$^{-1}$, or less than or equal to 0.3 Kskg$^{-1}$. $\nabla^*$ may be in the range of 0.11 to 0.55 Kskg$^{-1}$, in the range of 0.13 to 0.45 Kskg$^{-1}$, or in the range of 0.15 to 0.3 Kskg$^{-1}$. In a specific example, $\nabla^*$ is in the range of 0.17 to 0.27 Kskg$^{-1}$.

The electrical machine may have an efficiency of η while producing the maximum continuous rated torque, $\tau_{max,cont}$ at ISA sea level conditions.

A machine parameter Z may be defined as:

$$Z = \frac{\cos(\phi) \times m_{act}}{\eta} \quad (14)$$

According to the present disclosure, a value of Z may be less than or equal to 30 kg. For example, Z may be in the range of 5 to 30 kg.

The value of Z may be less than or equal to 25 kg, less than or equal to 20 kg, less than or equal to 17 kg, less than or equal to 15 kg, or less than or equal to 13 kg. The value of Z may be greater than or equal to 7 kg, greater than or equal to 8 kg, greater than or equal to 9 kg, or greater than or equal to 10 kg. The value of Z may be in the range of 7 to 25 kg, in the range of 7.5 to 20 kg, in the range of 8 to 17 kg, in the range of 8.5 to 15 kg, or in the range of 9 to 14 kg. In a specific example, the value of Z is in the range of 9.5 to 13.5 kg.

A machine parameter Z* may be defined as:

$$Z^* = \frac{\cos(\phi) \times (m_{act} + m_{cool})}{\eta} \quad (15)$$

According to the present disclosure, a value of Z* may be less than or equal to 35 kg. For example, Z* may be in the range of 6 to 35 kg.

The value of Z* may be less than or equal to 30 kg, less than or equal to 25 kg, less than or equal to 20 kg, less than or equal to 19 kg, or less than or equal to 17 kg. The value of Z* may be greater than or equal to 8 kg, greater than or equal to 9 kg, greater than or equal to 10 kg, or greater than or equal to 11 kg. The value of Z* may be in the range of 8 to 22 kg, in the range of 9 to 19 kg, in the range of 10 to 18 kg, in the range of 10.5 to 17.5 kg, or in the range of 11 to 17 kg. In a specific example, the value of Z* is in the range of 11.5 to 16.5 kg.

The electrical machine may carry a continuous rated current of $I_{cont}$ when producing the maximum continuous rated torque, $\tau_{max,cont}$. The electrical machine may carry a peak rated current $I_{peak}$ when producing the peak rated torque, $\tau_{peak}$. As used herein, the term "peak rated current" refers to an RMS current corresponding to the peak torque and not to a maximum value of an AC sine wave.

The electrical machine may carry a steady-state current of $I_{sc}$ when subject to a steady-state terminal short circuit condition. In other words, when terminals of the electrical machine are short circuited, following an initial transient, the current carried by the stator coils settles to $I_{sc}$.

A dimensionless machine parameter $\zeta$ may be defined as:

$$\xi = \frac{I_{SC}}{I_{peak}} \tag{16}$$

According to the present disclosure, the value of $\zeta$ may be in the range of 0.5 to 1.2.

The value of $\zeta$ may be less than or equal to 1.2, less than or equal to 1.1, less than or equal to 1.0, or less than or equal to 0.95. The value of $\zeta$ may be greater than or equal to 0.55, greater than or equal to 0.6, or greater than or equal to 0.65. $\zeta$ may be in the range of 0.6 to 1.1, in the range of 0.7 to 0.95, or in the range of 0.65 to 1.0. In a specific example, is in the range of 0.7 to 0.9.

The stator coils may be insulated. A maximum temperature of the insulation when carrying the maximum continuous rated current $I_{cont}$ at ISA sea level conditions is equal to $\theta_{ins}(I_{cont})$. A maximum temperature of the insulation when carrying the steady-state terminal short circuit current at ISA sea level conditions may be equal to $\theta_{ins}(I_{sc})$. $\theta_{ins}(I_{cont})$ may be less than or equal to the maximum rated temperature of the insulation, $\theta_{ins,max}$.

A dimensionless machine parameter $\zeta$ may be defined as:

$$\zeta = \frac{\theta_{ins}(I_{SC})}{\theta_{ins}(I_{cont})} \tag{17}$$

According to the present disclosure, a value of $\zeta$ may be less than or equal to 1.3. For example, $\zeta$ may be in the range of 0.5 to 1.3.

The value of $\zeta$ may be less than or equal to 1.2, less than or equal to 1.1, less than or equal to 1.0, less than or equal to 0.95, less than or equal to 0.9, or less than or equal to 0.85. The value of $\zeta$ may be greater than or equal to 0.55, greater than or equal to 0.6, greater than or equal to 0.65, greater than or equal to 0.7, or greater than or equal to 0.75. $\zeta$ may be in the range of 0.6 to 1.2, in the range of 0.7 to 1.1, or in the range of 0.8 to 1.0. In a specific example, $\zeta$ is in the range of 0.85 to 0.95.

The electrical machine has an inductance equal to $L_{machine}$. The inductance $L_{machine}$ may be determined by measuring the current response to an AC voltage excitation using the equation:

$$V = L_{machine} \times \frac{dI}{dt} \tag{18}$$

A machine parameter $\beta$ may be defined as:

$$\beta = L_{machine} \times P_{act} \tag{19}$$

According to the present disclosure, a value of $\beta$ may be greater than or equal to 1.5 mHNmkg$^{-1}$ (1.5 milli Henry Newton meters per kilogram). For example, $\beta$ may be in the range of 1.5 to 15 mHNmkg$^{-1}$.

The value of $\beta$ may be greater than or equal to 1.6 mHNmkg$^{-1}$, greater than or equal to 1.8 mHNmkg$^{-1}$, greater than or equal to 2.0 mHNmkg$^{-1}$, greater than or equal to 2.2 mHNmkg$^{-1}$, greater than or equal to 2.4 mHNmkg$^{-1}$, greater than or equal to 2.6 mHNmkg$^{-1}$, greater than or equal to 3.0 mHNmkg$^{-1}$, or greater than or equal to 3.5 mHNmkg$^{-1}$. The value of $\beta$ may be less than or equal to 12 mHNmkg$^{-1}$, less than or equal to 10 mHNmkg$^{-1}$, less than or equal to 8 mHNmkg$^{-1}$, or less than or equal to 6 mHNmkg$^{-1}$. $\beta$ may be in the range of 1.7 to 8 mHNmkg$^{-1}$, in the range of 2.1 and 7 mHNmkg$^{-1}$, or in the range of 2.4 to 6.5 mHNmkg$^{-1}$. In a specific example, is in the range of 2.8 to 5.8 mHNmkg$^{-1}$.

A machine parameter may be defined as:

$$\lambda = \frac{\eta \times L_{machine}}{m_{act}} \tag{20}$$

According to the present disclosure, a value of may be greater than or equal to 1.4 µHkg$^{-1}$ (1.4×10$^{-6}$ Henrys per kilogram). For example, A may be in the range of 1.4 to 7.5 µHkg$^{-1}$.

The value of $\lambda$ may be greater than or equal to 1.6 µHkg$^{-1}$, greater than or equal to 1.8 µHkg$^{-1}$, greater than or equal to 2.0 µHkg$^{-1}$, greater than or equal to 2.2 µHkg$^{-1}$, greater than or equal to 2.4 µHkg$^{-1}$, or greater than or equal to 2.6 µHkg$^{-1}$. The value of $\lambda$ may be less than or equal to 7.0 µHkg$^{-1}$, less than or equal to 6.8 µHkg$^{-1}$, less than or equal to 6.5 µHkg$^{-1}$, less than or equal to 6.0 µHkg$^{-1}$, less than or equal to 5.5 µHkg$^{-1}$, less than or equal to 5.0 µHkg$^{-1}$, less than or equal to 4.5 µHkg$^{-1}$, or less than or equal to 4.0 µHkg$^{-1}$. $\lambda$ may be in the range of 1.4 to 6.8 µHkg$^{-1}$, in the range of 1.6 to 6.0 µHkg$^{-1}$, in the range of 1.9 to 5.0 µHkg$^{-1}$, or in the range of 2.2 to 4.5 µHkg$^{-1}$. In a specific example, $\lambda$ is in the range of 2.4 to 3.8 µHkg$^{-1}$.

A machine parameter $\lambda^*$ may be defined as:

$$\lambda^* = \frac{\eta \times L_{machine}}{(m_{act} + m_{cool})} \tag{21}$$

According to the present disclosure, a value of $\lambda^*$ may be greater than or equal to 1.1 µHkg$^{-1}$. For example, $\lambda^*$ may be in the range of 1.1 to 6.5 µHkg$^{-1}$.

The value of $\lambda^*$ may be greater than or equal to 1.3 µHkg$^{-1}$, greater than or equal to 1.5 µHkg$^{-1}$, greater than or equal to 1.7 µHkg$^{-1}$, greater than or equal to 1.9 µHkg$^{-1}$, or greater than or equal to 2.1 µHkg$^{-1}$. The value of $\lambda^*$ may be less than or equal to 6.0 µHkg$^{-1}$, less than or equal to 5.5 µHkg$^{-1}$, less than or equal to 5.0 µHkg$^{-1}$, less than or equal to 4.5 µHkg$^{-1}$, less than or equal to 4.0 µHkg$^{-1}$, less than or equal to 3.5 µHkg$^{-1}$, or less than or equal to 3.0 µHkg$^{-1}$. $\lambda^*$ may be in the range of 1.1 to 5.3 µHkg$^{-1}$, in the range of 1.4 to 4.8 µHkg$^{-1}$, in the range of 1.6 to 4.4 µHkg$^{-1}$, or in the range of 1.8 to 3.2 µHkg$^{-1}$. In a specific example, $\lambda^*$ is in the range of 2.0 to 3.0 µHkg$^{-1}$.

The electrical machine may have an active parts diameter equal to $D_{act}$. The active parts diameter is a diameter corresponding to a radially outermost component of the electrical machine that contributes to producing the torque (or contributes to generating the electrical power if the machine is configured to operate as an electric generator).

The electrical machine may be configured so that the rotor rotates at a speed of $\omega_{mech,cont}$ when producing the maximum continuous rated torque, $\tau_{max,cont}$.

A dimensionless figure of merit, F, of the electrical machine may be defined as:

$$F = \frac{\tau_{max,cont}}{m_{act}} \frac{p_{air,0}}{C_p \dot{m}_{max,cont}(\theta_{ins,max} - \theta_{air,0})} \frac{2\pi \times D_{ref}}{\omega_{mech,cont}} \left(\frac{D_{ref}}{D_{act}}\right)^2 \quad (22)$$

In the above equation, pairs), $p_{air,0}$, $\theta_{air,0}$ and $D_{ref}$ are constants. Specifically, $p_{air,0}$ is a nominal ambient air pressure equal to 100 kPa, $\theta_{air,0}$ is a nominal ambient air temperature equal to 318 Kelvin, and $D_{ref}$ is a nominal active parts diameter equal to 0.5 meters. The value of $\omega_{mech,cont}$ is measured in radians per second (rads$^{-1}$).

The electrical machine according to the present disclosure may have a value of F greater than or equal to 1.9. For example, F may be in the range of 1.9 to 17.

The value of F may be greater than or equal to 2.1, greater than or equal to 2.3, greater than or equal to 2.5, greater than or equal to 2.7, greater than or equal to 3.0, greater than or equal to 3.5, greater than or equal to 4.0, or greater than or equal to 4.5. The value of F may be less than or equal to 17, less than or equal to 15, less than or equal to 13, less than or equal to 11, less than or equal to 9, or less than or equal to 7. The value of F may be in the range of 2.3 to 16, in the range of 2.5 to 13, in the range of 2.7 to 11, in the range of 2.9 to 7, or in the range of 3.3 to 6.8. In a specific example, F is in the range of 3.8 to 6.5.

A modified figure of merit, F*, may be defined as:

$$F^* = \frac{\tau_{max,cont}}{(m_{act} + m_{cool})} \frac{p_{air,0}}{C_p \dot{m}_{max,cont}(\theta_{ins,max} - \theta_{air,0})} \frac{2\pi \times D_{ref}}{\omega_{mech,cont}} \left(\frac{D_{ref}}{D_{act}}\right)^2 \quad (23)$$

According to the present disclosure, a value of F* may be greater than or equal to 1.6. For example, F* may be in the range of 1.6 to 14.

The value of F* may be greater than or equal to 1.8, greater than or equal to 2.0, greater than or equal to 2.2, greater than or equal to 2.4, greater than or equal to 2.8, greater than or equal to 3.2, greater than or equal to 3.6, or greater than or equal to 3.8. The value of F* may be less than or equal to 12, less than or equal to 10, less than or equal to 8, less than or equal to 7, or less than or equal to 5.5. The value of F* may be in the range of 2.0 to 10, in the range of 2.2 to 9, in the range of 2.4 to 8, in the range of 2.6 to 7, or in the range of 2.8 to 6.0. In a specific example, F* is in the range of 3.0 to 5.5.

In a VTOL aircraft, a take-off parameter x may be defined as:

$$\chi = \frac{v_{tip} \times m_{act}}{\tau_{peak}} \quad (24)$$

In the above equation, $v_{tip}$ is the maximum tip speed, measured in ms$^{-1}$, of the propeller or fan of the EPU to occur during a vertical take-off operation of the VTOL aircraft. This is equal to 2π multiplied by a radius of the propeller or fan of the EPU divided by the mechanical frequency (in Hz) of rotation of the propeller or fan. In a directly driven EPU arrangement, the mechanical frequency of rotation of the propeller or fan is equal to the mechanical frequency of rotation of the rotor of the electrical machine. In an indirectly driven arrangement, the mechanical frequency of rotation of the propeller or fan will be different from (e.g., differ by a gear ratio from) the mechanical frequency of rotation of the rotor of the electrical machine.

According to the present disclosure, a value of x may be less than or equal to 7.5 sm$^{-1}$ (9.0 seconds per meter). For example, x may be in the range of 0.5 to 7.5 sm$^{-1}$.

The value of x may be less than or equal to 6.5 sm$^{-1}$, less than or equal to 6.0 sm$^{-1}$, less than or equal to 5.5 sm$^{-1}$, less than or equal to 5.0 sm$^{-1}$, less than or equal to 4.5 sm$^{-1}$, less than or equal to 4.0 sm$^{-1}$, less than or equal to 3.5 sm$^{-1}$, less than or equal to 3.0 sm$^{-1}$, or less than or equal to 2.5 sm$^{-1}$. The value of x may be greater than or equal to 0.75 sm$^{-1}$, greater than or equal to 1.0 sm$^{-1}$, greater than or equal to 1.25 sm$^{-1}$, greater than or equal to 1.5 sm$^{-1}$, or greater than or equal to 1.75 sm$^{-1}$. The value of x may be in the range of 0.8 to 4.3 sm$^{-1}$, in the range of 1.2 to 3.8 sm$^{-1}$, in the range of 1.4 to 3.2 sm$^{-1}$, or in the range of 1.6 to 2.5 sm$^{-1}$. In a specific example, X is in the range of 1.8 and 2.4 sm$^{-1}$.

A take-off parameter x* may be defined as:

$$\chi^* = \frac{v_{tip} \times (m_{act} + m_{cool})}{\tau_{peak}} \quad (25)$$

According to the present disclosure, a value of x* may be less than or equal to 9.0 sm$^{-1}$. For example, x* may be in the range of 1.1 to 9.0 sm$^{-1}$.

The value of x* may be less than or equal to 8.0 sm$^{-1}$, less than or equal to 7.0 sm$^{-1}$, less than or equal to 6.0 sm$^{-1}$, less than or equal to 5.5 sm$^{-1}$, less than or equal to 5.0 sm$^{-1}$, less than or equal to 4.5 sm$^{-1}$, less than or equal to 4.0 sm$^{-1}$, less than or equal to 3.5 sm$^{-1}$, or less than or equal to 3.0 sm$^{-1}$. The value of x* may be greater than or equal to 1.2 sm$^{-1}$, greater than or equal to 1.4 sm$^{-1}$, greater than or equal to 1.6 sm$^{-1}$, greater than or equal to 1.8 sm$^{-1}$, or greater than or equal to 2.0 sm$^{-1}$. The value of x* may be in the range of 1.1 to 5.3 sm$^{-1}$, in the range of 1.4 to 5.1 sm$^{-1}$, in the range of 1.6 to 4.5 sm$^{-1}$, or in the range of 1.8 to 4.0 sm$^{-1}$. In a specific example, X* is in the range of 2.0 to 3.0 sm$^{-1}$.

In a VTOL aircraft, a hover parameter Ψ may be defined as:

$$\Psi = \frac{\tau_{hover}}{\omega_{hover}} \quad (26)$$

In the above equation, $\tau_{hover}$ is the continuous torque produced by the motor while the VTOL aircraft is hovering. $\omega_{hover}$ is the continuous angular speed of rotation of the rotor of the motor while the VTOL aircraft is hovering, measured in radians per second. The term "hovering" refers to a state in which the EPU(s) of the aircraft are producing sufficient thrust to lift the weight of the VTOL aircraft and maintain a constant altitude above ground, with substantially no lateral movement and without requiring airframe (e.g., wing-borne) lift. According to the present disclosure, a value of Ψ may be greater than or equal to 5 Nmsrad$^{-1}$ (5 Newton meter seconds per radian) (e.g., in a range of 5 to 20 Nmsrad$^{-1}$). In a group of examples in which the hover parameter Ψ is in one of the above-described ranges, the VTOL aircraft may have a direct drive EPU (e.g., with no rotational speed changing mechanisms or devices, such as a transmission) between the motor and the propeller.

The value of W may be greater than or equal to 6 Nmsrad$^{-1}$, greater than or equal to 7 Nmsrad$^{-1}$, greater than or equal to 8 Nmsrad$^{-1}$, greater than or equal to 9 Nmsrad$^{-1}$, or greater than or equal to 9.5 Nmsrad$^{-1}$. The value of Ψ may be less than or equal to 18 Nmsrad$^{-1}$, less than or equal to 16 Nmsrad$^{-1}$, less than or equal to 14 Nmsrad$^{-1}$, less than or equal to 13 Nmsrad$^{-1}$, or less than or equal to 12 Nmsrad$^{-1}$. The value of W may be in the range of 6 to 16.5 Nmsrad$^{-1}$, in the range of 7 to 15 Nmsrad$^{-1}$, in the range of 8 to 13 Nmsrad$^{-1}$, or in the range of 9 to 11 Nmsrad$^{-1}$. In a specific example, W is in the range of 9.4 to 10.4 Nmsrad$^{-1}$.

The maximum continuous rated power of the electrical machine, $P_{cont}$, may be in the range of 50 to 400 kW. $P_{cont}$ may be in the range of 60 to 350 kW, in the range of 60 to 300 kW, in the range of 75 to 250 kW, in the range of 85 to 225 kW, or in the range of 90 to 175 kW.

The peak rated power of the electrical machine, $P_{peak}$, may be in the range of 60 to 450 kW, in the range of 70 to 400 kW, in the range of 75 to 350 kW, in the range of 80 to 300 kW, in the range of 85 to 250 kW, or in the range of 90 to 225 kW.

The maximum continuous rated torque, $\tau_{max,cont}$, may be greater than or equal to 700 Nm, greater than or equal to 750 Nm, in the range of 700 to 1,800 Nm, in the range of 800 to 1,700 Nm, in the range of 900 to 1,600 Nm, in the range of 1,000 to 1,500 Nm, or in the range of 1,100 to 1,450 Nm. In a specific example, $\tau_{max,cont}$ is in the range of 1,150 to 1,400 Nm.

The peak rated torque, $\tau_{peak}$, may be greater than or equal to 800 Nm, in the range of 800 to 2,000 Nm, in the range of 900 to 1,900 Nm, in the range of 1,000 to 1,800 Nm, in the range of 1,100 to 1,700 Nm, or in the range of 1,200 to 1,650 Nm. In a specific example, $\tau_{peak}$ is in the range of 1,300 to 1,600 Nm.

A ratio equal to the maximum continuous rated torque, $\tau_{max,cont}$, divided by the peak rated torque, $\tau_{peak}$, may be greater than or equal to 0.75, greater than or equal to 0.8, greater than or equal to 0.85, or greater than or equal to 0.9.

The hover torque, $\tau_{hover}$, may be in the range of 500 to 1,500 Nm, in the range of 600 to 1,400 Nm, in the range of 500 to 1,300 Nm, in the range of 700 to 1,200 Nm, or in the range of 750 to 1,150 Nm. In a specific example, $\tau_{hover}$ is in the range of 850 to 1,000 Nm.

The active parts mass, $m_{act}$, may be greater than or equal to 9 kg, greater than or equal to 10 kg, less than or equal to 30 kg, less than or equal to 25 kg, less than or equal to 22 kg, less than or equal to 20 kg, less than or equal to 18 kg, or less than or equal to 16 kg. The active parts mass, $m_{act}$, may be in the range of 10 to 30 kg or in the range of 9 to 16 kg.

The cooling system mass, $m_{cool}$, may be less than or equal to 12 kg, less than or equal to 11 kg, less than or equal to 10 kg, less than or equal to 9 kg, less than or equal to 8 kg, less than or equal to 7 kg, less than or equal to 6 kg, or less than or equal to 5 kg. The electrical machine may be air cooled.

The slot current density at peak rated torque, $J_{slot,peak}$, may be less than or equal to 15 A(mm)$^{-2}$, less than or equal to 14 A(mm)$^{-2}$, less than or equal to 13 A(mm)$^{-2}$, less than or equal to 12 A(mm)$^{-2}$, less than or equal to 11 A(mm)$^{-2}$, less than or equal to 10.5 A(mm)$^{-2}$, less than or equal to 10 A(mm)$^{-2}$, less than or equal to 9.5 A(mm)$^{-2}$ less than or equal to 9 A(mm)$^{-2}$, less than or equal to 8 A(mm)$^{-2}$, or less than or equal to 7 A(mm)$^{-2}$. $J_{slot,peak}$ may be greater than or equal to 3 A(mm)$^{-2}$, greater than or equal to 4 A(mm)$^{-2}$ or greater than or equal to 3 A(mm)$^{-2}$.

The peak current, $I_{peak}$, may be less than or equal to 500 A, less than or equal to 450 A, less than or equal to 400 A, less than or equal to 350 A, less than or equal to 330 A, less than or equal to 300 A, less than or equal to 270A, or less than or equal to 250 A. $I_{peak}$ may be in the range of 160 A to 400 A, in the range of 170 A to 370 A, in the range of 180 A to 340 A, or in the range of 190 A to 310 A. In one example, $I_{peak}$ is in the range of 200 A to 280 A. The values are RMS values.

The continuous rated current, $I_{cont\,max}$ may be less than or equal to 300 A, less than or equal to 250 A, less than or equal to 230 A, less than or equal to 220 A, or less than or equal to 210 A. $I_{cont\,max}$ may be in the range of 130 A to 260 A, in the range of 140 A to 250 A, in the range of 150 A to 240 A, or in the range of 160 A to 230 A. The values are RMS values.

The steady-state terminal short circuit current, $I_{sc}$, per phase, may be less than or equal to 270 A, less than or equal to 250 A, less than or equal to 230 A, less than or equal to 210 A, less than or equal to 200 A, or less than or equal to 190 A. $I_{sc}$ may be in the range of 110 A to 240 A, in the range of 120 A to 230 A, in the range of 130 A to 220 A, or in the range of 165 A to 210 A. The values are RMS values.

The coolant may be air, which has a specific heat capacity, $C_p$, of approximately 1,006 Jkg$^{-1}$K$^{-1}$ at ISA sea level conditions. Alternatively, the coolant may be a liquid (e.g., an oil). In a specific example, the coolant is a mineral oil with a specific heat capacity of approximately 1745 Jkg$^{-1}$K$^{-1}$ at ISA sea level conditions.

The coolant mass flow rate, $\dot{m}_{max,cont}$, may be at least 0.15 kgs$^{-1}$, at least 0.20 kgs$^{-1}$, at least 0.25 kgs$^{-1}$, or at least 0.3 kgs$^{-1}$. The coolant mass flow rate $\dot{m}_{cont,max}$ may be less than or equal to 2.5 kgs$^{-1}$, less than or equal to 1.0 kgs$^{-1}$, less than or equal to 0.75 kgs$^{-1}$, or less than or equal to 0.5 kgs$^{-1}$. The mass flow rate may be in the range of 0.15 to 0.50 kgs$^{-1}$.

The heat capacity cooling rate at maximum continuous rated torque, $C_{max,cont}$ may be less than or equal to 600 Js$^{-1}$K$^{-1}$, less than or equal to 500 Js$^{-1}$K$^{-1}$, or less than or equal to 480 Js$^{-1}$K$^{-1}$. $C_{max,cont}$ may be in the range of 150 to 450 Js$^{-1}$K$^{-1}$, in the range of 180 to 420 Js$^{-1}$K$^{-1}$, in the range of 200 to 400 Js$^{-1}$K$^{-1}$, in the range of 220 to 380 Js$^{-1}$K$^{-1}$, or in the range of 230 to 350 Js$^{-1}$K$^{-1}$. In an example, $C_{max,cont}$ is in the range of 260 to 340 Js$^{-1}$K$^{-1}$.

The efficiency, η, of the electrical machine when producing the continuous rated torque, $T_{max,cont}$, may be at least 90%. The efficiency may be in the range of 90% to 96% or in the range of 92% to 95%.

The conductor volume, $V_{conductor}$, may be in the range of 10 to 100 cm$^3$, in the range of 15 to 80 cm$^3$, in the range of 20 to 60 cm$^3$, in the range of 25 to 50 cm$^3$, or in the range of 30 to 40 cm$^3$.

The iron volume, $V_{iron}$, may be in the range of 30 to 150 cm$^3$, in the range of 35 to 120 cm$^3$, in the range of 40 to 90 cm$^3$, in the range of 45 to 80 cm$^3$, or in the range of 50 to 70 cm$^3$.

The power factor, cos(φ), may be less than or equal to 0.9. The power factor, cos(φ), may be in the range of 0.6 to 0.9, in the range of 0.6 to 0.85, in the range of 0.65 to 0.85, or in the range of 0.65 to 0.8. In a specific example, the power factor, cos(φ), is in the range of 0.65 to 0.75.

The active parts diameter, $D_{act}$, may be in the range of 0.25 to 1.25 meters, in the range of 0.3 to 1.0 meters, in the range of 0.35 to 0.75 meters, or in the range of 0.4 to 0.6 meters.

The number of rotor poles, $N_P$, may be greater than or equal to 30, greater than or equal to 40, greater than or equal to 50, greater than or equal to 60, greater than or equal to 70, greater than or equal to 80, greater than or equal to 90, greater than or equal to 100, greater than or equal to 110, greater than or equal to 120, greater than or equal to 130, greater than or equal to 140, greater than or equal to 150, greater than or equal to 160, greater than or equal to 170, greater than or equal to 180, greater than or equal to 190, or greater than or equal to 200. The number of rotor poles, $N_P$, may be greater than or equal to 250, greater than or equal to 300, greater than or equal to 350, or greater than or equal to 400. The number of rotor poles, $N_P$, may be less than or equal to 250. The number of rotor poles, $N_P$, may be in in the range of 120 to 250. The pole pair number is equal to half the number of rotor poles (i.e., $N_P$ divided by two).

The rotor pole pitch, $P_\theta$, equal to 360° (2Π radians) divided by the number of rotor poles, or equally 180° (Π radians) divided by the pole pair number, may be less than or equal to 10° (0.174 radians). $P_\theta$ may be less than or equal to 9° (0.157 radians), less than or equal to 8° (0.140 radians), less than or equal to 7° (0.122 radians), less than or equal to 6° (0.105 radians), less than or equal to 5° (0.087 radians), less than or equal to 4° (0.070 radians), or less than or equal to 3° (0.052 radians). $P_\theta$ may be in the range of 1° to 5° (in the range of 0.02 to 0.09 radians).

The rotor pole arc length, $P_L$, may be less than or equal to 25 mm, less than or equal to 23 mm, less than or equal to 21 mm, less than or equal to 19 mm, less than or equal to 17 mm, less than or equal to 15 mm, less than or equal to 13 mm, less than or equal to 12 mm, less than or equal to 11 mm, less than or equal to 10 mm, less than or equal to 9 mm, less than or equal to 8 mm, less than or equal to 7 mm, or less than or equal to 6 mm. $P_L$ may be in the range of 3 to 15 mm, in the range of 4 to 12 mm, or in the range of 5 to 10 mm.

The (or each) air gap, $G_{Air}$, may be less than or equal to 2 mm, less than or equal to 1.8 mm, less than or equal to 1.6 mm, less than or equal to 1.4 mm, less than or equal to 1.2 mm, less than or equal to 1.0 mm, less than or equal to 0.9 mm, less than or equal to 0.8 mm, or less than or equal to 0.7 mm. $G_{Air}$ may be in the range of 0.4 to 1.5 mm, in the range of 0.45 to 1.3 mm, in the range of 0.5 to 1.1 mm, or in the range of 0.6 to 1.0 mm.

The inductance of the electrical machine, $L_{machine}$, may be in the range of 15 to 100 μH, in the range of 20 to 90 μH, in the range of 30 to 80 μH, or in the range of 40 to 70 μH.

The maximum rated temperature of the insulation, $\theta_{ins, max}$, may be greater than or equal to 370 K. $\theta_{ins, max}$ may be in the range of 400 to 550 K, in the range of 410 to 540 K, in the range of 420 to 530 K, or in the range of 430 to 520 K.

The maximum frequency of the current received by the stator coils from an DC:AC converter during operation of the electrical machine, $f_{max}$, may be greater than or equal to 1.0 kHz, greater than or equal to 1.1 kHz, greater than or equal to 1.2 kHz, greater than or equal to 1.3 kHz, greater than or equal to 1.4 kHz, or greater than or equal to 1.5 kHz. $f_{max}$ may be in the range of 1.0 to 2.0 kHz, in the range of 1.1 to 1.9 kHz, in the range of 1.2 to 1.8 kHz, or in the range of 1.25 to 1.75 kHz.

The angular speed of rotation of rotor of the electrical machine, $\omega_{mech,cont}$, when the electrical machine is producing the maximum continuous rated torque, $\tau_{max,cont}$, may be less than 200 rads$^{-1}$. $\tau_{max,cont}$ may be in the range of 75 to 150 rads$^{-1}$ (in the range of 716 to 1432 rpm), in the range of 80 to 140 rads$^{-1}$ (in the range of 764 to 1337 rpm), in the range of 90 to 130 rads$^{-1}$ (in the range of 859 to 1241 rpm), or in the range of 100 to 120 rads$^{-1}$ (in the range of 955 to 1146 rpm).

The angular speed of rotation of rotor of the electrical machine, $\omega_{hover}$, while the VTOL aircraft is hovering may be less than or equal to 160 rads$^{-1}$ (less than or equal to 1527 rpm). $\omega_{hover}$ may be in the range of 75 to 200 rads$^{-1}$ (in the range of 668 to 1910 rpm), in the range of 65 to 140 rads$^{-1}$ (in the range of 621 to 1337 rpm), in the range of 70 to 130 rads$^{-1}$ (in the range of 668 to 1241 rpm), in the range of 75 to 120 rads$^{-1}$ (in the range of 716 to 1146 rpm), or in the range of 80 to 110 rads$^{-1}$ (in the range of 764 to 1050 rpm).

The maximum tip speed of the propeller or fan of the VTOL aircraft, $v_{tip}$, during take-off may be in the range of 130 to 250 ms$^{-1}$ (in the range of 0.38 to 0.73 Mach), in the range of 140 to 240 ms$^{-1}$ (in the range of 0.41 to 0.7 Mach), in the range of 150 to 230 ms$^{-1}$ (in the range of 0.43 to 0.67 Mach), in the range of 160 to 220 ms$^{-1}$ (in the range of 0.47 to 0.64 Mach), or in the range of 170 to 210 ms$^{-1}$ (in the range of 0.5 to 0.61 Mach).

The propeller or fan of an EPU may have a diameter of less than or equal to 5.0 meters, less than or equal to 4.5 meters, less than or equal to 4.0 meters, less than or equal to 3.5 meters, less than or equal to 3.0 meters, less than or equal to 2.5 meters, or less than or equal to 2.0 meters. The diameter may be greater than or equal to 1 meter, greater than or equal to 1.5 meters, greater than or equal to 2.0 meters, or greater than or equal to 2.5 meters.

The skilled person will appreciate that except where mutually exclusive, a feature described in relation to any one of the above aspects may be applied mutatis mutandis to any other aspect. Further, except where mutually exclusive, any feature described herein may be applied to any aspect and/or combined with any other feature described herein.

BRIEF DESCRIPTION OF THE DRAWINGS

Embodiments will now be described by way of example only with reference to the accompanying drawings, which are purely schematic and not to scale, and in which:

FIG. 20A is a top-down view of an example of one stator coil of the electrical machine of FIGS. 16-19;

FIG. 20B is a side-on view of the stator coil of FIG. 20A;

DETAILED DESCRIPTION

Figure 1:
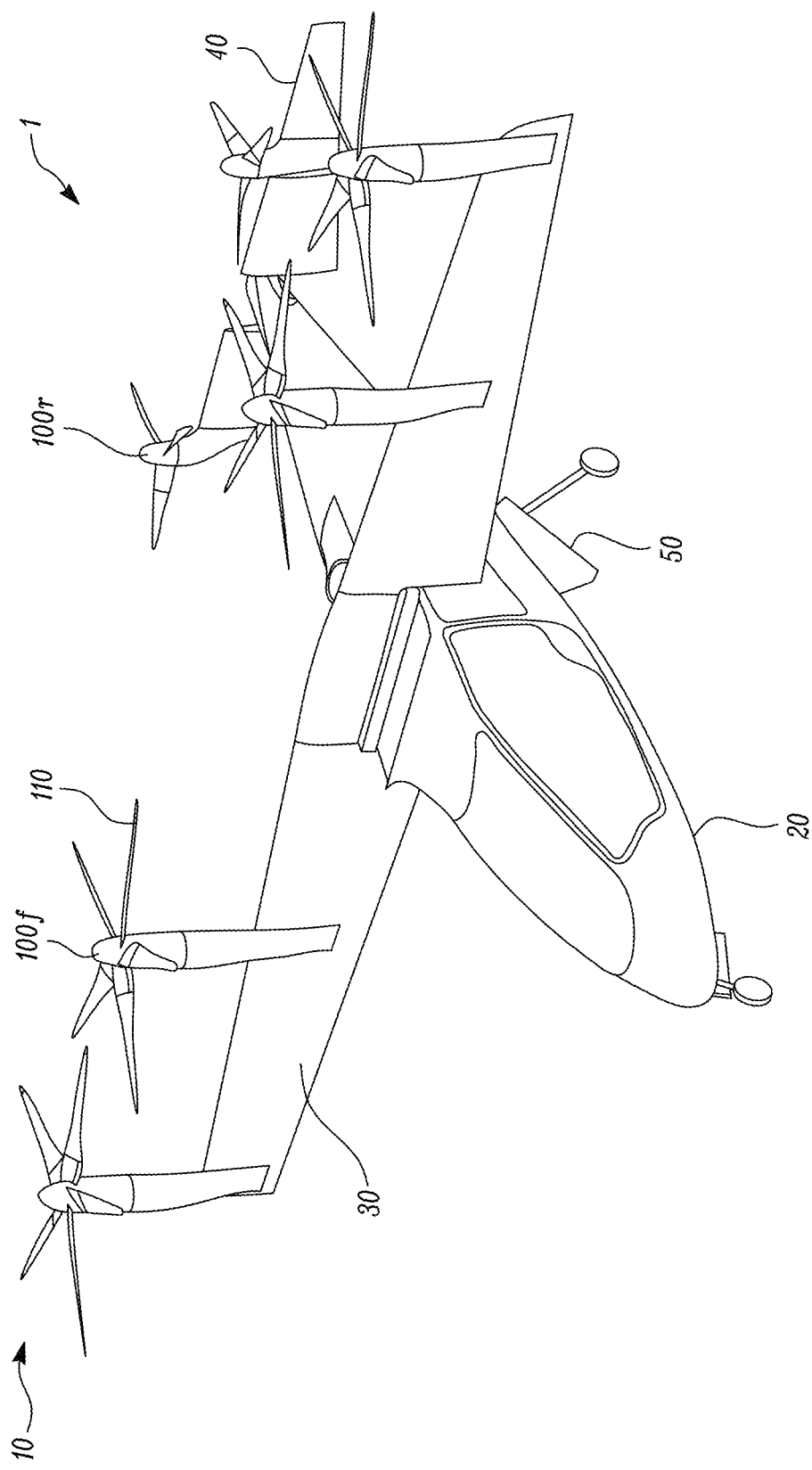
FIG. 1 is a perspective view of an example of a vertical take-off and landing (VTOL) aircraft with six electrical propulsion units (EPUs)

FIG. 1 illustrates a vertical take-off and landing (VTOL) aircraft 1 that may be used for Urban Air Mobility (UAM) applications. The VTOL aircraft 1 includes a fuselage 20 that incorporates a cabin for occupants, wings 30, a rear flight surface 40, and a distributed propulsion system 10. The distributed propulsion system 10 includes six electrical propulsion units (EPUs), four of which are front EPUs 100f and two of which are rear EPUs 100r. Also visible in FIG. 1 is a retractable undercarriage 50 in which a landing platform or gear, in this case having wheels, may be stowed during flight.

The size of the fuselage 20 and the cabin depends on the application requirements. In this example, the cabin is sized for five occupants including a pilot. Some UAM platforms, however, will not require a pilot and will instead be flown under the control of an autopilot system or may be controlled remotely.

Each EPU 100f, 100r has a propeller 110 driven to rotate by an electric motor. The four front EPUs 100f are attached to the wings 30 of the aircraft 1, and the two rear EPUs 100r are attached to the separate flight control surface 40 located towards the rear of the aircraft 1. The wings 30 and the rear control surface 40 are tiltable between a VTOL configuration (shown in FIG. 1) in which the axes of the propellers of the EPUs point upward to provide vertical lift for vertical take-off and landing and a horizontal flight configuration in which the axes of the rotors point forward. The horizontal flight configuration, while principally used for horizontal flight, may also be used for taxiing and possibly short take-off and landing (STOL) operation if supported. In other examples, the wings 30 and/or the rear control surface 40 may be fixed in a horizontal position, and the EPUs attached thereto may be tiltable in order to selectively switch between a horizontal flight mode and a vertical flight mode.

The electrical systems, including the electric motors that drive the EPUs 110f, 110r of the aircraft 1, receive electrical power from one or more battery packs and/or fuel cell packs located within the aircraft 1. The battery packs and fuel cells packs may be located within any suitable part or parts of the aircraft 1, including the EPUs 100f, 100r, the fuselage 20, and the wings 30.

While the illustrated aircraft 1 is a VTOL aircraft, UAM platforms may also be of the STOL or conventional take-off and landing (CTOL) type. Further, while an electric VTOL (eVTOL) aircraft is shown, the propulsion system may be a hybrid-electric propulsion system that includes both engines (e.g., one or more gas turbine engines) and batteries and/or fuel cells. Hybrid-electric platforms may utilize similar distributed propulsion system configurations, but the underlying power system may be a series-hybrid, parallel-hybrid, turboelectric, or other type of hybrid power system.

The configuration of the illustrated VTOL aircraft 1 is merely one example configuration, and other VTOL aircraft configurations are known and will occur to those skilled in the art. For example, a VTOL aircraft may have a different number of EPUs (e.g., eight EPUs, with four front EPUs 100f and four rear EPUs 100r). Alternatively, the VTOL aircraft may have a multi-copter (e.g., quadcopter) configuration in which the propellers or fans of the EPUs may not be tiltable and may be ducted. Other VTOL aircraft may have features of more than one type (e.g., a mix of open and ducted propulsors and/or a mix of tiltable and fixed propulsors). The present disclosure is not limited to any particular type of VTOL aircraft.

Figure 2:
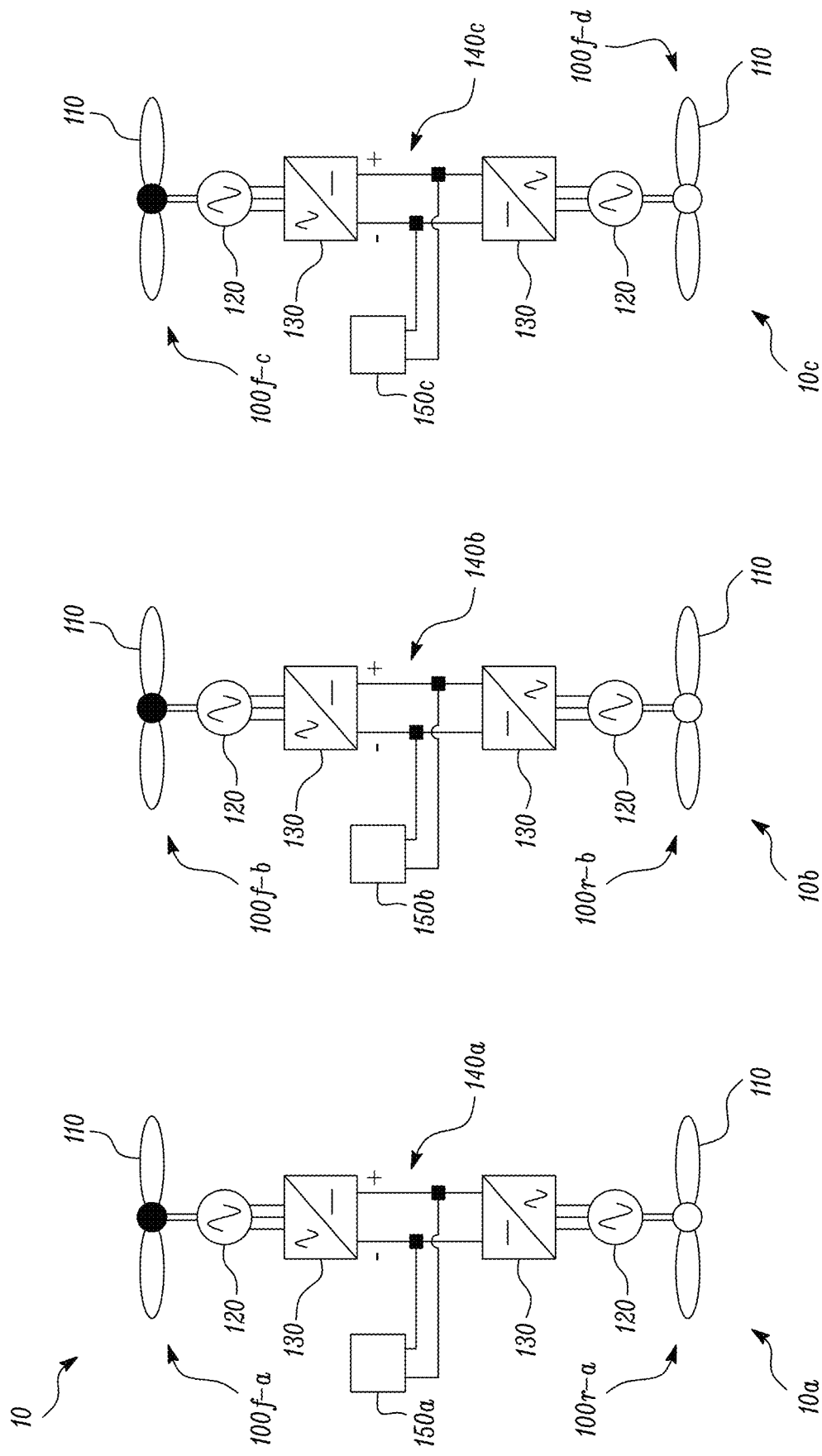
FIG. 2 is a schematic illustration of an example of a propulsion system that may be used in the VTOL aircraft of FIG. 1.

As noted above, each EPU of the six EPUs 100f, 100r includes a propeller or fan 110 driven to rotate by an electric motor that receives electrical power from an onboard power source. In some examples, each motor may receive the electrical power via its own dedicated power channel, possibly from its own dedicated power source (e.g., a battery module). In other examples, some of the EPUs may share a power channel. This is shown in FIG. 2, which is a simplified illustration of an electrical power and propulsion system 10 that may be used in the VTOL aircraft of FIG. 1.

The power and propulsion system 10 includes three power and propulsion sub-systems 10*a*, 10*b*, 10*c*. Each sub-system of the sub-systems 10*a-c* includes two of the six EPUs, and the two EPUs of each sub-system are electrically connected to a shared power channel. The first sub-system 10*a* includes a first of the front EPUs 100*f-a* and a first of the rear EPUs 100*r-a* connected to first power channel 140*a*. The second sub-system 10*b* includes a second of the front EPUs 100*f-b* and a second of the rear EPUs 100*r-b* connected to a second power channel 140*b*. The third sub-system 10*c* includes the remaining two front EPUs 100*f-c*, 100*f-d*, (e.g., one front-left EPU and one front-right EPU), connected to a third power channel 140*c*. Each power channel 140*c* receives DC electrical power from a battery module 150*a-c*. The battery modules 150*a-c* may be physically separate from one another or may be part of a common battery pack that outputs three separate power channels 140*a-c*.

In the present example, the power channels 140*a-c* receive the DC electrical power directly from the battery modules 150*a-c*. In other examples, the battery modules 150*a-c* may interface with the power channels 140*a-c* via DC:DC power electronics converters. This may allow the DC voltage level of the power channels to be kept substantially constant as the state of charge of the battery modules 150*a-c* decreases. Also, while in the present example the sole power source is in the form of battery energy storage 150*a-c*, alternative examples may include only fuel cells, or a mix of fuel cells and battery energy storage. In a hybrid system, the power source may include one or more engine-driven electric generators interfacing with the DC power channels via DC:AC power electronics converters (e.g., rectifiers).

Each EPU 100*f-a*, 100*f-b*, 100*f-c*, 100*f-d*, 100*r-a*, 100*r-b* includes a propeller or fan 110 with rotation that is driven by an electric motor 120. The motor 120 receives AC electrical power from a DC:AC power electronics converter 130 (e.g., an inverter 130). The inverter 130 receives DC electrical power from its power channel 140*a-c* and converts the DC electrical power to AC electrical power for supply to its motor 120.

Aircraft and power and propulsion systems of the aircraft are subject to strict safety and certification requirements. An aircraft and its safety-critical systems may be tolerant to faults; the aircraft and its safety-critical systems may be capable of continued, safe operation after the failure of a component. To this end, FIG. 3 illustrates the principle of a laned architecture that may be adopted for the power and propulsion system 10 of FIGS. 1 and 2 to improve fault tolerance.

Figure 3:
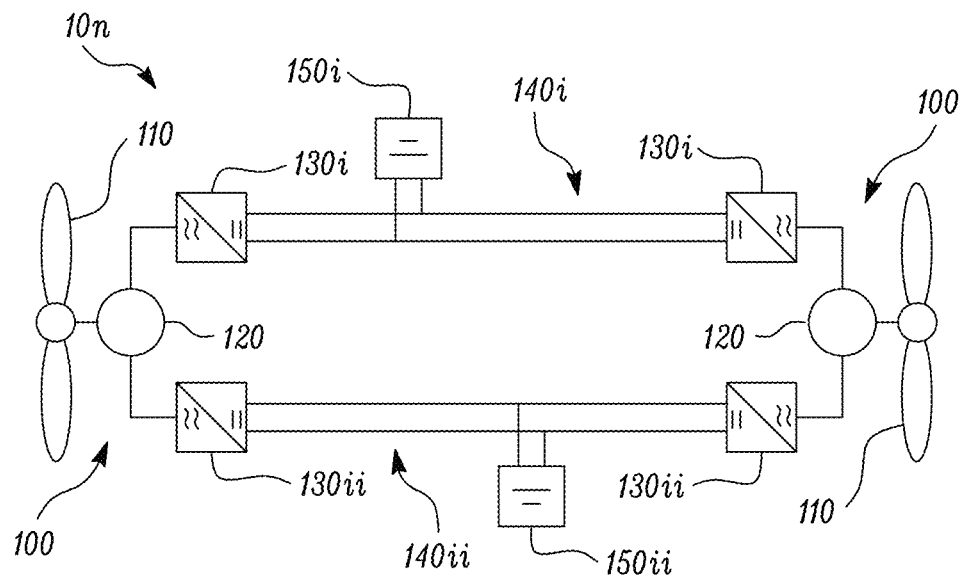
FIG. 3 is schematic illustration of an example of a portion of the propulsion system of FIG. 2, showing the use of multiple power lanes per EPU.

FIG. 3 shows a power and propulsion sub-system 10*n* that has a laned architecture. The sub-system 10*n* may be any of the sub-systems 10*a-c* of FIG. 2. As in FIG. 2, the sub-system 10*n* of FIG. 3 includes two EPUs 100, each of which includes a propeller or fan 110 driven to rotate by an electric motor 120. However, unlike the motors of FIG. 2, the motors 120 of FIG. 3 are multi-lane electric motors. In particular, the motors 120 of FIG. 3 are dual-lane motors with two electrically independent AC inputs (e.g., two independent three-phase inputs).

The term "multi-lane electric motor" or "multi-lane electrical machine," as used herein, refers to an electric motor that has at least two electrically independent sets of stator coils that may be separately excited and may separately interact with a rotor to produce torque. In this way, in the event of a fault in one lane of the motor (e.g., a stator terminal short circuit), the remaining lane(s) may remain functional, and the multi-lane motor 120 may thus continue to apply torque to rotate the propeller or fan 110. Depending on the number of lanes and the extent to which the motor 120 is overrated, the motor 120 may be able to supply all (i.e., 100%) or a large proportion (e.g., 70%, 80%, or 90%) of the torque that would be supplied to rotate the propeller or fan 110 during normal, fault-free operation. In this example, the motors 120 have two lanes and may be referred to as dual-lane motors, but a higher number of lanes (e.g., three or four lanes) may be used. The combination of an independent set of stator coils and an associated rotor with which the stator coils interact may be referred to as one lane of the multi-lane electric motor, or as a "sub-machine" of the multi-lane electrical machine.

A multi-lane motor may take one of a number of different forms. In one example, the dual-lane motor of FIG. 3 takes the form of two axially stacked motors having rotors that are mechanically coupled to the same output shaft. In this case, the motor has two completely separate sets of active parts (e.g., two axially spaced stators and two axially spaced rotors) but has some shared structures and features, (e.g., shared support structures, casing, and cooling features). In another example, each dual-lane motor of FIG. 3 has a single stator structure having a circumference that houses two electrically independent sets of coils, one set belonging to the first sub-machine and the second set belonging to the second sub-machine. The first set of coils and the second set of coils may interact with a common rotor. The above described approaches may be extended to a higher number of lanes (e.g., three axially stacked sub-machines) or may be combined to give a higher number of lanes (e.g., four lanes formed from two axially stacked arrangements, each having two sub-machines). Other examples will occur to those skilled in the art.

FIG. 3 also shows that each lane of the dual-lane electric motor 120 receives its multi-phase AC input from a separate, independent DC:AC inverter 130*i*, 130*ii*. Likewise, each inverter 130*i*, 130*ii* receives its DC input from a separate, independent DC power channel 140*i*, 140*ii* that itself receives power from its own battery module 150*i*, 150*ii*. Thus, the propulsion sub-system 10*n* is not only tolerant to faults in the multi-lane electric motor 120, but is also tolerant to faults in other sub-system components. For example, a failure in a converter circuit 130*i* of the first lane will not prevent the supply of electrical power to the second lane of the associated motor 120. Likewise, the loss of one battery module 150*i* or a fault in a power channel 140*i* will not prevent the operation of the inverters 130*ii* of the second lane or the second lanes of the motors 120. Thus, the use of a laned architecture, including multi-lane motors 120, increases the redundancy in and fault tolerance of the power and propulsion system 10.

Other measures, not shown in the simplified systems 10, 10*n* of FIGS. 2-3, are also possible. For example, a propulsion system 10 may provide for a degree of reconfigurability to improve the fault tolerance and power availability within the system. For example, in the event of a failure of one battery module (e.g., battery module 150*i*), the sub-system 10*n* may be reconfigured (e.g., by the selective opening and closing of switches such as contactors or solid-state power controllers (SSPCs)) to allow electrical power from the second battery module 150*ii* to be supplied to the first power channel 140*i*. As another example, following a fault in the first lane of one or both of motors 120, the sub-system 10*n* may be reconfigured to allow electrical power from the first battery module 150ii to be supplied to the second power channel 140ii.

Figure 4:
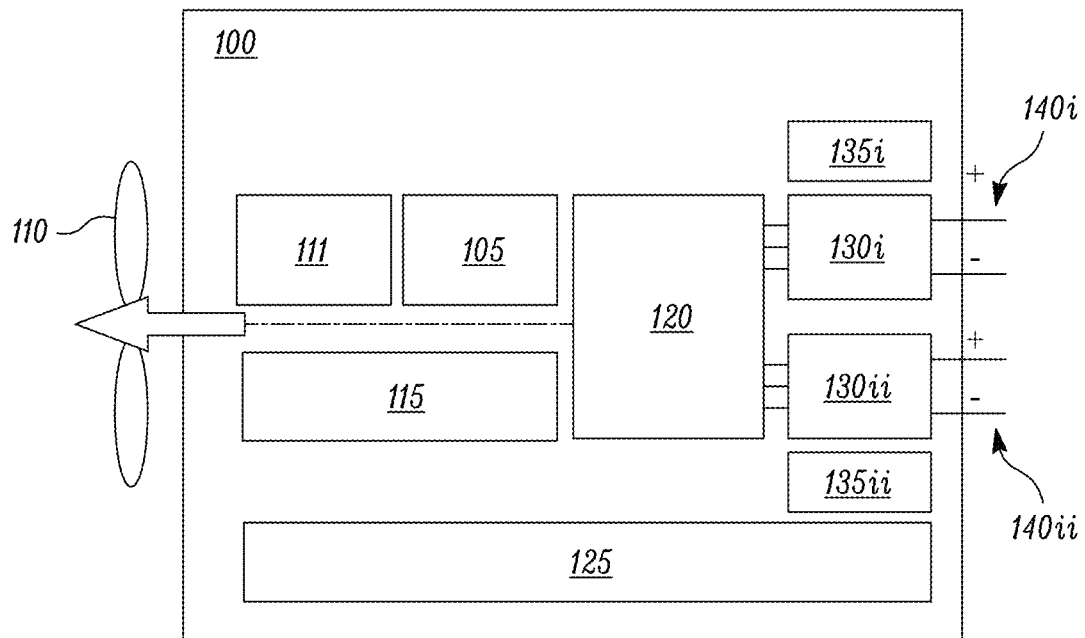
FIG. 4 is a schematic illustration an example of an EPU, further showing the use of multiple power lanes.

FIG. 4 is a schematic illustration of a multi-lane EPU 100 such as may be used in the VTOL aircraft and propulsion systems of FIGS. 1-3. The EPU 100 includes a propeller or fan 110 mechanically coupled to, and thereby drivable by, a rotor of a multi-lane electric motor 120. In this example, the multi-lane motor 120 is a dual-lane motor in which each of the two sub-machines has three phases. Thus, the motor 120 is shown as having two three-phase inputs that receive power from the outputs of two DC:AC converters 130i, 130ii. The DC:AC converters 130i, 130ii interface with respective DC power channels 140i, 140ii, the positive and negative rails of which are indicated.

The inverters 130i, 130ii are controlled by controllers 135i, 135ii. The controllers 135i, 135ii may, for example, control the switching frequencies, switching timings, and duty cycles of MOSFETs of the inverters 130i, 130ii to adjust the magnitudes and frequency of the output AC voltage and current waveforms of the inverters 130i, 130ii. In this way, the controllers 135i, 135ii may control the lanes of the motor 120 to produce the required torque, for example. In this example, each lane has its own controller; again, this prevents a fault in one controller (e.g., controller 135i) from impacting the entire EPU 100.

FIG. 4 also shows an EPU cooling system 125. The EPU cooling system 125 is responsible for managing the temperature of the motor 120 and the inverters 130i, 130ii during use. For example, the cooling system 125 provides that the temperature of the insulation of the stator coils does not exceed its rated temperature. The cooling system 125 may take any suitable form, including a liquid cooling system that utilizes a pumped liquid coolant (e.g., an oil) or an air cooling system that directs a flow of air (e.g., ambient air) to cool the components. In some examples, the cooling system 125 includes substantially separate cooling systems for cooling the electrical machine 120 and the inverters 130i, 130ii. In other examples, the cooling system 125 is shared by the electrical machine 120 and the inverters 130i, 130ii. Further, in some examples, the cooling system 125 may include separate parts for each lane of the EPU 100 to prevent a cooling system fault from impacting the entire EPU 100.

The EPU 110 may include a gearbox 105. The optional gearbox 105 may be required to step down the speed of the rotor(s) of the motor 120 to a lower speed of rotation for the propeller or fan 110. VTOL aircraft are expected to have relatively large propellers or fans 110 (e.g., diameters of 2-4 meters) in order to limit disk loading while increasing propulsive efficiency during VTOL and hover. At the same time, there is a desire to keep aerodynamic noise low, wherein the aerodynamic noise is strongly dependent on the propeller tip speed. The combination of a large propeller diameter and a low propeller tip speed necessitates a relatively low propeller rotational speed. Unless the electrical machine 120 is capable of providing the required torque at a low rotational speed, which is relatively high given the large propeller, a gearbox 105 is to be provided.

Also shown in FIG. 4 are a propeller bearing unit 111 and an EPU lubrication system 115. The presence of and designs of the propeller bearing unit 111 and the EPU lubrication system 115 will depend on the design of the EPU 110 and are beyond the scope of the present disclosure and will not be described any further.

The VTOL aircraft 1, the propulsion system 10, and the EPU 100 described with reference to FIGS. 1-4 are only intended to be examples, and many other arrangements are possible and within the scope of the present disclosure. As noted previously, the aircraft 1 may additionally or alternatively include fuel cells or engines. The aircraft 1 may also be of a different VTOL design (e.g., multi-copter or different number and arrangement of EPUs) or utilize a different electrical power system layout. However, the above description explains certain principles of a VTOL aircraft.

The general design of VTOL aircraft, such as the one described above, results in a number of design challenges. Some of these are discussed below.

In one example, a need for redundancy and propulsive efficiency calls for a distributed propulsion system with a relatively large number of EPUs. In the above example, there are six EPUs, and most proposed VTOL aircraft designs include at least four EPUs. This increases the mass and reduces the power density of the VTOL aircraft because each EPU includes not only lift- and thrust- producing parts but support and attachment structures, cabling, etc.

In a second example, high torque and low speed requirements of the propeller or fan of the EPU, discussed above, may call for a gearbox to step down the output rotor speed of the electrical machine. A gearbox is a relatively heavy component and also introduces additional complexity as well as lubrication and maintenance requirements. Further, each EPU would require its own gearbox, multiplying the gearbox mass by, for example, six times. A direct drive arrangement would eliminate this mass and complexity and be of great advantage. However, designing a high torque, low speed electrical machine that is lightweight and efficient, yet does not have onerous cooling requirements, is a challenge.

Table 1 provides exemplary values of a hover parameter, $\Psi$, that may be achieved by motors described herein. The hover parameter $\Psi$ is defined (see Equation (26)) as the continuous torque produced by the motor while the VTOL aircraft is hovering ($\tau_{hover}$) divided by the continuous angular speed of rotation of the rotor of the motor while the VTOL aircraft is hovering ($\omega_{hover}$), measured in radians per second. By "hovering," it is provided that the EPUs of the VTOL aircraft are producing sufficient thrust to lift the aircraft and maintain a constant aircraft altitude, without requiring the assistance of airframe lift (e.g., wing-borne lift).

TABLE 1

| $\Psi(\text{Nmsrad}^{-1})$ | | |
| --- | --- | --- |
| Example 1 | Example 2 | Example 3 |
| 7.2 | 13.1 | 16.3 |

Motors described herein may have values of $\Psi$ in the range 5 to 20 $\text{Nmsrad}^{-1}$, which may allow for omission of the gearbox 105, resulting in reduced EPU and aircraft mass.

In another example, strict safety and certification requirements of aircraft call for a fault-tolerant electrical power system (e.g., the laned architecture described above with reference to FIGS. 3 and 4). This results in further multiplication (e.g., duplication) of components in an EPU: electrical machines with multiple sets of active parts; multiple power channels; multiple inverters; and multiple cooling systems. This results in a further increase in EPU mass. It would be desirable to reduce the mass of the active parts and cooling system associated with the electrical machine, to the extent that this is possible, while meeting the platform design requirements.

Table 2 provides examples of values of a take-off parameter, x, that may be achieved by a VTOL aircraft with one or more EPUs incorporating an electric motor described herein. The take-off parameter, x, is defined (see Equation (24)) as the maximum tip speed ($v_{tip}$), measured in ms$^{-1}$, of the propeller or fan of the EPU to occur during a vertical take-off operation of the VTOL aircraft divided by the active parts torque density ($p_{act}$—see Equation (1)).

TABLE 2

| $\chi$ (sm$^{-1}$) | | |
|---|---|---|
| Example 1 | Example 2 | Example 3 |
| 1.2 | 2.1 | 4.7 |

Motors described herein may have take-off parameters in the range of 0.5 to 7.5 sm$^{-1}$, which may be associated with reduced system mass and noise.

In another example, multiplication of electrical components such as inverters results in a stacking of losses in the system. For example, a propulsion system with six EPUs and a dual lane architecture would include at least twelve inverters, each having its own losses. One mitigation is to design inverters with high efficiencies, for example, by using state-of-the-art semiconductor materials. Even then, however, it would be desirable to be able to operate the inverters in an operating regime close to their peak efficiency, which occurs when the electrical frequency of the inverter output waveform is relatively high. This is a design challenge, especially for direct drive, because it requires the use of a high inverter output frequency with a low rotor speed of rotation.

Electrical machine designs that are optimized for aircraft propulsion systems, particularly for VTOL aircraft, and may address one or more of the above problems and/or other problems are now described with reference to FIGS. 5A-23.

Figure 5B:
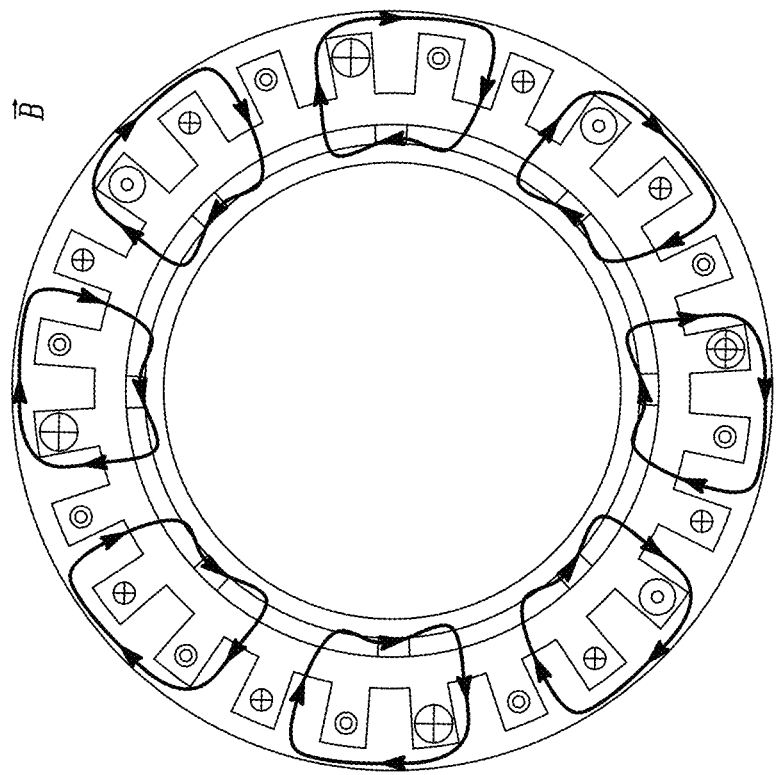
FIG. 5B shows flux paths of an example of magnetic circuits formed in the radial flux electrical machine of FIG. 5A.
Figure 5A:
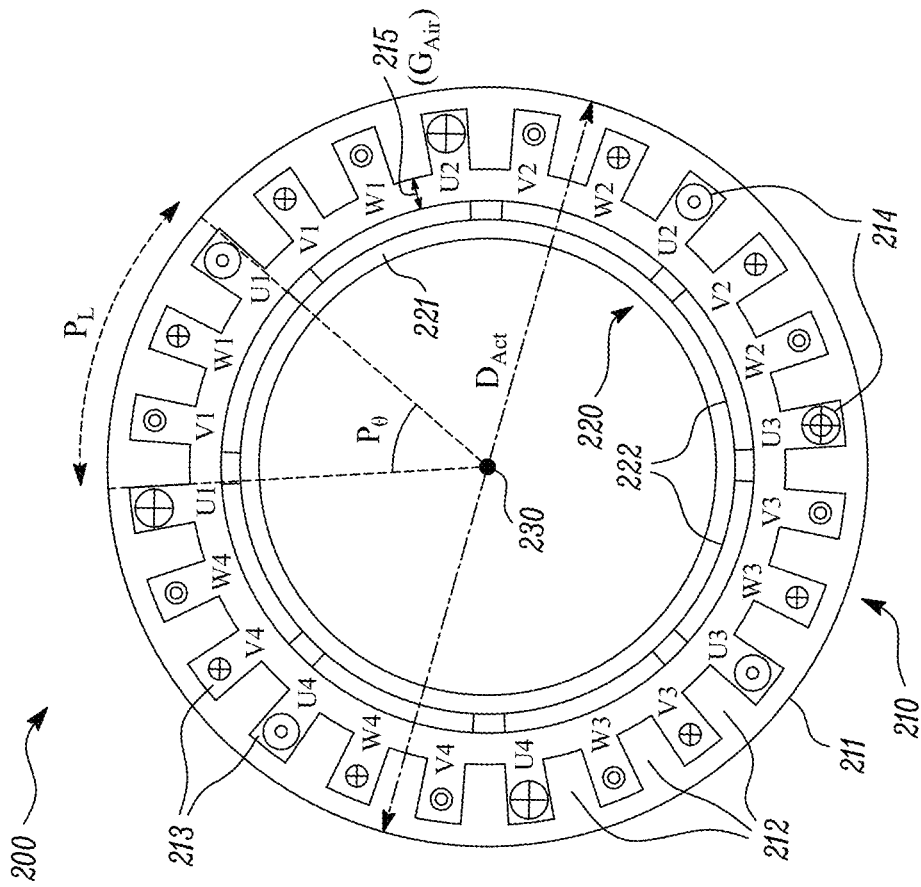
FIG. 5A is a schematic cross-section of an example of a radial flux electrical machine.

FIG. 5A illustrates a radial flux permanent magnet motor 200 (e.g., a motor) that may be used for EPUs of electric aircraft, including VTOL aircraft. As noted previously, permanent magnet motors may be provided for VTOL applications because their power density is relatively high compared with most other designs.

For clarity, FIG. 5A only shows the active parts of the motor 200. "Active parts" refers to the components of the motor 200 that contribute to the production of torque. Thus, "active parts" include magnetic flux generating components such as coils and magnets, and magnetic flux guiding components such iron, but "active parts" do not include support structures, cooling system features, etc., which do not contribute to the production of torque. The active parts of the motor 200 have a cumulated mass of $m_{act}$, referred to herein as the active parts mass. For the avoidance of doubt, the active parts mass includes the mass of the end windings and coil insulation because these are integral features of the coils without which a motor cannot produce any torque.

The radial flux motor 200 includes a stator 210 and a rotor 220 arranged to rotate about an axis of rotation 230.

The stator 210 includes an annular stator back iron 211, which may also be referred to as a yoke, and a plurality of circumferentially arranged stator teeth 212 (e.g., stator teeth 212) that project radially inwardly from the back iron 211. The stator teeth 212 define stator slots 213, which may also be referred to as stator winding space, between the stator teeth 212. In the present example, there are twenty-four stator teeth 212 defining twenty-four stator slots 213 therebetween. The stator teeth 212 and/or the stator iron 211 may, for example, be formed of laminations of a ferromagnetic material to improve their flux guiding performance while reducing the induction of eddy currents in the stator teeth 212 and/or the stator iron 211. In another example, the flux guiding material includes a soft magnetic composite (SMC) such as, for example, a non-iron material with embedded iron particles. The active parts mass, $m_{act}$, of the motor 200 includes any carrier material of the flux guiding iron (e.g., non-iron material included in laminations) or the non-iron material in an SMC.

The stator 210 further includes a plurality of electrically conductive stator coils 214 (e.g., stator coils) wound around the stator teeth 212. The stator coils 214 may be formed of any suitable material, such as copper or aluminum. Strands of the conductor that form the stator coils 214 have (e.g., are coated in) an electrically insulating material to prevent short circuits. In the present example, there are twelve stator coils 214, and each coil occupies two of the slots 213.

In this example, the motor 200 is a three-phase motor, and thus there are 12/3=4 stator coils 214 per phase. The three phases are designated U, V, W in FIG. 5A, and the stator coils 214 are labelled 1-4. Stator coils 214 of the same phase (e.g., U1, U2, U3, U4) are evenly distributed about the circumference of the stator 210, while circumferentially adjacent stator coils 214 (e.g., U1 and V1, or V1 and W1) belong to different phases. Many different stator winding arrangements are known, but, in this example, a distributed winding arrangement in which each coil is wound around two teeth that are located 2Π/8=Π/4 radians (45 degrees) apart is used. Stator coils 214 of the same phase are electrically connected (e.g., in series or in parallel). The terminals of each set of phase coils may be connected in, for example, a star or delta configuration, and the input terminals may be connected to an inverter (e.g., a two-level, three phase bridge circuit) from which the stator coils 214 receive current. In an alternative example, for increased fault tolerance, the stator coils 214 of each phase may be connected to its own inverter circuit (e.g., an H-bridge circuit).

The rotor 220 includes an annular rotor back iron 221 and a plurality of permanent magnets 222 (e.g., permanent magnets) arranged around a circumference of the rotor 220 forming a plurality of permanent magnet rotor poles (e.g., permanent magnet poles). Circumferentially adjacent permanent magnet poles are of opposite polarity. The permanent magnet poles are distributed evenly about the rotor circumference and define a pole pitch, $P_\theta$, equal to 2Π divided by the number of permanent magnet poles ($N_p$):

$$P_\theta = \frac{2\pi}{N_P} \quad (27)$$

In this example, there are eight permanent magnet poles, so $P_\theta$ is equal to 2Π/8=Π/4 radians (45 degrees).

In addition to the pole pitch, $P_\theta$, a pole arc length, $P_L$, of the motor is also defined. Herein, the pole arc length is equal to pole pitch, $P_\theta$, measured in radians, multiplied by the active parts radius, the active parts radius being half the active parts diameter, $D_{Act}$, of the motor:

$$P_L = \frac{P_\theta \times D_{Act}}{2} \quad (28)$$

The active parts diameter, $D_{Act}$, is a diameter corresponding to a radially outermost active part of the motor 200. In this example, in which the rotor 220 is radially inward of the stator 210, a radially outer circumference of the stator iron 211 defines the active parts diameter. When the rotor 220 is instead radially outward of the stator 210, a radially outermost active part of the rotor defines the active parts diameter. In the present example, if the motor 200 is sized for an EPU of a VTOL aircraft, the active parts diameter may be about 0.45 meters, giving a pole arc length, $P_L$, of about 17.7 cm.

FIG. 5A also labels an air gap 215 that separates the rotor 220 from the stator 210. The air gap 215 has a width, measured in the radial direction for the radial flux motor 200, equal to $G_{Air}$.

In use, the stator coils 214 of the stator 210 are excited with AC power to generate a rotating magnetic field that interacts with the magnetic field of the permanent magnets 222 to produce torque. The torque causes the rotor 220 to rotate relative to the stator 210 about the axis of rotation 230. The motor 200 is configured to produce a maximum continuous rated torque of $\tau_{max,cont}$ and a peak rated torque of $\tau_{peak}$. As used herein, $\tau_{max,cont}$ is the highest torque the motor can produce and sustain for an extended period (e.g., at least three minutes) at ISA sea level conditions. $\tau_{max,cont}$ depends to some extent on the capabilities of the cooling system of the motor, which is configured to remove heat at a rate sufficient to maintain the temperature of the stator coil insulation below its rated temperature while operating at $\tau_{max,cont}$. As used herein, $\tau_{peak}$ is a highest torque the motor can produce for a short period (e.g., a three second transient period) at ISA sea level conditions without damaging the motor due to, for example, breakdown of the coil insulation due to excessive voltage or excessive heat generation.

FIG. 5B illustrates main magnetic circuits produced by the radial flux motor 200 during use. The current flowing through each stator coil 214 produces magnetic flux that flows in a radial direction. For a given stator slot 213, the flux produced by the stator coil 214 flows radially outward along one tooth 212 and radially inward along another tooth 212 on a circumferentially opposite side of the slot 213. At the radially outer side of the stator 210, the magnetic flux flows circumferentially along the stator back iron 211 between stator teeth 212. At the radially inner side of the stator 210, the magnetic flux crosses the air gap 215 to flow to/from a stator tooth 212 from/to a permanent magnet 222 of the rotor 220. In the rotor 210, flux flows from a permanent magnet 222 to the rotor iron 221 and then flows circumferentially along the rotor iron 221 to another permanent magnet 222.

Figure 6:
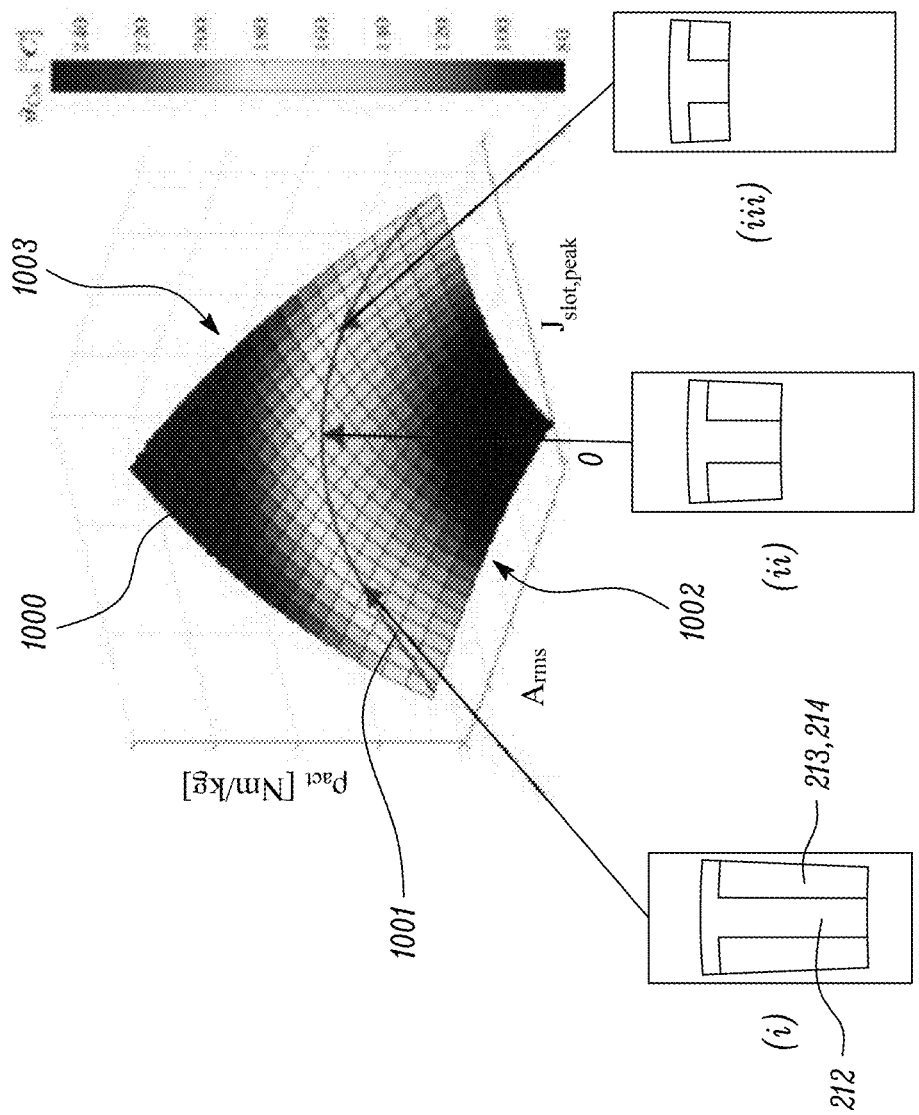
FIG. 6 is a plot illustrating an example of the optimization of the design of a radial flux electrical machine.

FIG. 6 is a plot 1000 illustrating how the design of a radial flux motor 200 may be optimized for use in a EPU of VTOL aircraft. A three-dimensional surface 1000 is shown, with shading of the surface 1000 indicating the temperature of the insulation of the stator coils 214.

The vertical axis represents the active parts torque density, $p_{act}$, of the motor, defined in Equation (1) as the peak rated torque divided by the cumulated mass of the active parts (i.e., the components which contribute to the production of torque) measured in Nmkg$^{-1}$. In the case of VTOL aircraft, it desirable for the active parts torque density, $p_{act}$, to be high because this implies the platform's torque production requirements are met at a low motor mass, which is a significant benefit in VTOL aircraft due in part to the multiplication of components (e.g., multiple EPUs). The remaining two axes show the slot current density, $J_{slot,peak}$, (e.g., the slot current density when producing the peak rated torque), measured in A(mm)$^{-2}$, and the linear RMS current loading, $A_{rms}$, measured in kA/m. In certain examples, the higher the current loading and the slot current density, the higher the torque production. However, if the current density is high, the stator coil temperature will be higher for a given nominal cooling rate because resistive losses (i.e., I$^2$R losses) will also be higher.

On the surface 1000, an isotherm 1001 (i.e., a line of constant temperature) is shown. The isotherm 1001 represents operation at the rated temperature of the insulation, assuming operation of a liquid cooling system that cools the stator coils at a nominal rate. In other words, the isotherm 1001 divides the surface 1000 into two design space regions: a lower region 1002 below the isotherm 1001 in which operation is sustainable at the nominal cooling rate; and an upper region 1003 above the isotherm 1001 in which operation is not sustainable at the nominal cooling rate. Thus, the isotherm 1001 may be regarded as the optimal design. FIG. 6 further shows three possible stator tooth and slot designs, labelled (i), (ii) and (iii), and operating points thereof that lie on the isotherm 1001.

First referring to design (i), this shows a stator tooth 212 that is relatively long in the radial direction and includes a large volume of conductor in the slots 213 defined circumferentially adjacent to the tooth 212. The large volume of active parts (e.g., the iron stator teeth and the conductor) results in high torque for a given slot current density. However, the large volume of active parts also results in a high active parts mass, which limits the active parts torque density $p_{act}$. Further, the use of radially long stator teeth 212 provides that, for a motor of a given diameter (noting the diameter will be constrained by the EPU integration requirement), there is relatively little space to flow coolant around the active parts. Thus, while the slot current density is low for a given current value, the extent to which the slot current density may be increased without departing from the isotherm 1001 into the region 1003 is limited.

Design (ii) is a more optimized design for VTOL aircraft in that design (ii) better balances torque production, slot current density, and active parts mass. As shown, compared with design (i), design (ii) has radially shorter teeth 212 with a smaller volume of conductor in the slots. While this reduces torque production at a given value of the slot current density, radially shorter teeth 212 with a smaller volume of conductor in the slots reduces the active parts mass. This also provides additional room for coolant, which improves cooling and therefore allows for an increase in the slot current density without departing from isotherm 1001 into the upper region 1003. Further, the radially shorter teeth have a lower aspect ratio, which may improve flux guiding, and allow for the use of a larger radius rotor. The use of a larger radius rotor may produce a higher torque. Overall, as shown, tooth design (ii) has the peak value of $p_{act}$ on the isotherm 1001.

Design (iii) illustrates the impact of further reducing the radial length of the stator tooth 212 and decreasing the volume of conductor in the slot. As before, the reduction in active parts volume results in lower torque production at a given slot current density but also a reduction in active parts mass. The additional free volume for coolant allows the slot current density to be increased, thus increasing active parts torque density $p_{act}$ without departing from the isotherm 1001. However, resistive losses increase with the square of the current density whereas the torque increases in a linear fashion. There is therefore a point on the isotherm 1001 after which the increase in torque that results from the increase in slot current density, and which is made possible by the increase in cooling volume, does not compensate the reduction in torque that results from the reduced volume of conductor. Therefore, design (iii) is associated with a lower value of $p_{act}$ than design (ii).

Figure 7B:
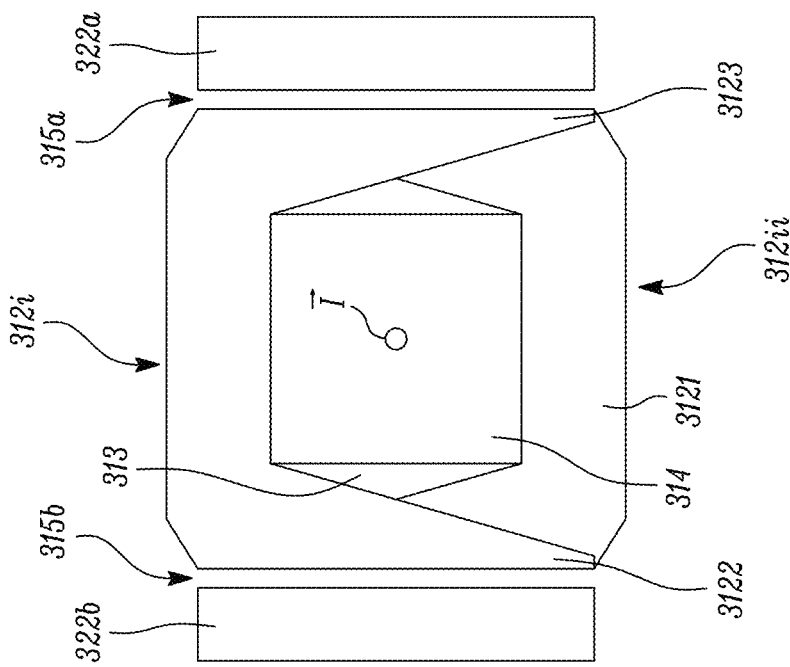
FIG. 7B is a circumferential cross-section through the transverse flux electrical machine of FIG. 7A.
Figure 7A:
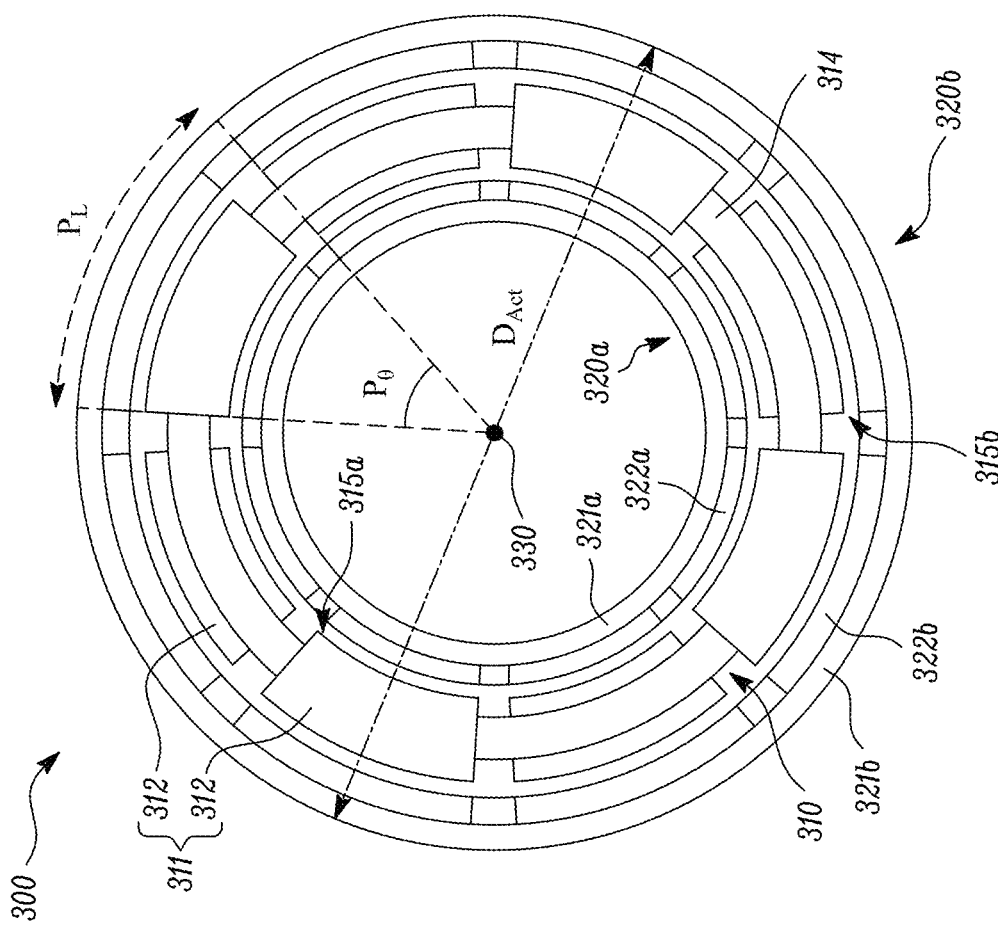
FIG. 7A is a schematic cross-section of an example of a transverse flux electrical machine.

While optimized radial flux designs may be used in the EPUs of VTOL aircraft, further performance improvements and optimizations may be provided. To this end, FIG. 7A, illustrates a transverse flux electric motor 300 that may be particularly suitable for use in VTOL aircraft. FIG. 7B is a circumferential cross-section of the motor 300 of FIG. 7A. As before, for clarity and ease of explanation, only the active parts of the motor 300 are shown. The illustrated motor 300 has only a single phase. This is for clarity of explanation; in practice, a motor may have a higher number of phases, and such a motor will be described below.

The transverse flux motor 300 has a stator 310 and a rotor 320a, 320b arranged to rotate about an axis of rotation 330.

The stator 310 includes flux guiding stator iron 311 that defines a circumferentially extending stator slot 313 (e.g., generally annular stator slot; annular winding space). In this example, the stator iron 311 includes a plurality of circumferentially arranged flux guiding stator elements 312 (e.g., stator elements 312) that together define and surround the annular winding space 313. In the present example, there are eight stator elements 312, alternately facing axially up and axially down, defining a single stator slot 313. The stator elements 312 may be formed of laminations of a ferromagnetic material or an SMC to improve their flux guiding performance while reducing the induction of eddy currents. In other examples, the winding space 313 may be defined by a continuous (e.g., a single piece) stator iron structure as is the case in the radial flux machine of FIG. 5A.

The stator slot 313 houses a circumferentially extending stator coil 314. As in the radial flux motor 200, the stator coil 314 may be formed of any suitable material such as copper or aluminum. The conductor that forms the stator coil 314 has (e.g., is coated in) an electrically insulating material to prevent short circuits. In FIGS. 7A and 7B, the stator coil 314 is a solid piece of conductor (e.g., the coil has a single turn). In practice, the stator coil 314 may have a plurality of turns; this is discussed in more detail below.

FIG. 7B is a circumferential cross-section through the active parts of the transverse flux motor 300, and more clearly shows how the flux guiding stator elements 312 may define the open slot 313. In FIG. 7B, two circumferentially adjacent stator elements 312i, 312ii defining a single stator pole are shown. Stator element 312i is in the foreground, and stator element 312ii is in the background. Each of the stator elements 312i, 312ii has a generally claw-shaped form factor and includes a body portion 3121 and two projections 3122, 3123 that project from the body portion 3121. In this example, the projections 3122, 3123 extend axially away from the body portion 3121, and the projections 3122, 3123 of circumferentially adjacent stator elements 312i, 312ii face axially opposite directions. In FIG. 7B, the projections 3122, 3123 of the first stator element 312i project axially downwards, whereas the projections 3122, 3123 of the second stator element 312ii project axially upwards. In this way, the two circumferentially adjacent stator elements 312i, 312ii cooperate to define the cross-section of a winding space (e.g., a slot 313) therebetween, which in this case has a hexagonal shape, though other shapes may be formed by modifying the shape and curvature of the stator elements 312i, 312ii. Collectively, the eight stator elements 312 of the stator 310 (see FIG. 7A) define an annular winding space, and the stator coil 314 is housed in the annular winding space. Other stator element form factors are possible and in accordance with the present disclosure.

The rotor 320a, 320b, is a dual rotor and has two rotor portions: an inner rotor portion 320a that is radially inside the stator 310; and an outer rotor portion 320b that is radially outside the stator 310. In this example, the inner rotor portion 320a and the outer rotor portion 320b are mechanically connected so that the inner rotor portion 320 and the outer rotor portion 320b rotate together. Each of the inner rotor portion 320a and the outer rotor portion 320b includes a plurality of circumferentially arranged permanent magnets 322a, 322b defining evenly spaced permanent magnet poles (e.g., poles). Circumferentially adjacent poles are of opposite polarity. In this example, the inner rotor portion 320a includes eight permanent magnet poles, and the outer rotor portion 320b includes eight permanent magnet poles. Thus, in the present example, the pole pitch, $P_\theta$, of the motor 300 is $2\Pi/8 = \Pi/4$ radians (45 degrees).

The permanent magnets 322a of the inner rotor portion 320a are affixed to an outer surface of an inner rotor structure 321a. Similarly, the permanent magnets 322b of the inner rotor portion 320b are affixed to an inner surface of an outer rotor structure 321b. The inner rotor structure 321a and the outer rotor structure 321b may include flux guiding stator iron (e.g., laminations of a ferromagnetic material). However, the use of a dual rotor design, with permanent magnets 322a, 322b on both radial sides of the stator 310, may allow for the omission of iron material from the rotor 320a, 320b because the permanent magnets 322a, 322b may define closed magnetic circuits. This is described in more detail below. Other transverse flux motors 300 in accordance with the present disclosure may not feature a dual rotor, and, in this case, rotor iron or additional stator iron may be provided to define closed magnetic circuits.

As stated above, the pole arc length, $P_L$, of the motor is defined as the pole pitch, $P_\theta$, measured in radians, multiplied by half the active parts diameter, $D_{Act}$, of the motor. In this example, which features an ironless dual rotor 320, the active parts diameter is defined by the outer diameter of the permanent magnets 322b of the outer rotor portion. Assuming the motor 300 is sized for an EPU of a VTOL aircraft, the active parts diameter may be about 0.45 meters, giving a pole arc length, $P_L$, of about 17.7 cm.

FIGS. 7A-7B also label air gaps 315a, 315b that separate the inner rotor portion 320a and the outer rotor portion 320b from the stator 310. The inner air gap 315a has a width, for example, measured in the radial direction, equal to $G_{Air,1}$. The outer air gap 315b has a width, for example, measured in the radial direction, equal to $G_{Air,2}$. The air gap widths $G_{Air,1}$, $G_{Air,2}$ may be the same to equalize the motor loading.

The transverse flux motor 300 of the present example has radial air gaps 315a, 315b. In other words, the two rotor portions 320a, 320b are on radially opposite sides of the stator 310. In other examples, a transverse flux motor has axial air gaps. In other words, the two rotor portions would be on axially opposite sides of the stator. Such an example will be described with reference to FIGS. 9-11.

The transverse flux motor 300 of the present example has only a small number of pole pairs and relatively large values for the pole pitch, $P_\theta$, and pole arc length, $P_L$. This is for ease of explanation. As will be described in detail below, the present disclosure provides the selection of a larger number of pole pairs to improve the characteristics of the motor.

Figure 8:
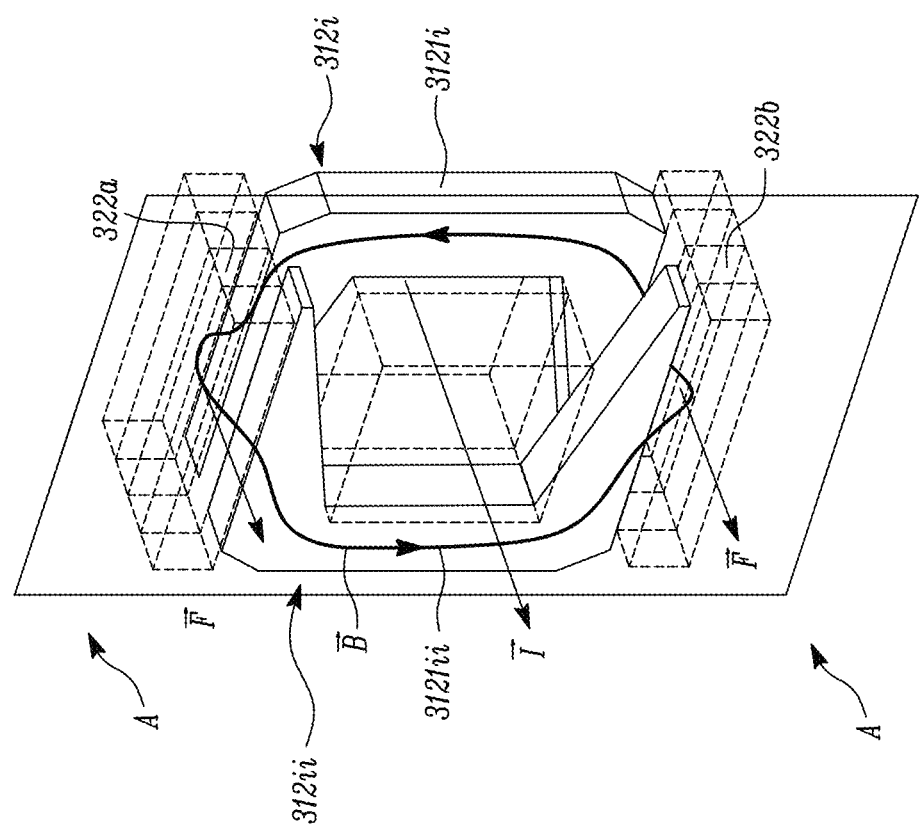
FIG. 8 illustrates the flux paths of the magnetic circuits formed in the transverse flux electrical machine of FIGS. 7A-B.
Figure 8:
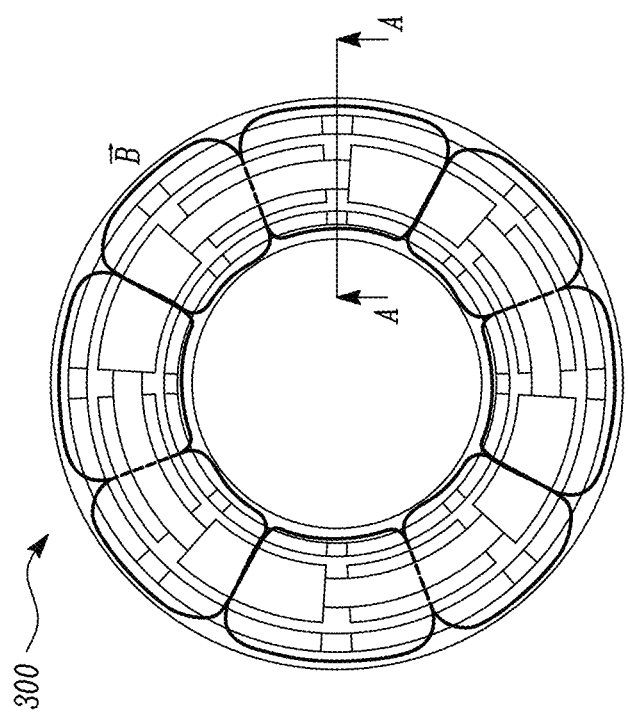

FIG. 8 shows the magnetic flux paths of the main magnetic circuits formed in the transverse flux motor 300 of FIGS. 7A-B. The left-hand diagram of FIG. 8 is the axial end view of FIG. 7A, with the main magnetic circuits overlaid and labelled by the magnetic flux density vector $\vec{B}$. The dotted lines indicate where the flux lines are below the plane of the page. The right-hand diagram, taken through plane A-A, is a zoomed-in perspective view of two circumferentially adjacent stator elements 312, forming a single stator pole, and illustrates the three-dimensional shape of the flux path $\vec{B}$. The current and force vectors $\vec{I}$ and $\vec{F}$ are also shown.

The current flows through the stator coils 314 in the circumferential direction. This is illustrated in FIG. 8 by the current vector $\vec{I}$. At each circumferential position, the current flow produces a loop of magnetic flux in a plane perpendicular to the direction of current flow. Considering a circumferential position corresponding to a first stator element 312i, the loop of flux is guided along the radially extending body portion 3121i of the stator element 312i before entering an axial projection of the stator element 312i. From there, the flux crosses the inner air gap 315a and enters a permanent magnet 322a of the inner rotor portion 320a. The flux then flows circumferentially through the inner rotor magnets 322a to reach a circumferential position corresponding to the adjacent second stator element 312ii. From there, the flux again crosses the inner air gap 315a, this time into the second stator element 312ii. The flux is then guided along the radially extending body portion 3121ii of the second stator element 312ii before entering an axial projection of the second stator element 312ii. From there, the flux crosses the outer air gap 315b and enters a permanent magnet 322b of the outer rotor portion 320b. The flux then flows circumferentially through the outer rotor magnets 322b to reach another circumferential position (e.g., in this case, back to the circumferential position corresponding to the first stator element 312i). From here, the flux again crosses the outer air gap 315b to the first stator element 312i, thus completing the magnetic circuit. The left-hand drawing of FIG. 8 shows a similar magnetic circuit for each adjacent pair of stator elements 312.

Thus, FIG. 8 shows that the magnetic circuits of the transverse flux motor 300 are three-dimensional (e.g., the magnetic circuits have components in the radial, axial, and circumferential directions) and spiral around the annular stator winding region 313 that houses the stator coil 314.

As mentioned previously, a practical motor will include more phases than the single phase shown in FIG. 7A. As also mentioned previously, a transverse flux electrical machine may alternatively utilize axial air gaps instead of radial air gaps. To this end, a three-phase axial air gap transverse flux motor 60 will be described with reference to FIGS. 9-11.

Figure 9A:
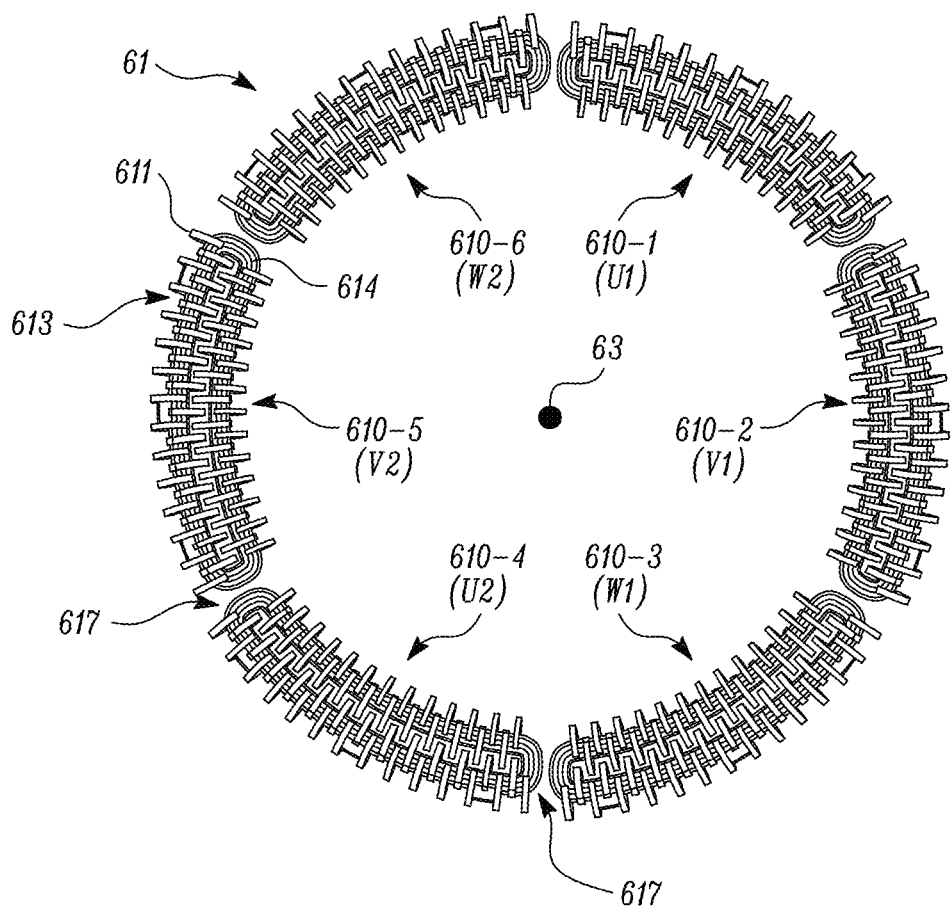
FIG. 9A is a schematic illustration of an example of the active parts of a stator of a transverse flux electrical machine that has three phases and two coils per phase.

FIG. 9A in axial end view of the active parts of a three-phase stator 61 of a transverse flux motor 60 that has axial air gaps.

In this example, the three-phase stator 61 includes six circumferentially arranged phase modules 610-1 to 610-6, distributed evenly about the stator circumference. Radially opposite phase modules (e.g., phase modules 610-1 and 610-4) are associated with the same phase (e.g., phase U) of the motor 60 to provide mechanical balance. Each phase module 610-1 to 610-6 includes flux guiding stator iron 611 defining a circumferentially extending and open winding space 613 (e.g., a slot), and a coil 614 (e.g., a stator coil) housed within the slot 613.

Figure 9B:
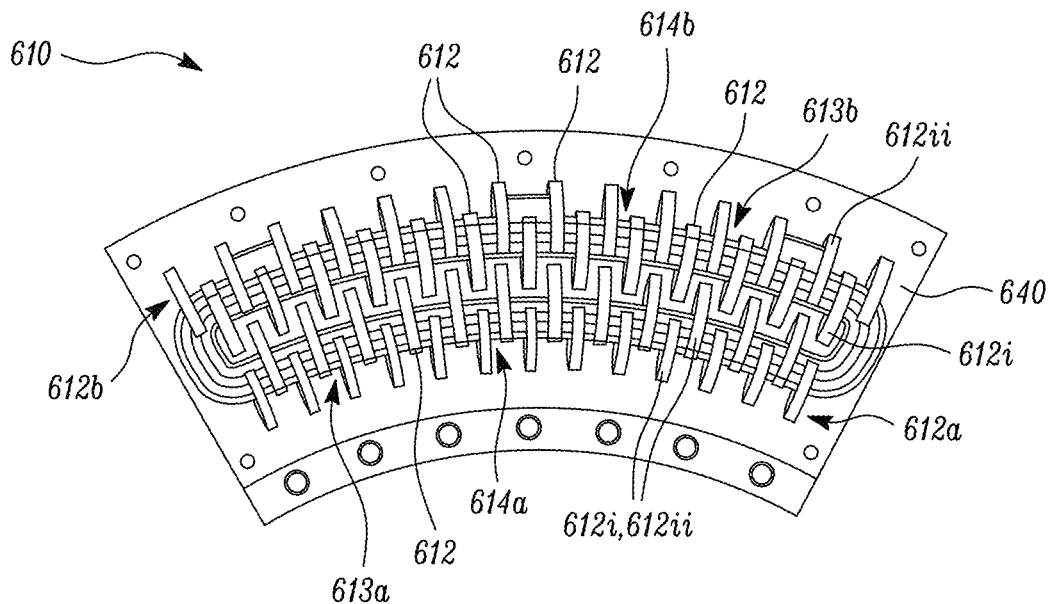
FIG. 9B is a more detailed view of an example of a single coil of the stator of FIG. 9A, further showing a portion of the stator support structure.

FIG. 9B shows one of the phase modules 610 fixed to a support structure 640. In this example, the slot 613 and the coil 614 housed within the slot 613 include first and second radially spaced portions. Specifically, the coil 614 includes a first, radially inner and circumferentially extending, coil portion 614a housed within a first, radially inner and circumferentially extending, slot portion 613a. The coil 614 further includes a second, radially outer and circumferentially extending, coil portion 614b housed within a second, radially outer and circumferentially extending, slot portion 613b. The first coil portion 614a and the second coil portion 614b are connected at respective circumferential ends by end windings 617. In this way, the current flowing through a coil 614 changes direction in the end windings 617, and the current flows through the first coil portion 614a in a circumferential direction opposite to (e.g., generally antiparallel to) the current that flows through the second coil portion 614b.

The flux guiding stator iron 611 includes two sets of flux guiding stator elements: a radially inner first set of flux guiding stator elements 612a and a radially outer second set of flux guiding stator elements 612b. The radially inner first set of stator elements 612a define the radially outer first slot portion 613a that houses the first coil portion 614a. The radially outer second set of stator elements 612b defines the radially outer second slot portion 613b that houses the second coil portion 614b. Each of the two sets of stator elements 612a, 612b includes a plurality of circumferentially arranged, evenly distributed stator elements 612. In the present example of FIG. 9B, the first, radially inner set of stator elements 612a has twenty-five stator elements 612, whereas the second, radially outer set of stator elements 612b has twenty-seven stator elements 612. Other numbers of stator elements are possible.

Each stator element 612 is substantially as described above with reference to FIGS. 7-8 (e.g., each element 612 includes a body portion 3121 and two projections 3122, 3123). However, in the example of FIGS. 9-11, the stator elements 612 are oriented so that the body portions 3121 extend axially and the projections 3122, 3123 extend radially. The projections 3122, 3123 of circumferentially adjacent stator elements 612i, 612ii of each set 612a, 612b alternately project radially inwardly and radially outwardly so as to define an open slot cross-section, similar to that shown in FIG. 7B but with the radial direction and the axial direction swapped. Collectively, all of the stator elements 612 within a set (e.g., set 612a) define a slot portion (e.g., radially inner slot portion 613a).

Figure 10A:
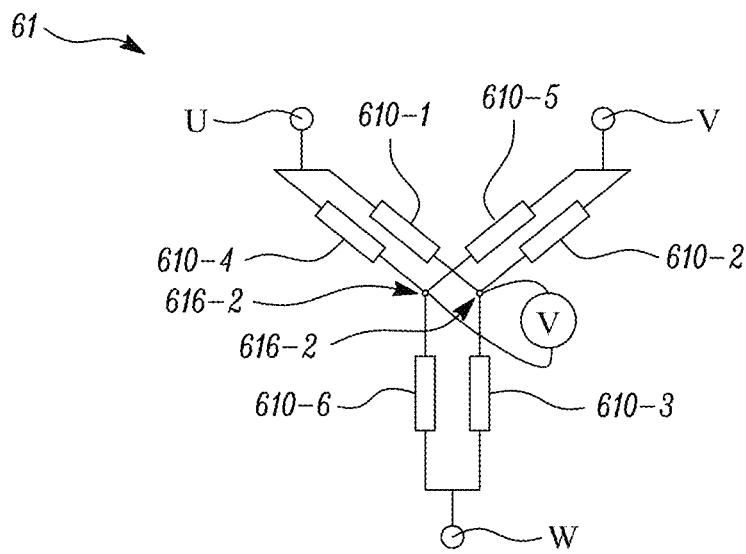
FIG. 10A is an example of a circuit diagram showing one way of connecting the stator coils of the electrical machine of FIG. 9A.

FIG. 10A is a circuit diagram of the stator 61 illustrating how the coils 614 of the six phase modules 610-1 to 610-6 may be connected together.

The stator 61 has three phase terminals U, V, W by which the stator 61 receives AC electrical power from an inverter arrangement. For example, each phase terminal may be connected to a two-level, one-phase H-bridge inverter circuit, or each phase terminal may be connected to one of the phase legs of a two-level, three-phase DC:AC inverter circuit.

The coil 614 of each phase module 610-1 to 610-6 has two terminals. Respective first terminals of the coils 614 of the radially opposite first phase module 610-1 and fourth phase module 610-4 are connected in parallel to the first phase terminal U. Respective first terminals of the coils 614 of the radially opposite second phase module 610-2 and fifth phase module 610-5 are connected in parallel to the second phase terminal V. Respective first terminals of the coils 614 of the radially opposite third phase module 610-3 and sixth phase module 610-6 are connected in parallel to the third phase terminal W. Respective second terminals of the first phase module 610-1, second phase module 610-2, and third phase module 610-3 are connected at a first star point 616-1. Respective second terminals of the fourth phase module 610-4, fifth phase module 610-5, and sixth phase module 610-6 are connected at a second star point 616-2. Thus, in this example, the phases are connected in a star configuration. In other motors in accordance with the present disclosure, the phases may be connected in a delta configuration.

FIG. 10A also shows the measurement of the voltage between the two star points 616-1, 616-2. A difference in the voltage between the star points may be used to diagnose a fault in the stator coils 614.

Figure 10B:
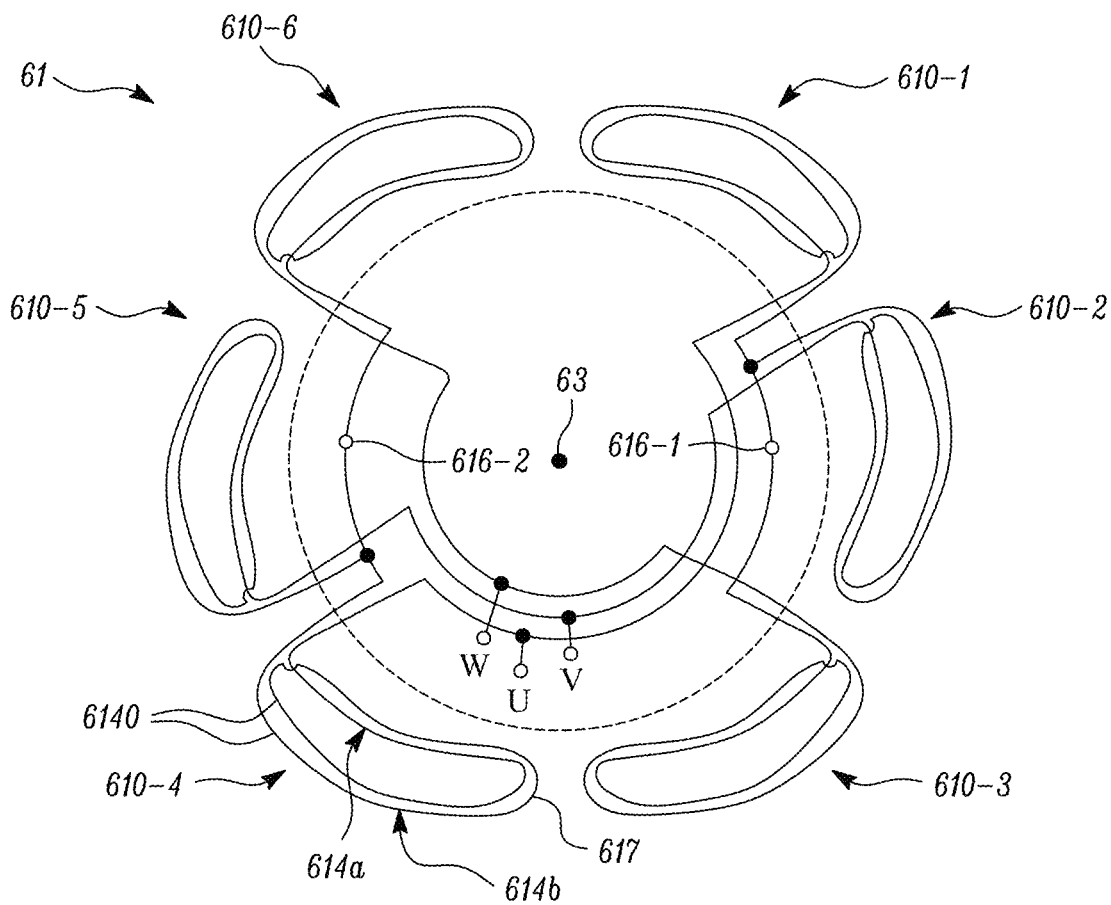
FIG. 10B is an example of a hybrid circuit illustration combining FIG. 9A and FIG. 10A, showing the connection of the stator coils and the path of current through the stator coils.

FIG. 10B is a hybrid diagram combining the axial end view of the stator 61 (FIG. 9A) and the circuit diagram of the stator 61 (FIG. 10A). As well as showing the connection of the coils 614 together, and to the phase connections U,V, W and the star points 616-1, 616-2, FIG. 10B shows the coils 614 in schematic form. FIG. 10B shows that the coils 614 have end windings 617 at circumferential ends, respectively, which allows the current to reverse direction between the inner coil portion 614a and the outer coil portion 614b. FIG. 10B also shows that each coil 614 has multiple winding turns 6140. Although only two turns are illustrated, in practice, each coil may have more than two turns.

Figure 11:
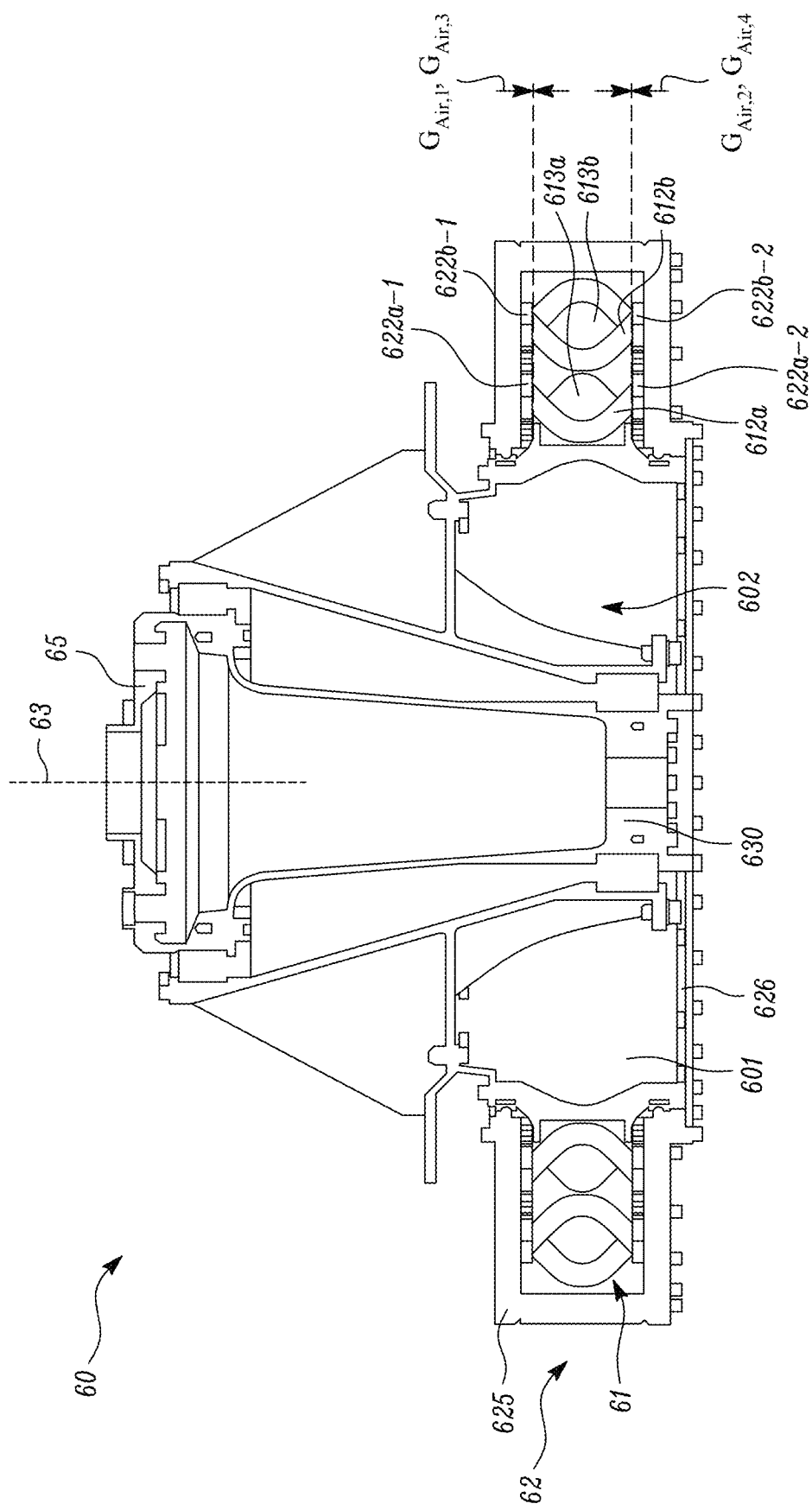
FIG. 11 is an example of a cross-section of an electrical machine having the stator of FIGS. 9 and 10, further showing the rotor and additional support structures.

FIG. 11 shows the motor 60 in cross-section. While the previous figures have only illustrated certain active parts of their respective motors, FIG. 11 also shows various other features, including features of an EPU in which the motor may be integrated.

The motor 60 includes a main motor housing 601 that includes, amongst other things, the stator 61. Various components of the stator 61 are visible and labelled in FIG. 11. This includes, for the two of the six phase modules 610-1 to 610-6 that are visible in the cross-section of FIG. 11, the first, radially inner set of flux guiding stator elements 612a, the second, radially outer set of flux guiding stator elements 612b, the first, radially inner slot portion 613a defined by the first set of stator elements 612a, and the second, radially outer slot portion 613b defined by the second set of stator elements 612b. The coil portions 614a, 614b are omitted from FIG. 11 to more clearly show the slots 613 (e.g., the winding space).

The rotor 62 includes a rotor housing 625 mechanically coupled to the EPU drive shaft 630 via a coupling structure 626 that, for example, may be disk-shaped. Thus, in this example, the rotor housing 625 rotates with the drive shaft 630 about an axis of rotation 63. The active parts of the rotor (e.g., the permanent magnets that interact with the active parts of the stator 61) are located within the rotor housing 625 and also rotate together with the housing 625.

The permanent magnets include four groups of permanent magnets 622a-1, 622a-2, 622b-1, 622b-2, each of which are circumferentially distributed around the rotor 62. In one example, each group of permanent magnets 622a-1, 622a-2, 622b-1, 622b-2 is arranged as a Halbach array. The first group of permanent magnets 622a-1 and the second group of permanent magnets 622a-2 form a first set of magnets 622a that interact with the magnetic field associated with the first, radially inner coil portion 614a and the first set of flux guiding stator elements 612a. The third group of permanent magnets 622b-1 and the fourth group of permanent magnets 622b-2 form a second set of magnets 622b that interact with the magnetic field associated with the second, radially outer coil portion 614b and the second set of flux guiding stator elements 612b.

The first group of magnets 622a-1 is located axially adjacent to (e.g., axially above) and facing a first axial end of the radially inner portions 612a, 613a, 614a of the active parts of the stator 61. The first group of magnets 622a-1 is separated from the first axial end of the active parts of the stator 61 by a first axial air gap, schematically indicated in FIG. 11 but too small to see, having a width $G_{Air,1}$ in the axial direction. The second group of magnets 622a-2 is located axially adjacent to (e.g., axially below) and facing a second axial end of the radially inner portions 612a, 613a, 614a of the active part of the stator 61. The second group of magnets 622a-2 is separated from the second axial end of the active parts of the stator 61 by a second axial air gap, schematically indicated in FIG. 11 but too small to see, having a width $G_{Air,2}$ in the axial direction. The values of $G_{Air,1}$ and $G_{Air,2}$ may be the same to balance loading.

The third group of magnets 622b-1 is located axially adjacent to (e.g., axially above) and facing a first axial side of the radially outer portions 612b, 613b, 614b of the active parts of the stator 61. The third group of magnets 622b-1 is separated from the first axial end of the active parts of the stator 61 by a third axial air gap, schematically indicated in FIG. 11 but too small to see, having a width $G_{Air,3}$ in the axial direction. The fourth group of magnets 622b-2 is located axially adjacent to (e.g., axially below) and facing a second axial end of the radially outer portions 612b, 613b, 614b of the active parts of the stator 61. The fourth group of magnets 622b-2 is separated from the second axial end of the active parts of the stator 61 by a fourth axial air gap, schematically indicated in FIG. 11 but too small to see, having a width $G_{Air,4}$ in the axial direction. The values of $G_{Air,3}$ and $G_{Air,4}$ may be the same to balance loading, and may be the same as $G_{Air,1}$ and $G_{Air,2}$.

In use, the stator coils 614 of the phase modules 610-1 to 610-6 are excited with current from inverter circuits. The current flows in a circumferential direction through the inner coil portion 614a and the outer coil portion 614b of the phase modules 610-1 to 610-6, changing direction in the end windings 617. The magnetic flux generated by the current is guided in magnetic circuits axially through the body portions of the stator elements 612, radially through the projections of the stator elements 612, axially across the axial air gaps, and circumferentially between rotor magnets 622. The magnetic field produced by the rotor magnets 622 interacts with the stator field to produce torque, which drives rotation of the rotor 62 and, via the coupling structure 626, rotation of EPU drive shaft 630. Rotation of the drive shaft 630 drives rotation of a propeller or fan, and a propeller interface 65 is shown in FIG. 11.

Figure 12B:
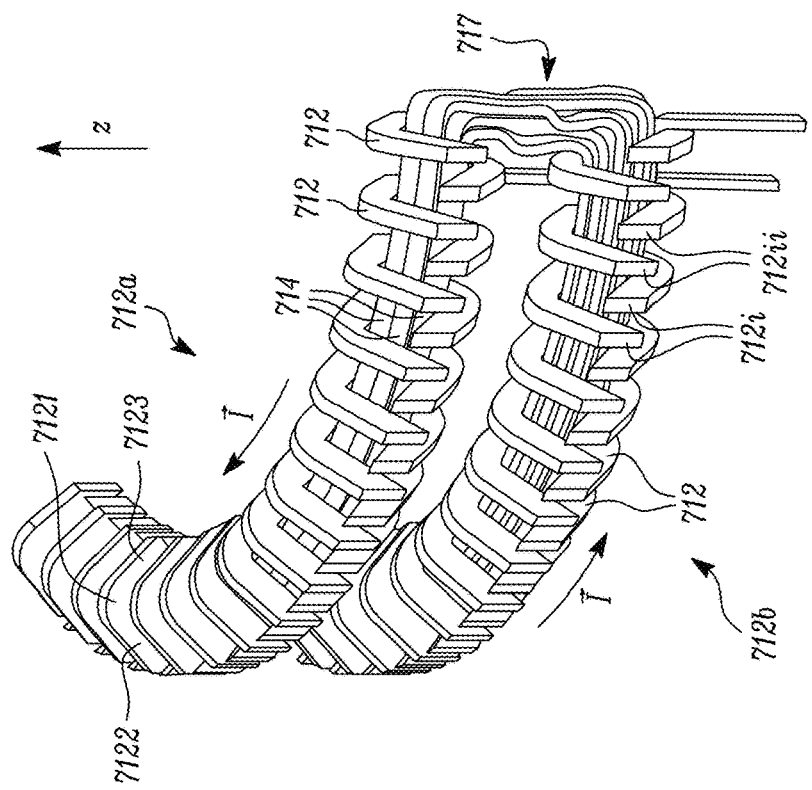
FIG. 12B is a perspective view of an example of one stator coil of the transverse flux electrical machine of FIG. 12A.
Figure 12A:
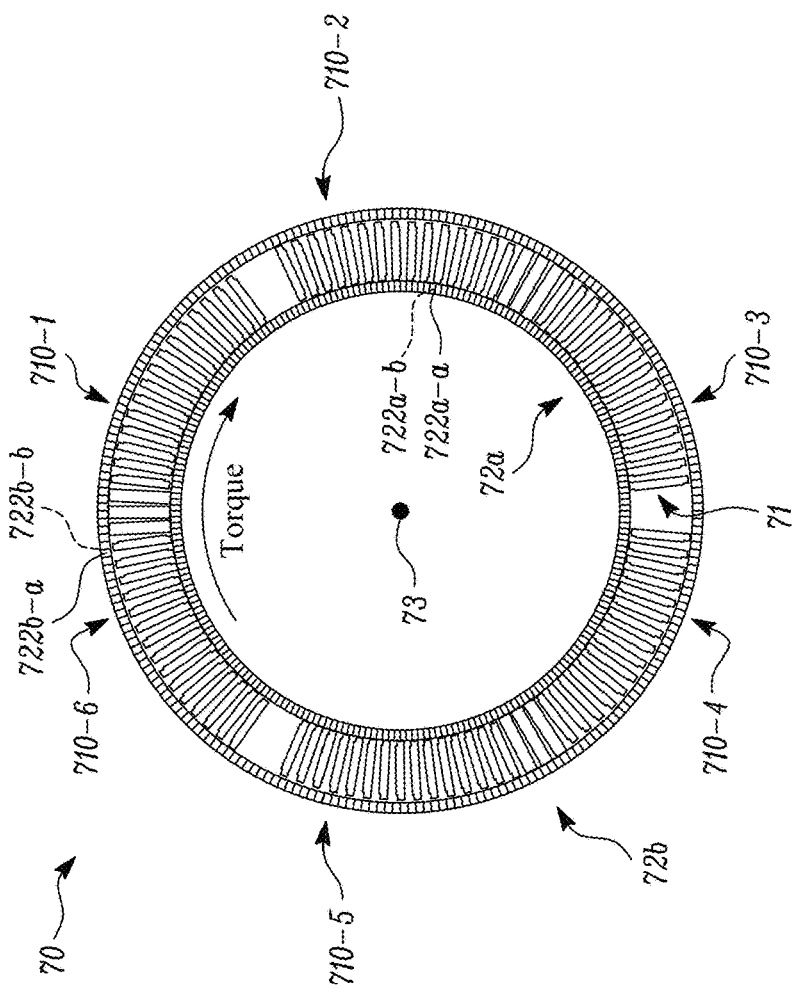
FIG. 12A is a schematic illustration of an example of a transverse flux electrical machine with radial air gaps.

Thus, a three-phase transverse flux motor 60 with axial air gaps and two coils per phase has been described. For completeness, FIGS. 12A and 12B illustrate an equivalent transverse flux motor 70 with radial air gaps. It will be appreciated that a radial air gap transverse flux motor 300 was described with reference to FIGS. 7-8, but for a single phase having a single coil.

FIG. 12A is an axial end view of a transverse flux motor 70 having a stator 71 and a rotor 72. The rotor 72 rotates about an axis of rotation 73. Once again, the stator 71 includes six circumferentially arranged phase modules 710-1 to 710-6. Radially opposite phase modules (e.g., phase modules 710-1 and 710-4) are associated with the same phase (e.g., phase U) and are connected, for example, as shown in FIG. 10A. The rotor includes a radially inner rotor portion 72a and a radially outer rotor portion 72b, with the stator 71 positioned radially therebetween. The stator coils 74 are omitted from FIG. 12A for clarity, but a single stator coil 74 of one phase module 710 is illustrated in and will be described with reference to FIG. 12B.

As in the motor 60 of FIGS. 9A-9B, 10A-10B, and 11, each phase module 710-1 to 710-6 of the motor 70 of FIGS. 12A-12B includes two sets of stator elements 712a, 712b defining two circumferentially extending slot portions 713a, 713b housing two circumferentially extending coil portions 714a, 714b of the coil 714. However, while the two sets of stator elements 612a, 612b of the previously described motor 60 are radially spaced, the two sets of stator elements 712a, 712b of the motor 70 of the present example are axially spaced. This can be most easily appreciated from FIG. 12B, which shows one phase module 710. FIG. 12B shows the two sets of axially spaced stator elements 712a, 712b and the coil portions 714a, 714b, which are connected at circumferential ends of the phase module 710 by end windings 717. The direction of current flow is indicated by the circumferential arrows labelled "Ī". FIG. 12B shows that in this example, each coil 714 is formed of a plurality of winding turns.

In the present example, each set of stator elements 712a, 712b includes a plurality of circumferentially arranged, evenly distributed flux guiding stator elements 712 (e.g., stator elements 712). Each of the stator element 712 is substantially as described above with reference to FIGS. 7-8 (e.g., each stator element 712 includes a body portion 7121 and two projections 7122, 7123). The stator elements 712 are oriented so that the body portions 7121 extend radially and the projections 7122, 7123 extend axially from the body portion 7121. The projections 7122, 7123 of circumferentially adjacent stator elements 712i, 712ii of each set 712a, 712b alternately project axially inwardly and axially outwardly so as to define an open slot cross-section, similar to that shown in FIG. 7B. Collectively, all of the stator elements 712 within a set (e.g., set 712a) define a slot portion (e.g., first axial slot portion 713a).

Comparing FIG. 12A and FIG. 12B, the stator phase modules 710-1 to 710-6 extend axially into the plane of the page such that only one axial portion (e.g., portion 712a) of each phase module 710 is visible. Similarly, the two rotor portions 72a, 72b extend axially into the plane of the page. Each rotor portion 72a, 72b includes first and second axially spaced groups of permanent magnets such that, in total, the rotor 72 has four groups of magnets: a radially inner and axially inner first group 722a-a, a radially inner and axially outer second group 722a-b, a radially outer and axially inner third group 722b-a, and a radially outer and axially outer fourth group 722b-b. The dashed lines used for labels 722a-b and 722b-b indicate that the permanent magnets of the second group 722a-b and the fourth group 722b-b are axially behind those of the first group 722a-a and the third group 722b-a. Each group of permanent magnets 722a-a, 722a-b, 722b-a, 722b-b may be arranged as a Halbach array.

The magnets of the first group 722a-a face a radially inner side of the stator 71 at a first axial height and are separated from the radially inner side by a first radial air gap of width $G_{Air}$. The magnets of the second group 722a-b face the radially inner side of the stator 71 at a second axial height and are separated from the radially inner side by a second radial air gap of width $G_{Air,2}$. The magnets of the third group 722b-a face a radially outer side of the stator 71 at the first axial height and are separated from the radially outer side by a third radial air gap of width $G_{Air,3}$. The magnets of the fourth group 722b-b face the radially outer side of the stator 71 at the second axial height and are separated from the radially outer side by a second radial air gap of width $G_{Air,4}$. The first radial air gap width $G_{Air,1}$ and the second radial air gap width $G_{Air,2}$ may be the same to balance loading. Likewise, the third radial air gap width $G_{Air,3}$ and the fourth radial air gap width $G_{Air,4}$ may be the same to balance loading. In some examples, all four radial air gaps widths are the same. The radial air gaps are only schematically indicated in FIGS. 12A-12B because the air gaps are too small to resolve.

In use, the stator coils 714 of the phase modules 710-1 to 710-6 are excited with current from inverter circuits. The current flows in a circumferential direction through the axially inner portion 714a and the axially outer coil portion 714b of the phase modules 710-1 to 710-6, changing direction in the end windings 717. The magnetic flux generated by the current is guided in magnetic circuits radially through the body portions of the stator elements 712, axially through the projections of the stator elements 712, radially across the radial air gaps, and circumferentially between rotor magnets. The magnetic field produced by the rotor magnets interacts with the stator field to produce torque that drives rotation of the rotor 72a, 72b.

Thus, a three-phase transverse flux motor 70 with radial air gaps and two coils per phase has been described.

Figure 13:
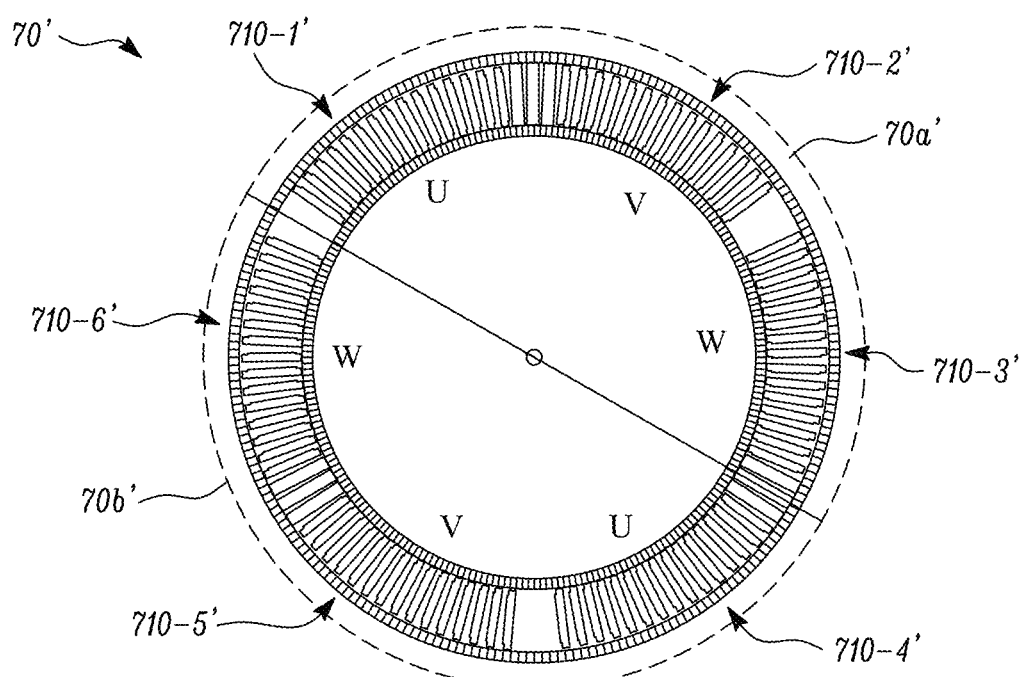
FIG. 13 is a schematic illustration of an example of a transverse flux electrical machine in which a circumference of the stator is divided into sectors to implement first and second power lanes.
Figure 14:
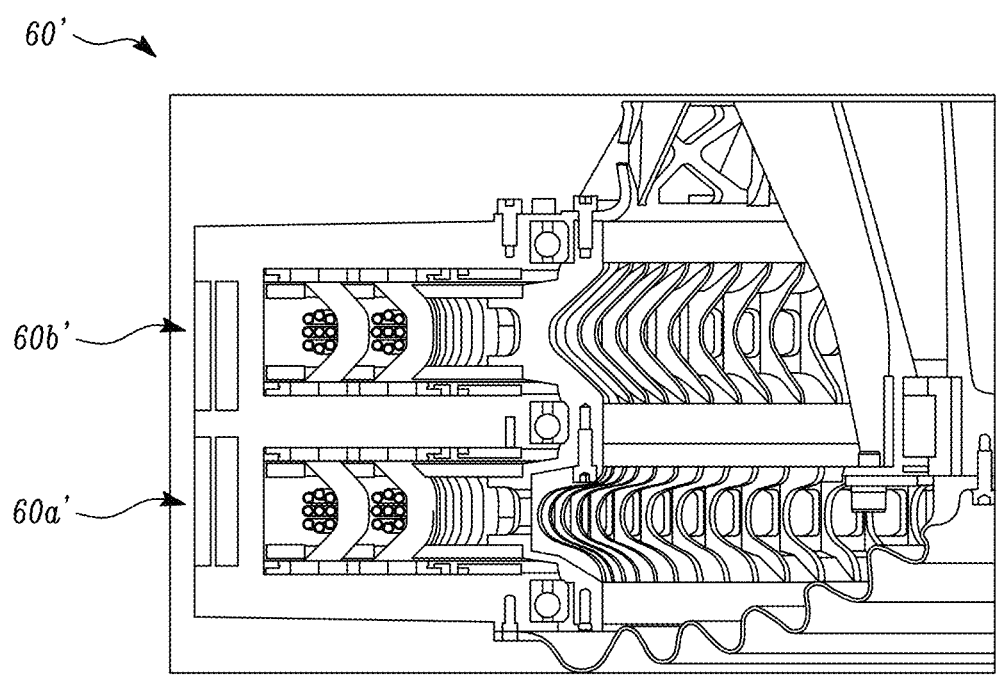
FIG. 14 is a cutaway view of an example of a transverse flux electrical machine in which first and second power lanes are implemented using axial stacking of active parts.

As described above with reference to FIGS. 3 and 4, for VTOL applications, it may be desirable to utilize multi-lane (e.g., dual-lane) electric motors. FIG. 13 and FIG. 14 illustrate how a multi-lane architecture may be implemented in a transverse flux electric motor.

FIG. 13 illustrates a transverse flux motor 70' (e.g., a motor) with radial air gaps and two independent power lanes (e.g., two sub-machines). The motor 70', which is similar in its construction to the motor 70 of FIGS. 12A-12B, includes six phase modules 710-1' to 710-6'. While the motor 70 of FIGS. 12A-12B has two coils per phase with radially opposite coils connected and belonging to the same phase, the motor 70' has two three-phase sub-machines 70a', 70b' with one coil per phase, and radially opposite coils correspond to different sub-machines 70a', 70b'. Each sub-machine 70a', 70b' receives its power from a different inverter so that if an inverter fails, one sub-machine 70a', 70b' is not affected by the failure.

In more detail, the circumference of a stator of the motor 70' is circumferentially divided into two sectors each spanning Π radians (180 degrees): a first sector 70a' and a second sector 70b'. The first sector 70a' corresponds to a first three-phase sub-machine 70a' and has three phase modules 710-1' to 710-3', each corresponding to one phase of the first sub-machine 70a'. The second sector 70b' corresponds to a second three-phase sub-machine 70b' and has three phase modules 710-4' to 710-6', each corresponding to one phase of the second sub-machine 70b'. The stators of the sub-machines 70a', 70b' share and interact with a common rotor, which is configured in a same or similar way to the dual rotor of the motor 70 of FIG. 12A.

By increasing the number of sectors into which the circumference is divided, the number of sub-machines may be increased. For a number of sub-machines equal to $N_L$, there may be $N_L$ sectors each spanning $2\Pi/N_L$ radians (360/$N_L$ degrees). The number of coils per phase may be increased by increasing the number of phase modules per sector.

FIG. 14 illustrates a transverse flux motor 60' with axial air gaps and two independent power lanes (e.g., two sub-machines). The two sub-machines 60a' and 60b' are implemented by axially stacking two sets of active parts. Specifically, the motor 60' has two axially stacked sub-machines 60a', 60b', each of which is of similar construction to and operates in much the same way as the axial air gap motor 60 of FIGS. 9A-9B, 10A-10B and 11. Rotors of the two sub-machines 60a', 60b', each of which is of dual-rotor construction, are mechanically coupled so that the rotors rotate together, though it will be appreciated the two rotors may instead be independent and be separately connected to an output drive shaft.

An advantage of the axial stacking approach is that, as well as implementing multiple sub-machines for increased fault tolerance, the torque developed by the motor 60' is increased without requiring an increase in the motor diameter or the slot current density. Although the active parts mass does increase, the use of some common features (e.g., non-active features such as cooling and support structures) limits the overall increase in the mass of the motor 60'. The number of power lanes may be increased beyond two, if this is desired, by axially stacking more than two sub-machines and/or dividing the circumference of each stator into multiple sub-machines as shown in FIG. 13.

Motors in accordance with the present disclosure may be configured to have particularly high active part torque densities, defined in Equation (1). For example, motors may have a value of $p_{act}$ of at least 50 Nmkg$^{-1}$. Table 3 illustrates the calculation of $p_{act}$ for three motors in accordance with the present disclosure, each of which is a transverse flux motor.

TABLE 3

| $m_{act}$ (kg) | $\tau_{peak}$ (Nm) | $p_{act}$ (Nmkg$^{-1}$) |
| --- | --- | --- |
| 10.2 | 870 | 85.2 |
| 13.4 | 1300 | 97.0 |
| 17.8 | 1450 | 81.5 |

As shown, each of the example transverse flux motors has a particularly high value of $p_{act}$, in excess of 80 Nmkg$^{-1}$. Noting that a VTOL aircraft may include at least four EPUs, such a high value of $p_{act}$ results in a significant mass saving when compared even to VTOL aircraft utilizing optimized radial flux motors.

The increased active parts torque density may be understood by comparing the two-dimensional magnetic circuits of the radial flux motor (FIG. 5B) and the three-dimensional magnetic circuits of the transverse flux motor (FIG. 8). Referring first to FIG. 5B, the magnetic circuits are substantially two-dimensional (e.g., the magnetic circuits lie in planes perpendicular to the axis of rotation 230) and pass through the annular region of the stator 210 in which the coils 214 are housed. There is, therefore, competition for space in this annular region between the conductor, which carries the current that generates the stator field, and the stator teeth that guide the flux in the radial direction. Thus, for a motor of a given active parts diameter, any gain in performance that may be realized by increasing the conductor volume may be offset by the effects of a corresponding reduction in a stator iron volume, and vice versa. For example, a higher conductor volume may allow more torque to be produced, or the same torque to be produced at lower current density, the latter reducing the cooling burden. However, this would require more slender stator teeth, which are less efficient flux guides, and/or fewer stator teeth, which may result in higher torque ripple (e.g., especially at the low rotor speeds for VTOL aircraft). Thus, an improvement in one performance metric (e.g., peak torque) will likely require either a reduction in another performance metric (e.g., efficiency and torque ripple) and/or an increase in the mass of the active parts of the motor. Referring now to FIG. 8, in contrast with FIG. 5B, the magnetic circuits are three-dimensional and spiral around the annular winding space 313 that houses the conductor. There is therefore no competition or much more limited competition for space in the stator between the conductor and the flux guiding stator iron. Consequently, both the stator pole design and number may be optimized (e.g., without reducing the conductor volume), resulting in a higher active parts torque density.

In designing for a high value of $p_{act}$, it is useful to introduce a dimensionless machine parameter Γ, defined in Equation (5) as the cumulated volume of the conductor (e.g., the stator coils), $V_{conductor}$, included in the motor divided by cumulated volume of the flux guiding iron material, $V_{iron}$, included in the motor. In accordance with the present disclosure, a notably high value of F, greater than or equal to 0.25, may be selected to promote the production of high torque with a low active parts mass. Table 4 shows values of F for three motors in accordance with the present disclosure and sized for an EPU of a VTOL aircraft:

TABLE 4

| | $V_{conductor}$ (cm$^3$) | $V_{iron}$ (cm$^3$) | Γ |
| --- | --- | --- | --- |
| Example 1 | 39.2 | 62.2 | 0.63 |
| Example 2 | 34.1 | 92.2 | 0.37 |
| Example 3 | 52.2 | 49.7 | 1.02 |

The iron material may be present in both the stator and the rotor. However, in the transverse flux motors of the examples described herein, only the stator includes iron material. This reduces the iron volume and promotes a higher value of F.

Another characteristic parameter for the purposes of an EPU of a VTOL aircraft is A, defined in Equation (3) as the ratio of the active parts torque density and the slot current density at the peak rated current. A may be a useful parameter for optimizing a motor for a VTOL EPU because the parameter rewards torque production but penalizes the addition of active parts mass, which increases the EPU weight, and at the same time penalizes the use of a high slot current density, which creates onerous cooling requirements and increases the likelihood of failures. In accordance with the present disclosure, a particularly high value of A (e.g., greater than or equal to 5 ρN$^3$mkg$^{-1}$A$^{-1}$) may be selected. Table 5 shows values of A for three transverse flux motors in accordance with the present disclosure:

TABLE 5

| $p_{act}$ (Nmkg$^{-1}$) | $J_{slot,peak}$ (Amm$^{-2}$) | Λ (μN$^3$mkg$^{-1}$A$^{-1}$) |
| --- | --- | --- |
| 84 | 6 | 14 |
| 108 | 7.5 | 12.5 |
| 76 | 11 | 6.9 |

As noted above, the radial flux motor 200 has magnetic circuits that are two-dimensional and pass radially through the annular region of the stator 210 in which the slots 213 are defined. This creates competition for space in the annular region of stator 210 between the flux guiding material (e.g., the stator teeth 212) and the slot 213 that houses the conductor (e.g., the coils 214). This provides that increasing the number of stator pole pairs requires a decrease in the volume of conductor. Equivalently, increasing the volume of conductor requires a decrease in the number of stator pole pairs. In contrast, in a transverse flux motor, there is no, or much more limited, competition for space in the annular stator region. Thus, the number of stator pole pairs, formed by the stator elements 312 in this example, may be increased with no impact on the volume of conductor. The impact of this may be appreciated from FIG. 15.

Figure 15:
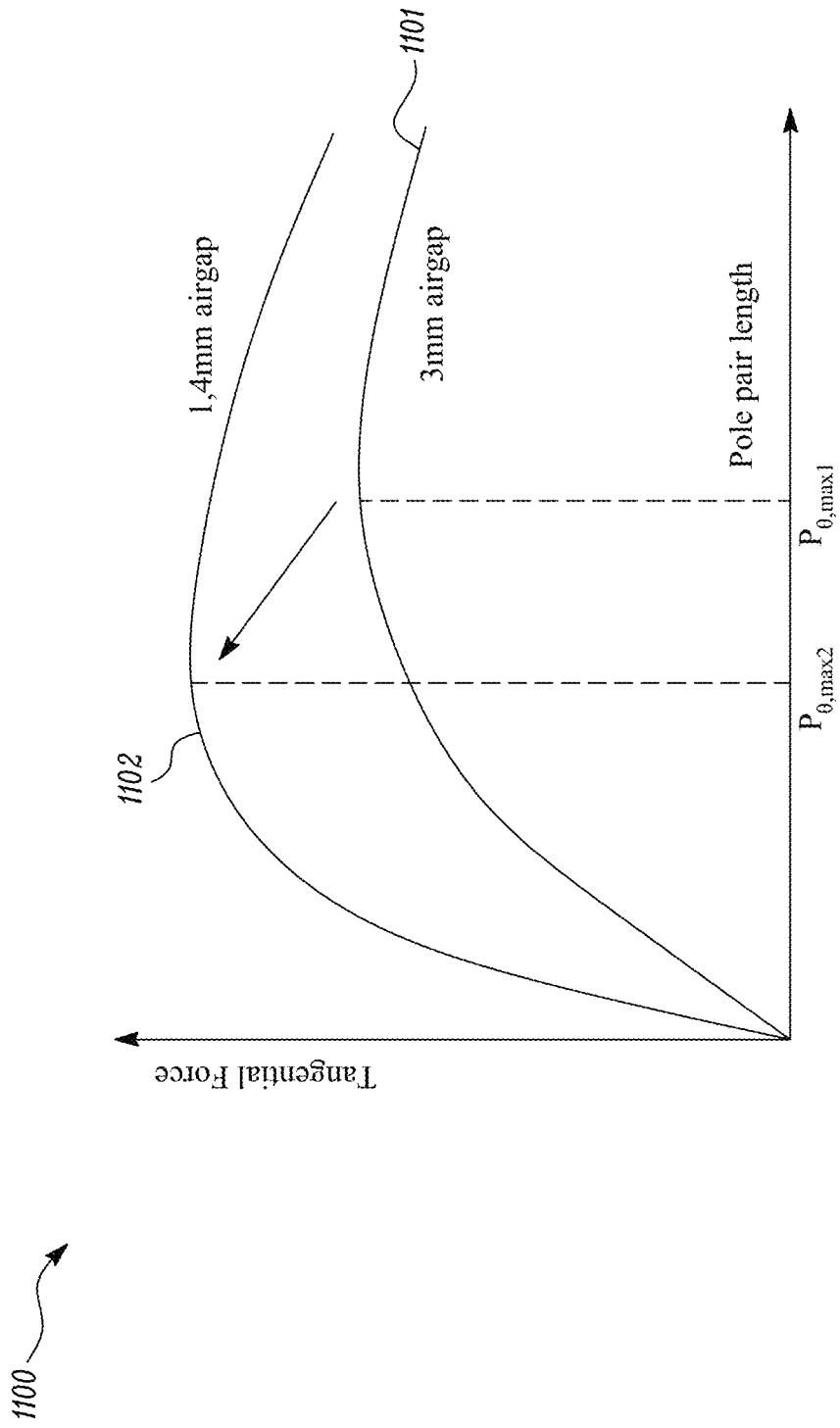
FIG. 15 is an example of a plot illustrating how the tangential force developed in a rotary electrical machine varies with air gap size and pole pitch.

FIG. 15 is a plot 1100 illustrating how, for a motor of a given diameter, the tangential force (y-axis) developed by the motor varies with the pole pitch, $P_\theta$(x-axis), and the air gap width, $G_{Air}$. Two plots 1101, 1102 corresponding to two air gap widths are shown: a 3 mm air gap (plot 1101) and a smaller 1.4 mm air gap (plot 1102). These values are shown purely for the purpose of explanation.

As can be seen from both plots 1101, 1102, at small values of the pole pitch, $P_\theta$, the tangential force increases as the pole pitch increases. However, the tangential force eventually reaches a maximum at a particular value of the pole pitch $P_{\theta,max}$. Increasing the pole pitch beyond $P_{\theta,max}$ decreases the tangential force and thus reduces the torque developed by the motor. By comparing the two plots 1101, 1102, it is also shown that: (i) the tangential force increases as the air gap decreases; and (ii) the value of $P_{\theta,max}$ decreases as the air gap decreases.

From FIG. 15, it may be appreciated that to increase the torque density of a motor of a given diameter, it is desirable to decrease the air gap width. However, for a given air gap width, torque production may only be maximized if the pole pitch may be decreased to $P_{\theta,max}$. In a radial flux motor, the extent to which $P_\theta$ may be decreased (e.g., by increasing the number of pole pairs) is limited by competition for space in the stator. In a transverse flux motor, however, the extent to which $P_\theta$ may be decreased (e.g., by increasing the number of pole pairs) may instead only be limited by manufacturing constraints and the flux guiding efficiency of the stator iron. Thus, a transverse flux motor may access an upper-left region of the plot 1100 corresponding to high torque density, whereas a radial flux motor may only access a relatively lower-right region of the plot.

In accordance with the present disclosure, to further optimize a motor for use in an EPU of a VTOL aircraft, the value of a motor parameter γ, defined in Equation (9) as the product of the pole pitch, $P_\theta$, and the air gap width, $G_{Air}$, may be selected to be in the range 5 to 100 micro radian-metres. Table 6 shows examples of values of γ for three example motors in accordance with the present disclosure. Values are provided in micro radian-meters.

TABLE 6

| Y ($10^{-6}$ radian-meters) | | |
| --- | --- | --- |
| Example 1 | Example 2 | Example 3 |
| 11.0 | 26.7 | 68.1 |

For motors sized for VTOL aircraft, the selection of a value of γ in this range may optimize the torque-producing tangential force and thus increase the active parts torque density, $p_{act}$. Small values of $P_\theta$(e.g., less than or equal to 10 degrees, or less than 5 degrees) and high values of the pole pair number (e.g., at least 15, or greater than or equal to 50) may be provided, along with small values of the air gap width (e.g., less than or equal to 1.5 mm). Motors in accordance with the present disclosure may have more than one air gap because of the use a dual rotor design and/or the use of axial stacking of active parts to implement multiple lanes. All air gaps of a given motor may be approximately the same size, such that the value of γ will be approximately the same for all air gaps of a motor. Where different air gaps are used, however, the largest air gap may be used to calculate γ as the largest air gap may limit the torque density.

Motor-inverter combinations in accordance with the present disclosure may also have optimized values of a parameter Π, defined in Equation (11). Π is the ratio of the pole arc length, $P_L$ (see Equation (28)) and the maximum value of the electrical frequency, $f_{max}$, of the current output by the inverter and received by the stator coils of the motor during use. In accordance with the present disclosure, the value of Π may be between 1 and 30 μms, which is unusually low. Table 7 shows examples of values in accordance with the present disclosure.

TABLE 7

| | $P_L$ (mm) | $f_{max}$ (kHz) | Π (μms) |
| --- | --- | --- | --- |
| Example 1 | 7.0 | 1.5 | 4.7 |
| Example 2 | 4.2 | 0.6 | 7.0 |
| Example 3 | 17.5 | 1.2 | 14.6 |

As described above with reference to FIG. 4, particularly in point d), the propulsion system of a VTOL aircraft has a large number of inverters as a result of its distributed propulsion system and fault tolerant electrical architecture. This results in the stacking of inverter losses and provides that inverter efficiency may have a significant impact on performance (e.g., aircraft mission range). Selecting an unusually low value for Π(e.g., in a range of 1 to 30 μms or in a range of 3 to 15 μms) has been found to reduce inverter losses when operating at a relatively low rotor speed. The use of a low value of Π may therefore not only reduce inverter losses, but also allow for the omission of a speed-reducing gearbox in the EPU without sacrificing low aerodynamic noise or motor efficiency.

An important consideration in the context of aerospace electrical machines is fault tolerance. In accordance with the present disclosure in which the electrical machines may be the permanent magnet type, the tolerance to a stator terminal short circuit fault may be particularly important.

In the event of a stator terminal short circuit fault (e.g., a short circuit fault condition in the electrical network connected to the stator terminals), the rotation of the rotor will drive a fault current into the network for as long as the rotor excites the stator windings. In motor designs that feature rotor windings, it is possible to stop excitation of the rotor windings to prevent the excitation of a voltage in stator windings and thus stop the fault current. However, in a permanent magnet motor, the rotor is permanently excited and will, unless the permanent magnets are demagnetized or the rotor is moved away from the stator, continue to excite a voltage in the stator windings that will drive the fault current. With zero or little impedance in the short-circuited electrical network, this fault current may be very large. The heat dissipated by the stator windings, which causes heating of the coil insulation, increases with the square of the current ($I^2R$ losses).

One potential mitigation to this problem is for the EPU to include a mechanism or device to physically disconnect the permanent magnet rotor from the propeller fan so that the inertia of the propeller does not continue to force rotation of the rotor. For example, a freewheel transmission may be included in the EPU. However, this solution may add mass, complexity, and maintenance requirements to the EPU. Another potential mitigation would be to provide additional overrating to the cooling system of the motor, so that the cooling system may maintain the temperature of the insulation at or below its rated temperature even in the presence of a terminal short circuit fault. However, this also adds mass to the EPU and may make air cooling (described in more detail below) unfeasible, adding even more mass to the EPU due to the requirement to adopt liquid cooling.

In accordance with the present disclosure, an electrical machine may have a short-circuit insulation temperature parameter, $\zeta$ defined in Equation (17) that satisfies the inequality:

$$\zeta = \frac{\theta_{ins,cont}(I_{SC})}{\theta_{ins,cont}(I_{cont})} \leq 1.1.$$

In the above equation, $I_{SC}$ is the steady-state short circuit current, and $I_{cont}$ is the continuous rated current (e.g., the highest current the stator coils are rated to carry for a sustained period; this is associated with production of the maximum continuation rated torque, $\tau_{max,cont}$) $\theta_{ins,cont}(I_{SC})$ is the temperature of the insulation when carrying the steady-state short circuit current, and $\theta_{ins,cont}(I_{cont})$ is the temperature of the insulation when carrying the continuous rated current. Designing a motor to have a short-circuit insulation temperature parameter, $\zeta$ less than or equal to 1.1 may allow the stator coils and their insulation to be sufficiently cooled following a terminal short circuit fault without additional overrating the cooling system. A value of $\zeta$ in the range of 0.7 to 1.0 may be provided and may, for example, allow for the use of air cooling in a transverse flux motor without additional overrating of the cooling system or a reduction in the performance of the motor during normal operation.

Additionally or alternatively, a short circuit current ratio, $\zeta$ defined in Equation (16), may satisfy the inequality:

$$0.5 \leq \xi = \frac{I_{SC}}{I_{peak}} \leq 1.2$$

In the above equation, $I_{peak}$ is the peak rated current (e.g., the current associated with production of the peak rated torque, $\tau_{peak}$) A value of this ratio in a range of 0.6 to 0.9 (e.g., in a transverse flux motor) may strike a good balance between fault tolerance and good electrical and mechanical performance.

A further motor design optimization in accordance with the present disclosure is to select a design with a value of a characteristic motor parameter $\Delta$, defined in Equation (6), greater than or equal to 65 Nmkg$^{-1}$. Table 8 shows the calculation of $\Delta$ for three exemplary transverse flux motors, sized for use in the EPU of a VTOL aircraft.

TABLE 8

| | $\rho_{act}$ (Nmkg$^{-1}$) | cos(∅) | $\Delta$ (Nmkg$^{-1}$) |
|---|---|---|---|
| Example 1 | 85 | 0.65 | 131 |
| Example 2 | 95 | 0.75 | 127 |
| Example 3 | 74 | 0.85 | 87 |

The selection of a value of greater than or equal to 65 Nmkg$^{-1}$, particularly a value in a range of 80 to 190 Nmkg$^{-1}$, may provide a surprising combination of low EPU mass and fault tolerance. For example, such a selection may correspond to a sweet spot in the combined mass of an EPU's motor, inverter, and cooling system while offering good tolerance against stator terminal short circuit faults. This may be understood in terms of the effect of the power factor and its relationship with the torque density of the motor. A motor with a low power factor may require oversized power electronics but will also have a lower steady state terminal short circuit current. Thus, the selection of the power factor affects the inverter mass and also the required cooling system mass, as the cooling system may be sized to cool the motor under short circuit conditions. At the same time, the value of the power factor is mediated by the inductance of the motor, which depends on the quantity and distribution of active parts. This affects the active parts mass and the peak rated torque. A value of $\Delta$ in a range of 80 to 190 Nmkg$^{-1}$ may strike an effective balance between these competing requirements.

It is also useful to introduce a motor parameter Z, defined in Equation (14) as the product of the power factor of the motor and active parts mass divided by the efficiency, $\eta$, of the motor. The efficiency is defined as the efficiency when the motor is producing the maximum continuous rated torque, $T_{max,cont}$, at ISA sea level conditions. Table 9 illustrates values of Z in accordance with the present disclosure. The values of Z are notably low and may be associated with a strong balance between efficiency and fault tolerance in a motor sized for VTOL aircraft.

TABLE 9

| Z (kg) | | |
|---|---|---|
| Example 1 | Example 2 | Example 3 |
| 11 | 7.2 | 14.5 |

In accordance with the present disclosure, the value of Z may be less than or equal to 30 kg or in a range of 5 to 15 kg. This may be achieved most effectively in a transverse flux motor, where the inductance may be tuned to achieve a desirable power factor, (e.g., in a range of 0.6 to 0.9), without a significant negative impact on the efficiency of the motor. In a radial flux motor, the length of the magnetic circuits (illustrated in FIG. 5B) may be shorter than those in a similarly-sized transverse flux motor (illustrated in FIG. 8). The tuning of the inductance of the radial flux motor may therefore require the addition of significant active parts mass, or the selection of a sub-optimal design (e.g., the selection of long and narrow stator teeth; see FIG. 6, design (i)), which may increase the inductance but at the same time reduce the efficiency of the motor.

In a similar manner, a value of a motor parameter $\lambda$, defined in Equation (20) as the product of the efficiency and the inductance of the machine divided by its active parts mass, may be tuned to improve balance between efficiency and fault tolerance. Table 10 illustrates values of $\mu$ in accordance with the present disclosure. The values of $\lambda$ are notably high.

TABLE 10

| $\lambda$ ($\mu$Hkg$^{-1}$) | | |
|---|---|---|
| Example 1 | Example 2 | Example 3 |
| 6.8 | 1.8 | 3.0 |

The value of $\lambda$ may be selected to be greater than or equal to 1.4 $\mu$Hkg$^{-1}$, while values in the range of 2.1 to 5.5 $\mu$Hkg$^{-1}$ may provide a particularly good balance between the competing constraints. The machine inductance itself, $L_{machine}$, may be relatively high, especially relative to the mass of the active parts (i.e., $L_{machine}$ divided by $m_{act}$ may be particularly high).

Another important consideration in the design of a motor for an EPU of an aircraft is the capability of the cooling system of the motor. The cooling system may be capable, at all relevant operating conditions, of removing heat from the motor at a rate sufficient to keep the motor below a rated temperature. Herein, the rated temperature may be a maximum rated temperature of the coil insulation, $\theta_{ins,max}$. The cooling system may significantly add to the mass of the EPU, and this additional cooling system mass ($m_{cool}$) is multiplied by the number of EPUs on the aircraft. Thus, rather than designing an EPU with a high torque production capability and an aggressive cooling system, which may have a high mass, it may be desirable to consider a parameter $\nabla$, defined in Equation (12):

$$\nabla = \frac{\tau_{max,cont}}{m_{act} \times C_{max,cont}} \quad (12)$$

In this equation, $\tau_{max,cont}$ is the maximum continuous rated torque, and $C_{max,cont}$ is the heat capacity cooling rate required to maintain the coil insulation at or below its rated temperature, $\theta_{ins,cont}$ assuming operation at ISA sea level conditions. $C_{max,cont}$ may be defined as the product of the specific heat capacity of a coolant of the cooling system (at ISA sea level conditions) multiplied by the mass flow rate of the coolant required to maintain the coil insulation at or below $\theta_{ins,max}$. In accordance with the present disclosure, a value of $\nabla$ may be selected so that the combined mass of the active parts and the cooling system may be optimized relative to the torque producing capability of the motor. Table 11 illustrates values of $\nabla$ for a motor sized for an EPU of an aircraft in accordance with the present disclosure. The values of $\nabla$, which are notably high, are quoted in units of $Kskg^{-1}$ (Kelvin-seconds-per-kg):

TABLE 11

| $\nabla$ (Kskg$^{-1}$) | | |
|---|---|---|
| Example 1 | Example 2 | Example 3 |
| 0.19 | 0.27 | 0.55 |

The value of $\nabla$ may be selected to be greater than or equal to 0.1 Kskg$^{-1}$, greater than or equal to 0.18 Kskg$^{-1}$, or greater than or equal to 0.21 Kskg$^{-1}$.

It is also useful to introduce a dimensionless figure of merit, F, for a motor of a VTOL aircraft. F is defined in Equation (22):

$$F = \frac{\tau_{max,cont}}{m_{act}} \frac{p_{air,0}}{C_p \dot{m}_{max,cont}(\theta_{ins,max} - \theta_{air,0})} \frac{2\pi \times D_{ref}}{\omega_{mech,cont}} \left(\frac{D_{ref}}{D_{act}}\right)^2 \quad (22)$$

In this equation, $\tau_{max,\,cont}$ is the maximum continuous rated torque, mast is the active parts mass, $C_p$ is the specific heat capacity of the coolant at ISA sea level conditions, $\theta_{ins,max}$ is the maximum rated temperature of the insulation for operation at the maximum continuous rated torque, $\dot{m}_{max,cont}$ is the mass flow rate of the coolant required to maintain the insulation at or below $\theta_{ins,max}$ during ISA sea level operation at $\tau_{max,\,cont}$, $\omega_{mech,cont}$ is the angular speed of rotation (in radians per second) of the rotor of the motor while producing the maximum continuous rated torque, and $D_{act}$ is the active parts diameter. The remaining values are fixed, nominal operational, values: $P_{air,0}$ is a nominal ambient air pressure equal to 100 kPa, $^\circ$ air$_0$) is a nominal ambient air temperature of 318 Kelvin, and $D_{ref}$ is a nominal motor diameter set equal to 0.5 meters.

For the purposes of comparing two motors, any value may be selected for $D_{ref}$ as long as the same value of $D_{ref}$ is used for both calculations. The value of F is decreased by using an active parts diameter, $D_{act}$, greater than $D_{ref}$ but increased by using an active parts diameter, $D_{act}$, less than $D_{ref}$. In other words, the equation for F penalizes the use of an arbitrarily large active parts diameter to meet the torque and speed requirements of the motor, as the use of an arbitrarily large diameter would create installation and aerodynamic drag issues. The selection of 0.5 meters for $D_{ref}$ reflects that 0.5 meters is a reasonable value for certain EPU designs. If calculating and comparing values of F for a smaller platform (e.g., an unmanned aerial vehicle (UAV) or drone), a smaller value of $D_{ref}$ may be selected (e.g., 0.1 meters). If calculating and comparing values of F for a larger platform (e.g., a larger aircraft), a higher value of $D_{ref}$ may be selected (e.g., 1.0 meters). Accordingly, in Equation (22), it is the value of $D_{act}$, and not $D_{ref}$, that characterizes the motor.

In order to provide a particularly good balance between the competing requirements of physical size (e.g., active parts diameter), mass, torque production, and cooling, electrical machines in accordance with the present disclosure may have a particularly high value of F. The first two rows of Table 12 illustrate values of F for motors in accordance with the present disclosure. For comparison, the third line of Table 12 illustrates the value of F for an exemplary radial flux motor designed for use in a CTOL aircraft having a more conventional value of F.

TABLE 12

| | F |
|---|---|
| Air-cooled transverse flux motor (VTOL) | 5.2 |
| Liquid-cooled radial flux motor (VTOL) | 2.3 |
| Liquid-cooled radial flux motor (CTOL) | 0.3 |

According to the present disclosure, the value of F may be greater than or equal to 1.9. In some examples of electric motors for EPUs of VTOL aircraft, particularly those utilizing a transverse flux arrangement, the value of F may be greater than or equal to 2.5.

A motor and EPU for these applications may use an air cooling system. This is partly due to a reduction in the complexity and maintenance requirements associated with a liquid cooling system. However, a potentially more significant benefit is the reduction in the cumulated mass of the components of the cooling system, which may otherwise make a substantial contribution to the EPU mass and platform mass. For example, a liquid cooling system will include not only the mass of the liquid coolant, but may also include: the mass of the coolant tank; conduits (e.g., piping) through which the coolant flows; the mass of pumps, valves, and other fluid flow modulating components; the mass of filters; and the mass of heat exchangers. In one example, the mass of a liquid cooling system sized for a motor of a VTOL aircraft EPU is about 14 kg, representing approximately 20-25% of the overall mass of the motor. If each one of the six EPUs of the exemplary VTOL aircraft 1 of FIG. 1 had such a cooling system, the total motor cooling system mass for the entire aircraft would be about 84 kg, which is on the order of the mass of a passenger. In contrast, an example of an air-cooling system having a mass generally limited to the mass of filter components and flow directing components may only be about 3-5 kg per EPU.

While the advantages of selecting an air-cooling system may be clear, implementing an air-cooling system in a motor for an EPU of a VTOL aircraft requires more consideration. Air has a relatively low specific heat capacity compared with certain liquid coolants (e.g., 1006 $Jkg^{-1}K^{-1}$ for air, compared with 1745 $Jkg^{-1}K^{-1}$ for one oil-based coolant), and the available mass flow rate may be limited in VTOL applications due to both the low density of air compared to liquid and the relatively slow movement of the aircraft at some operating points. This may limit the rate at which heat may be removed from the motor. If the slot current density, $J_{slot}$, is high, there will be high resistive losses ($I^2R$ losses) and/or a lack of free space in the slot to effectively cool the coils, which may make air-cooling impractical. If the slot current density, $J_{slot}$, is too low, the motor may not be able to meet its torque production requirements.

In accordance with the present disclosure, the selection of a transverse flux motor with one or more of the optimizations described above (e.g., an optimized value of γ to access the peak of the torque curve illustrated in FIG. 15) may allow for use of air cooling in an EPU of a VTOL aircraft, particularly where the flow of cooling air is supplied to directly contact the coils. FIGS. 16 to 22 illustrate transverse flux electrical machines with air cooling systems and, more specifically, transverse flux motors with directly cooled conductors.

Figure 16A:
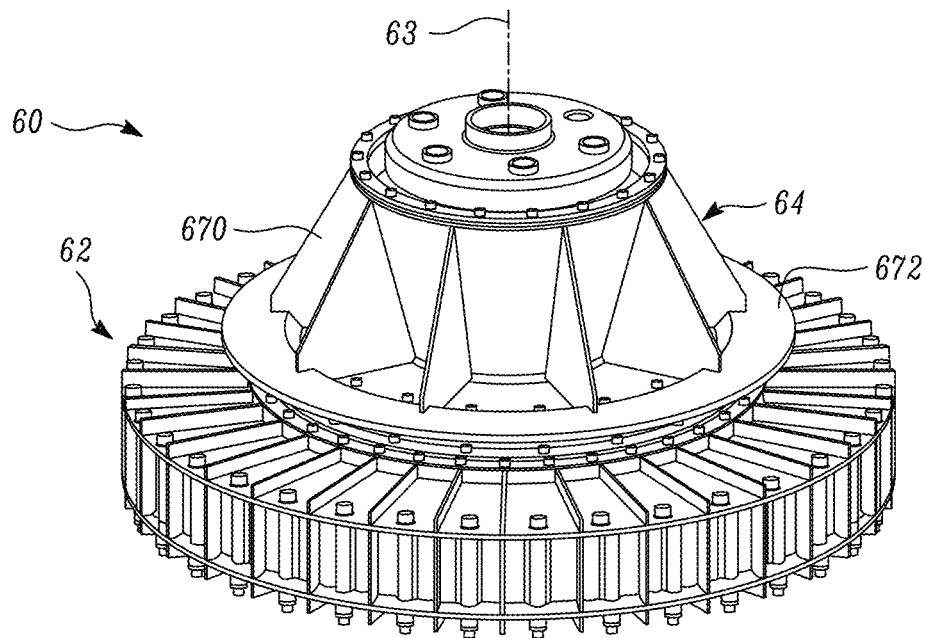
FIG. 16A is a perspective view of an example of a transverse flux electrical machine.
Figure 16B:
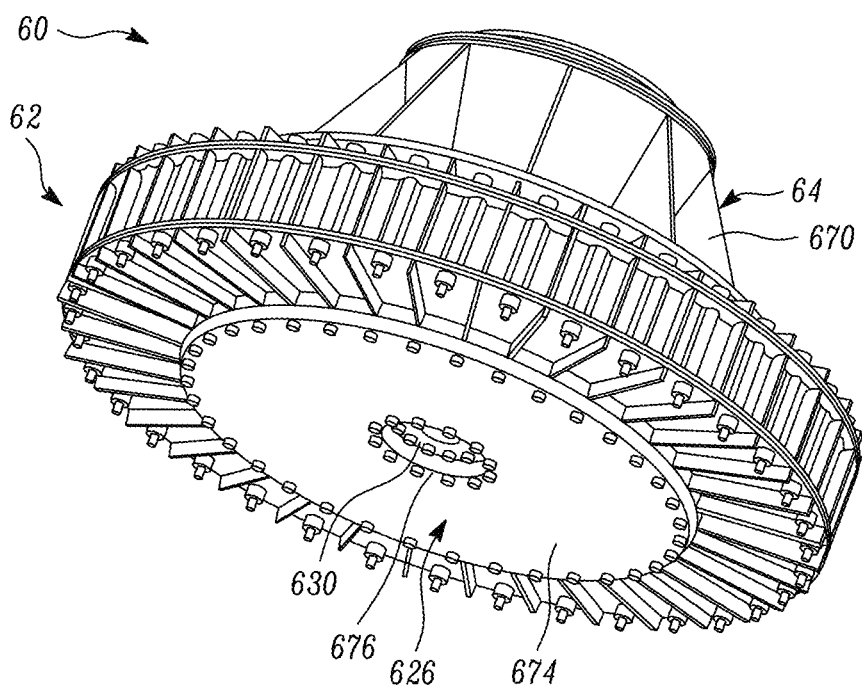
FIG. 16B is another perspective view of an example of a transverse flux electrical machine, further showing components of a clutch mechanism of the electrical machine.

FIG. 16A and FIG. 16B show a motor 60 in perspective view. The motor 60 includes a rotor 62 that is coupled to a drive shaft 630 via a coupling structure 626 and rotates about an axis of rotation 63. The motor 60 further includes a bearing unit 64. Reinforcement ribs 670 are arranged circumferentially around the bearing unit 64 and the axis of rotation 63 and are fixed to the bearing unit 64 and to a base plate 672 of the bearing unit 64. The coupling structure 626 is visible in the perspective bottom view of FIG. 16B. At a radially outer region 674 of the coupling structure 626, the coupling structure 626 is connected to the rotor 62. At a radially inner region 676 of the coupling structure 626, the coupling structure 626 is connected to the EPU drive shaft 630.

Figure 17:
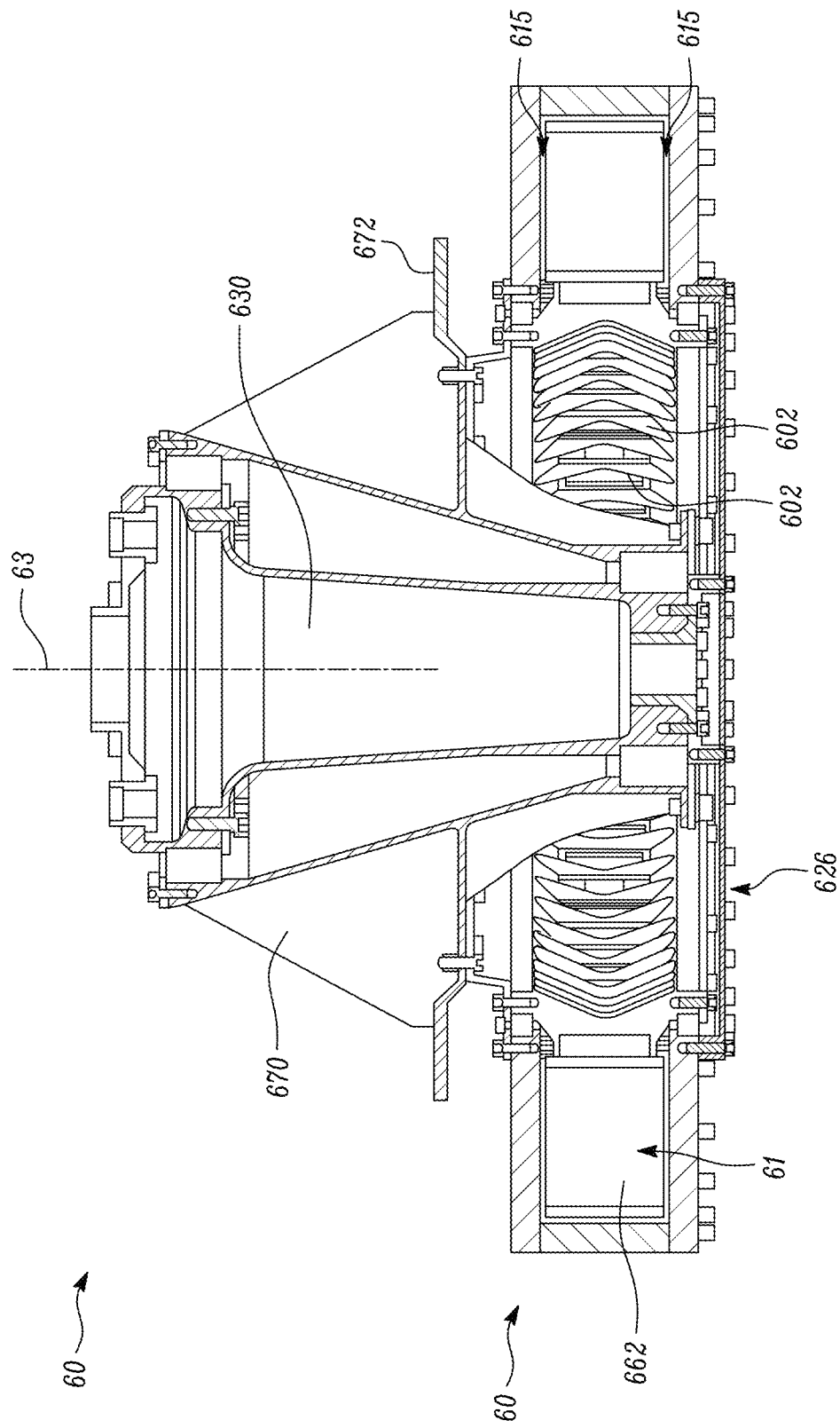
FIG. 17 illustrates an example of a cross-section of the transverse flux electrical machine of FIGS. 16A-B, showing additional components and a space in which the active parts of the machine are located.

FIG. 17 shows the motor 60 of FIGS. 16A and 16B in cross-section. FIG. 17 shows the same motor 60 as FIG. 11, but further shows cooling channels 602 in the stator 61 and omits the active parts for clarity. An empty volume 662 that would accommodate the active parts is labelled, as are the locations of axial air gaps 615 formed between the active parts of the stator 61 and the rotor 62. In operation, an external flow of ambient air that impinges on the EPU due to, for example, movement of the aircraft and/or wind enters the motor housing and is guided by the cooling channels 602 in a radially outward direction into the volume 662 where the active parts are located. Thus, the ambient air directly contacts and cools the active parts, including the stator coils.

For effective direct cooling, the volume 662 may not be completely filled and leaves space through which the cooling air may pass. For example, the stator coils 614 may define an effective cooling surface area that is directly exposed to air. FIGS. 18-20 illustrate an example of a stator phase module structure 610 by which the stator coils define an effective cooling surface area for direct cooling.

Figure 18A:
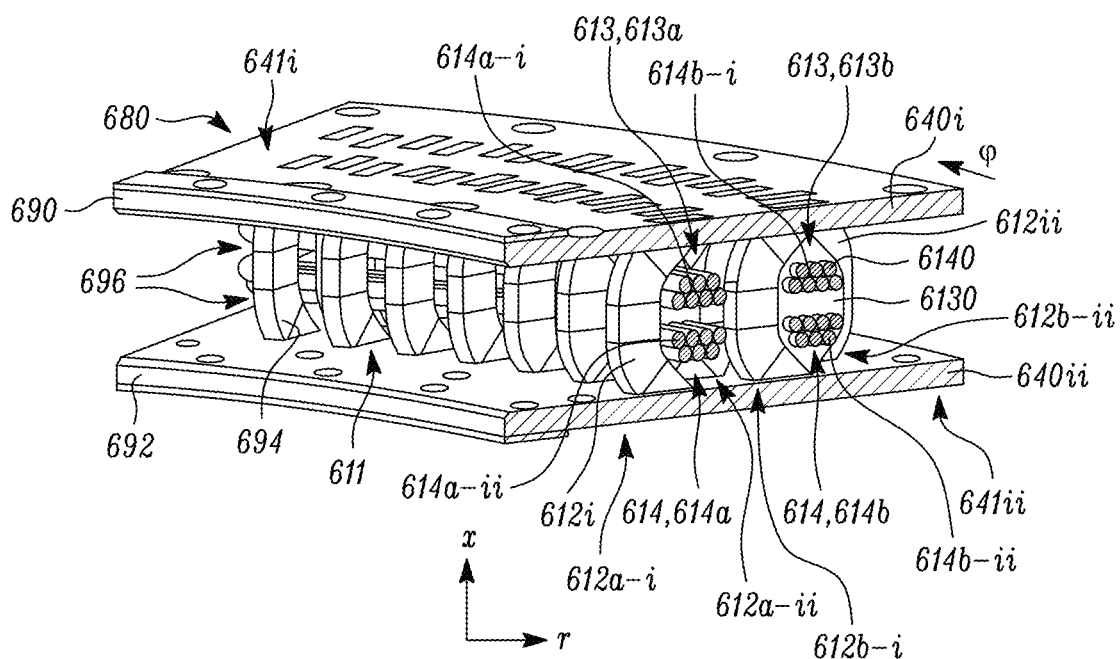
FIG. 18A is perspective view of an example of a portion of the stator of transverse flux electrical machine of FIG. 17.
Figure 18B:
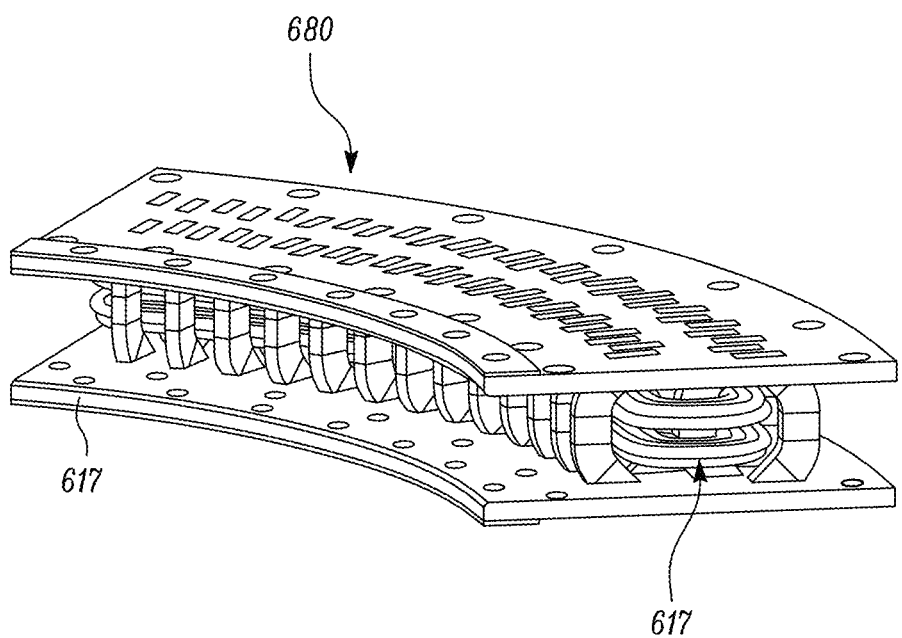
FIG. 18B is a perspective view of an example of the portion of the stator of FIG. 18A, further showing the end windings.

FIG. 18A and FIG. 18B show a stator phase module 610 mounted to its support structure 640. The phase module 610 is comparable to the one shown in FIG. 9B, which is referred to for a detailed explanation. FIG. 18A and FIG. 18B show the same embodiment; however, FIG. 18A is cut in a radial plane, enabling a view of the cross section of the first coil portion 614*a* and the second coil portion 614*b* of the coil 614, and the first slot portion 613*a* and the second slot portion 613*b* of the slot 613. FIG. 18B shows the end windings 617.

The stator according to FIG. 18A includes an assembly 680 that may be a modular (e.g., prefabricated) component. The assembly 680 extends in the radial direction (r) and in the circumferential direction ((p), and includes two axially spaced, non-magnetic and non-magnetizable support structures 640*i*, 640*ii*. These have radially inner fastening areas 690, 692, at which the support structures 640*i*, 640*ii* may be connected to a plurality of ribs of the stator. This is done, for example, via retaining projections of the ribs, as will be described with reference to FIG. 21.

Flux guiding stator elements 612 extend between the support structures 640*i*, 640*ii*, and collectively provide the flux guiding stator iron 611 of the stator. The stator elements 612 define the slots 613 (i.e., the winding space) extending in the circumferential direction, in which the coil 614 extending in the circumferential direction is arranged.

According to the present example, a flow of air (e.g., the flow of external ambient air that enters the EPU and is directed by the stator cooling channels 602 of FIG. 17) flows radially through the assemblies 680 in the region between the two support structures 640*i*, 640*ii* and flows across the stator elements 612 and the coil 614. This flow of air cools the stator elements 612 and the coil 614. The stator elements 612 are each aligned radially. The stator elements 612 each have two radially aligned side surfaces 694, 696 spaced apart in the circumferential direction, both of which are cooled by a cooling air flow.

The coil 614 includes multiple individual winding turns 6140 (see FIG. 18A) that are formed from a continuous winding wire. Further, each coil portion 614*a*, 614*b* of the coil 614 includes two axially spaced winding packages: the first coil 614*a* portion has a first axially spaced winding package 614*a-i* and a second axially spaced winding package 614*a-ii* in the first slot portion 613*a*, and the second coil portion 614*b* has a third axially spaced winding package 614*b-i* and a fourth axially spaced winding package 614*b-ii* in the second slot portion 613*b*. The winding packages 614*a-i*, 614*a-ii* 614*b-ii* each have sections extending longitudinally in the circumferential direction of the coil 614. As shown in FIG. 18B, through the deflected coil section that forms the end winding 617, the winding packages 614*a-i*, 614*a-ii*, 614*b-i*, 614*b-ii* form a coil 614. A corresponding end winding 617 is found at the other end of the coil 614.

Figure 19A:
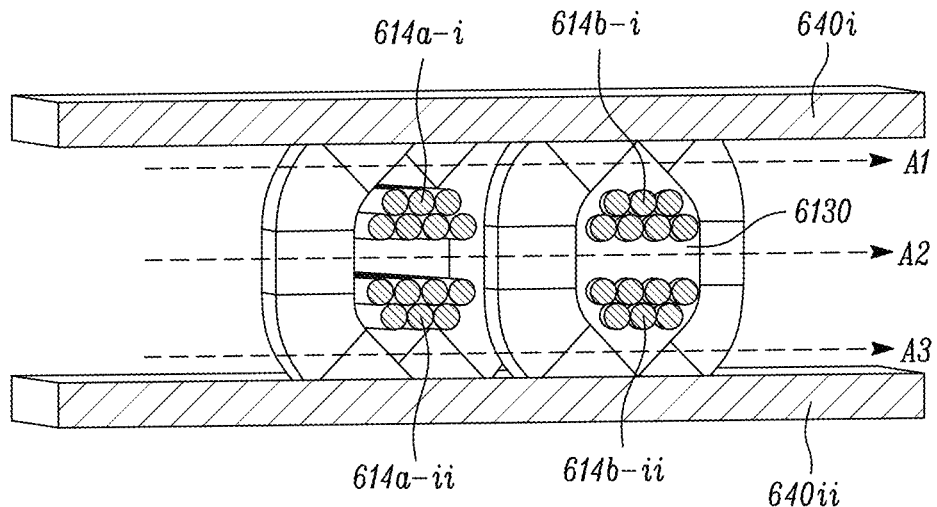
FIG. 19A is a further illustration of an example of a portion of the stator of the electrical machine of FIG. 17, showing how a stator slot may be divided into discrete regions to aid cooling.

The winding packages of each pair of winding packages 614*a-i*, 614*a-ii*, and 614*b-i*, 614*b-ii* are spaced apart in the axial direction from one another and from the support structures 640*i*, 640*ii*. In this way, cooling air may flow around the winding packages on their upper side and on their lower side. This is illustrated in FIG. 19A. The assembly 680 defines three radially extending and axially spaced cooling air flow passages A1, A2, A3 for cooling the winding packages 614*a-i*, 614*a-ii*, 614*b-i*, 614*b-ii*. A first cooling air flow passage A1 runs adjacent to the upper support structure 640*i*, a second cooling air flow passage A2 runs in an area between the winding packages 614*a-i*, 614*b-i* and the winding packages 614*a-ii*, 614*b-ii*, and a third cooling air flow passage A3 runs adjacent to the lower support structure 640*ii*. The division of the coil 614 into axially spaced winding packages 614*a-i*, 614*a-ii*, 614*b-i*, 614*b-ii* increases the surface area of the winding that is available for direct cooling. While two axially spaced windings packets per winding portion are shown in this example, more than two axially spaced winding packets may also be provided. Alternatively, it is also possible that only one winding package is arranged in each slot portion 613a, 613b.

According to FIG. 18A and FIG. 19A, two winding packets 614a-i, 614a-ii and 614b-i, 614b-ii, respectively, (or, e.g., one coil portion 614a, 614b) may each be fixed by a fixing material 6130 in the respective slot portion 613a, 613b. In the present example, the fixing material 6130 only slightly extends in the circumferential direction (e.g., being in the shape of a disk or plate) so as not to impair cooling by obstructing the cooling air flow. The fixing material may be arranged radially in front of or behind a stator element 612, so as to limit a reduction in the cross-section facing and exposed to a radial air flow.

To avoid physical contact of the coil 614 with the stator elements 612, a mechanical protective layer may also be applied to the stator elements 612 on the side facing the slot 613 (e.g., the slot portions 613a, 613b). For example, an aram id paper may be used, analogous to the use of slot papers in the slots of radial flux machines.

Referring again to FIG. 18A, the arrangement of the stator elements 612 for defining the slot portions 613a, 613b is shown. The stator elements 612 are arranged in four circumferential rows: two rows 612a-i, 612a-ii being of the first set 612a of stator elements 612 and defining the first slot portion 613a, and two rows 612b-i, 612b-ii, being of the second set 6122b of stator elements 612 and defining the second slot portion 613b.

The stator elements 612 are, like those shown in previous examples, curved and/or bent. For example, the stator elements 612 may be claw-shaped and/or curved in a C-shape. The stator elements 612 of the respective radially inner rows 612a-i, 612b-ii are concave, viewed from the radially outer side, and the stator elements of the respective radially outer rows 612a-ii, 612b-ii are convex, viewed from the radially outer side, so that their mutually facing sections together define the slot portions 613a, 613b. The stator elements 612 of each of the two rows delimit the slot portions 613a, 613b transversely to the circumferential direction. For this purpose, each stator element 612 of a given row (e.g., row 612a-i) forms a pair of stator elements with a circumferentially adjacent stator element belonging to a radially adjacent row (e.g. 612a-ii) of the same set of stator elements (e.g., 612a), and stator elements of a pair are oriented such that the stator elements of the pair oppose each other.

End portions (e.g., projections) of the stator elements 612 form pole heads (e.g., upper pole heads and lower pole heads; see, e.g., the pole heads 3122, 3123 in FIG. 7B). The end portions are positioned adjacent the permanent magnets of the rotor 62 and are separated from the permanent magnets of the rotor 62 only by an air gap (e.g., corresponding to the air gap 615 of FIG. 17). For this purpose, it is provided that the end portions or pole heads are each arranged in one of the support structures 640i, 640ii and terminate flush with their outer sides 641i, 641ii. Accordingly, the upper end portions of the stator elements 612 lie in the outer plane of the upper outer side 641i of the upper support structure 640i, as shown in FIG. 18A.

A motor includes a plurality of the assemblies 680, adjoining one another in the circumferential direction. For example, six assemblies 680 may be provided for the motor described with reference to FIGS. 9-11, with two per phase.

Figure 19B:
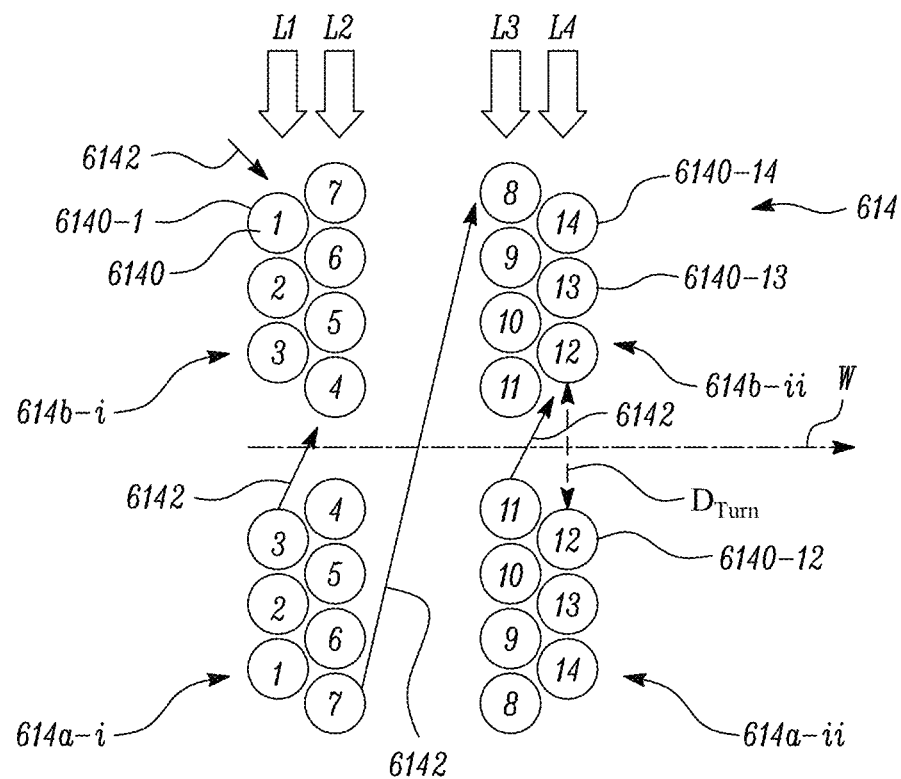
FIG. 19B is a schematic illustration of an example of how portions of the stator coil of FIGS. 18A-18B and 19A may be connected.

FIG. 19B is a schematic sectional view of an embodiment of a coil 614. The coil 614 has a continuous winding wire that is wound in a number of winding turns 6140, with each winding turn 6140 extending over an angle of 360°. A total of fourteen winding turns 6140 are provided in the exemplary embodiment considered. The coil 614 is configured such that the total of fourteen winding turns 6140 are arranged in four levels or coil layers L1, L2, L3, L4, with three winding turns 6140-1 to 6140-3 arranged in the first coil layer L1, four winding turns 6140-4 to 6140-7 arranged in the second coil layer L2, four winding turns 6140-8 to 6140-11 arranged in the third coil layer L3, and three coil turns 6140-12 to 6140-14 arranged in the fourth coil layer L4. In the embodiment shown, each coil layer L1, L2, L3, L4 is arranged in an axial plane, parallel to each other.

The winding order is indicated by the arrows 6142. From the winding sequence, it follows that in the case of the winding turns 6140 of the first coil layer L1, a turn diameter $D_{Turn}$ of the winding turns 6140 decreases as the number of winding turns increases. In other words, the continuous winding wire or conductor is moving inwards with every winding turn 6140 in the first coil layer L1. Thus, winding turn 6140-1 has a larger turn diameter than winding turn 6140-2, which has a larger turn diameter than winding turn 6140-3. "Turn diameter," in this context, refers to the average diameter of a 360° loop of one winding turn 6140 around winding turn axis "W', and not to the diameter of the wire or conductor. An example of the turn diameter $D_{Turn}$ is shown in FIG. 19B for the twelfth winding turn 6140-12. A winding turn with a smaller turn diameter lies radially (e.g., with respect to the winding turn axis) within an adjacent winding turn with a larger diameter. For example, winding turn 6140-2 lies within winding turn 6140-1.

In contrast, in the coil layer L2, the turn diameter of the winding turns 6140 increases with an increasing number of winding turns. For example, the winding turn 6140-5 has a larger turn diameter than the winding turn 6140-4. In the third coil level L3, the turn diameter of winding turns 6140 decreases again as the number of windings increases, and in the fourth coil level L4 the turn diameter increases again.

The described coil 614 forms winding packages 614a-i, 614a-ii, 614b-i, 614b-ii corresponding to the winding packages 614a-i, 614a-ii, 614b-i, 614b-ii of FIGS. 18A and 19A.

FIG. 20A shows an embodiment of a coil 614 with a structure according to FIGS. 19A-B in a view from above. FIG. 20A shows that the coil 614 may have a curved shape similar to that of a banana. Accordingly, the coil 614 includes longitudinally extending sections 614a, 614b that may be concavely bent. The longitudinally extending sections 614a, 614b are bent over and form deflected sections at the end windings 617. The top view of FIG. 20A shows the coil turns 6140-1, 6140-2, and 6140-3 of the first coil layer L1 of FIG. 19.

FIG. 20B schematically shows a coil 614 that corresponds to FIGS. 19A and 20A in terms of structure. The side view of FIG. 20B shows the individual coil layers L1, L2, L3, and L4 in which a plurality of winding turns 6140 are formed. Further, the coil 614 of FIG. 20B is additionally shown with fixing material 6130 in the form of fixing disks 6132 that correspond to the fixing material 6130 of FIGS. 19A and 20A, and serve to arrange and position the coil 614 in the slot 613.

The shape of the coil 614 in FIGS. 19A-19B and 20A-20B is a non-limiting example. In principle, the coil 614 (and/or the winding packages 614a-i, 614a-ii 614b-ii) in the winding diagram and structure shown in FIG. 19B may have other shapes, (e.g., circular, elliptical, or with a plurality of concave and convex areas). The use of fixing disks 6132 according to FIGS. 20A, 20B is also optional.

Figure 21:
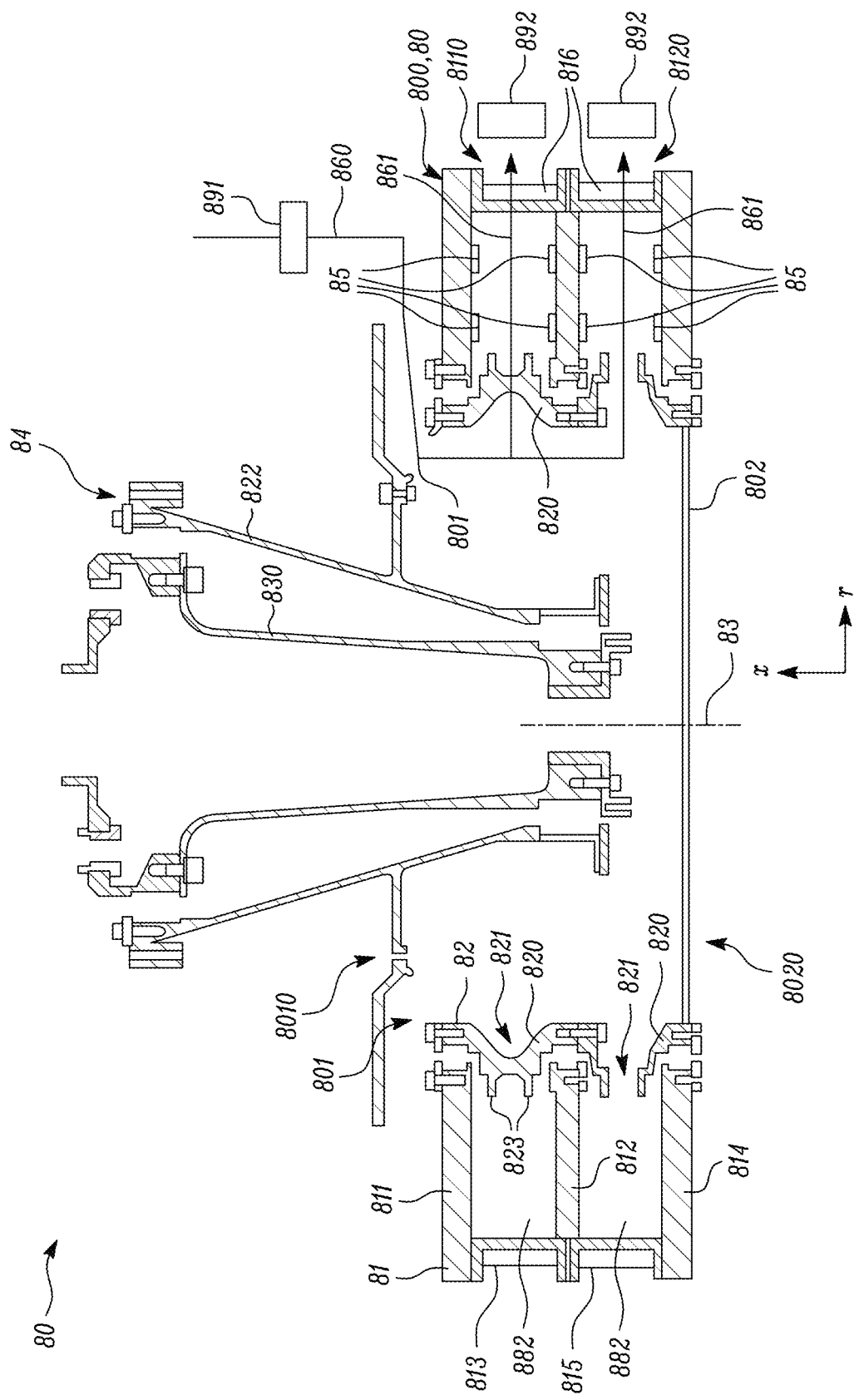
FIG. 21 is a schematic cross-section of an example of an air-cooled multi-lane transverse flux electrical machine.
Figure 22:
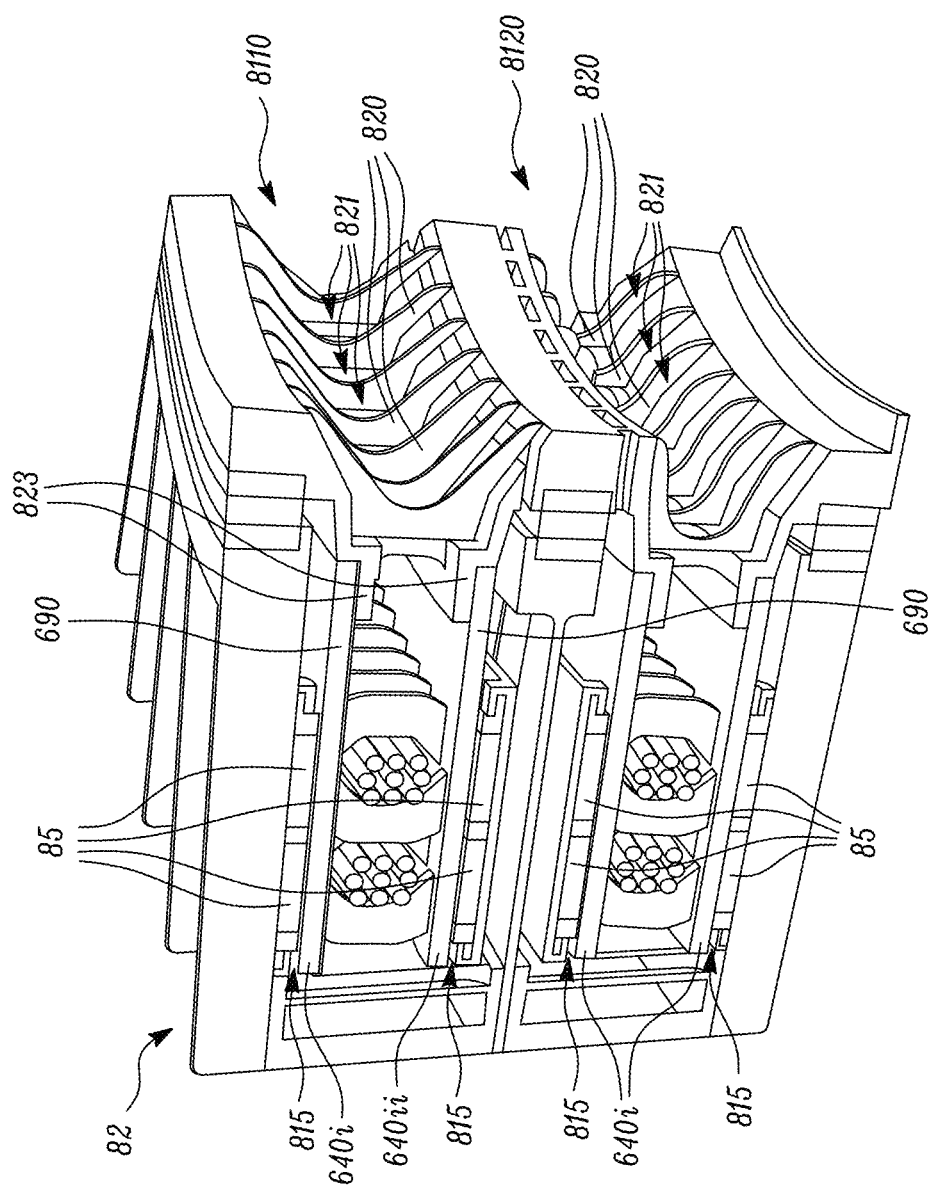
FIG. 22 is a perspective cutaway of an example of the transverse flux electrical machine of FIGS. 16A-B and 17, further showing the active parts.

As explained above with reference to FIG. 17, ambient air may enter a motor and be directed radially outwardly by channels 602 towards the active parts of the motor. As explained with reference to FIGS. 18A-B, 19A-B, and 20A-B, the stator phase modules may be arranged so that there are gaps (e.g., radial gaps between stator elements 612 and passages A1, A2, A3) for air flow for effective direct air cooling. FIGS. 21 and 22 illustrate this in more detail for a dual-lane transverse flux motor 80.

FIG. 21 shows an electric drive unit with the motor 80. In FIGS. 11, 16A-B, and 21, like reference numerals label like parts. The motor 80 includes a rotor 81, a stator 82, an axis of rotation 83, and a bearing unit 84. The bearing unit 84 includes an axially arranged, rotatable EPU drive shaft 830 and a static bearing part 822 that supports the EPU drive shaft 830. The coupling structure described with reference to FIGS. 16A and 16B is not shown in FIG. 21, but may be included in a corresponding manner. FIG. 21 shows a stator 82 as a ring structure with a large number of ribs 820 that adjoin one another in the circumferential direction and each form a cooling air passage 821 between the ribs 820. The active components of the stator 82 are held and positioned by the ribs 820. For this purpose, the ribs 820 have retaining projections 823.

A difference from FIGS. 11, 16A and 16B results from the fact that the motor unit of FIG. 21 includes two rotor-stator assemblies 8110, 8120, each forming a sub-machine of the dual-lane motor, which are axially stacked (e.g., arranged one behind the other in the axial direction) and are fixed to one another. Accordingly, the rotor 81 includes three axially spaced outer walls 811, 812, 814, each of which has or integrates permanent magnets 85, and two radially outer end walls 813, 815. The outer walls 811, 812, 814 and the end walls 813, 815 form two axially spaced volumes 882 of the two rotor-stator assemblies 8110, 8120, each containing the active components of the stator 82 of the respective assembly.

The permanent magnets 85 of the rotor are only shown on the right-hand side of FIG. 21 for the sake of clarity. The permanent magnets 85 are arranged on the insides of the outer walls 811, 812, 814. The air gap 615 shown in FIG. 17A runs between the permanent magnets 85 and the associated stator poles of the assembly.

FIG. 21 also shows how a cooling air flow may be provided through the cooling air passages 821 and the active components of the stator 82 arranged in the volume 882. The transverse flux machine may have a first end 8010 facing a mechanical load to be driven (e.g., a propeller) and a second end 8020 facing away from the load to be driven. In FIG. 21, the transverse flux machine forms openings 801 at its first end 8010, which enable an air flow 860 to enter the motor unit in an initially primarily axial orientation. This may be supported by a fan 891, which is, however, optional. For example, the airflow may come from a propeller driven by the EPU drive shaft 830.

The second end 8020 facing away from the load to be driven is hermetically sealed to prevent inflowing air from leaving the motor unit again in the axial direction. For this purpose, a cover plate 802 is provided, which is shown schematically. The cover plate 802 is connected to the stator 82 in FIG. 21, but may alternatively be connected to the rotor 81, or be formed by a coupling structure similar to the coupling structure 626 of FIGS. 11, 16A or the like, depending on the design.

By the cover plate 802, the inflowing air flow 860 flows radially outwards as an air flow 861 through the cooling air passages 821 and the active components of the stator arranged in the volume 882. The radial air flow 861 may also be optionally supported by fans 892.

The end walls 813, 815 of the rotor 81 are provided with radial openings 816 that enable the cooling air flow 861 to be directed into the environment. Alternatively, openings may be formed in the motor unit at the second end 8020 facing away from the load to be driven, while the first end 8010 facing the load to be driven may be sealed airtight in this case. A further alternative is that a cooling air flow is directed radially inwardly through the stator 82. For this purpose, an air flow located at the outer circumference of the rotor, which may originate from a propeller, for example, may be deflected by baffles or other deflecting mechanisms or devices, and guided through openings 816 in the walls 813, 815 of the rotor 81 into the stator 82. In this way, the radial direction of the air flow may be reversed, with the air flow going from radially outside to radially inside through the active components of the stator (e.g., that are arranged in the volume 882) and the cooling air passages 821.

FIG. 22 shows a detail cutaway and perspective view of the example motor 80 shown in FIG. 21. The first rotor-stator assembly 8110 and the second rotor-stator assembly 8120 (e.g., sub-machines) are visible. The connection between the radially inner fastening areas 690, 692 of stator assemblies 680 and retaining projections 823 of the stator 82 (e.g., integrally connected to the ribs 820, respectively) is also visible. Further, the axial air gaps 815, which are arranged between the permanent magnets 85 of the rotor 82 and each support structure 640$i$, 640$ii$, are indicated.

As noted above, for the purposes of aircraft (e.g., VTOL aircraft), an air cooling system may be used because of the associated reduction in EPU mass, complexity, and maintenance requirements. However, meeting the platform torque production requirements (e.g., with a high active parts torque density) while using air cooling may necessitate the use of direct air cooling (e.g., a cooling system in which heat is transferred directly from the coils into the cooling air, rather than via a heat exchanger). FIGS. 16 to 22 show motors 60, 80, stator modules 680, and coils 614 that incorporate spaces through which air may flow to directly cool the active parts. For example, the illustrated coils have multiple (e.g., two) winding packages to define an intermediate air passage A2 for direct cooling of axial inner regions of the coil, with additional spaces left in the axial outer regions to define axial outer air channels A1, A3.

Increasing the amount of free space in the active parts region (e.g., the empty volume 662 shown in FIG. 17) may improve the direct air cooling of the active parts, since the effective cooling surface of the coils (e.g., the percentage of the coil surface area directly exposed to the air) may be increased. However, this is balanced against the reduction in the slot current density that results from reducing the amount of conductor that is packed into the slot. Reducing the slot fill factor (e.g., packing factor) too far may necessitate an increase in the current, which may result in additional heat production ($I^2R$) that is greater than the additional heat removal capability of the cooling system gained from the reduced slot packing.

In accordance with the present disclosure, the coil design may be selected to tune the effective cooling surface area to optimize the balance between direct air cooling efficiency and slot current density. For example, the number of winding packages, the number of turns per winding package, the arrangement of turns within a winding package, the turn cross-section, the turn radius, or any combination thereof may be adjusted to optimize the effective cooling surface area. The effective cooling surface area percentage, expressed as a percentage, is defined in Equation (29):

$$\text{Effective cooling surface area} \% = \frac{\text{Exposed coil surface area}}{\text{Total coil surface area}} \times 100\% \quad (29)$$

In this equation, the total coil surface area is the sum of the surface areas of each winding turn of the coil. The exposed coil surface area is the sum of the areas that are exposed to the cooling flow of air for direct cooling.

Figure 23A:
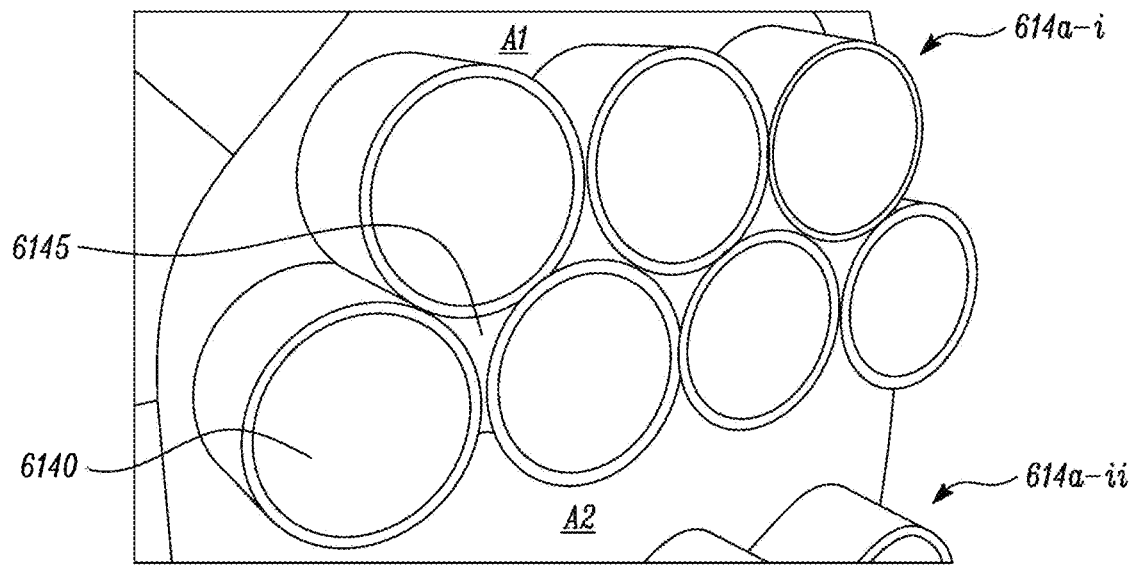
FIG. 23A illustrates an example of how the conductor cross-section and slot packing of a transverse flux electrical machine may be varied to optimize slot current density, torque generation, and cooling.
Figure 23B:
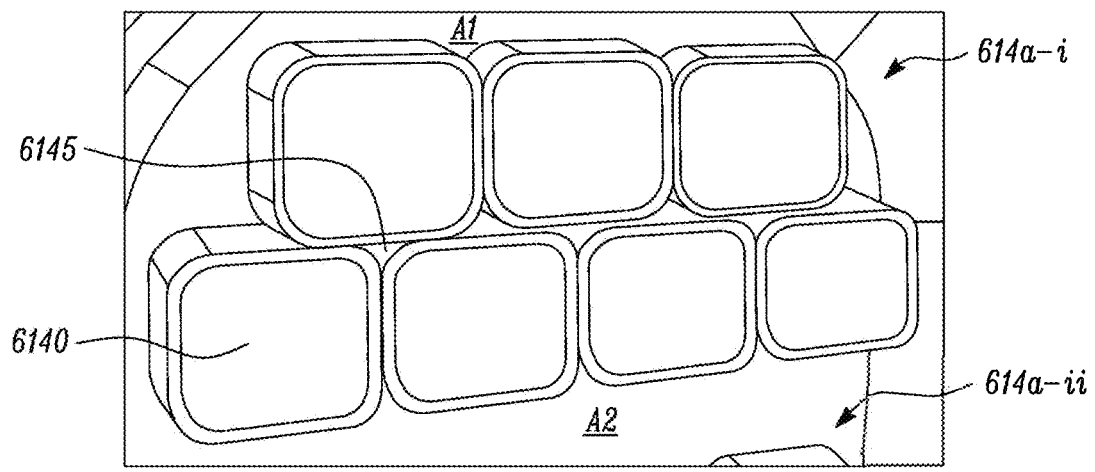
FIG. 23B illustrates an additional example of how the conductor cross-section and slot packing of a transverse flux electrical machine may be varied to optimize slot current density, torque generation, and cooling.

FIGS. 23A and 23B illustrate how, for a given number of winding packages and turns (e.g., in this case, two winding packages each having seven turns arranged in a trapezium shape), the effective cooling surface area may be tuned by adjusting the conductor cross-section and radius.

In the first example, depicted in FIG. 23A, each turn 6140 of the winding package 614a-i has a circular cross-section. In the second example, depicted in FIG. 23B, each turn 6140 of the winding package 614a-i may have a rectangular cross-section with rounded corners. In both cases, the turns 6140 are arranged in two rows: a first row of three turns and a second row of four turns, wherein the turns are packed as closely as possible. The effective cooling surface area of the winding package 614a-i is the outer surface area of the winding package 614a-1, which is exposed to the flow of air. In both cases, the curvature of the turn cross-section results in empty central regions 6145 that are not occupied by conductor but are also inaccessible to cooling air, and thus do not form part of the effective cooling surface area.

Comparing the first and second examples, the empty central regions 6145 are larger in the example in FIG. 23A than in the example in FIG. 23B due to the greater curvature of the turns in the example in FIG. 23A. This reduces the slot current density, which reduces torque production, without offering any improvement in cooling. However, portions of the effective cooling surface areas adjacent regions A1, A2 (e.g., corresponding to the air flow passages A1, A2 in FIG. 19A) are larger in the example in FIG. 23A than in the example in FIG. 23B. Specifically, the rectangular shape of the turns in the example in FIG. 23B results in linear, planar effective cooling surfaces adjacent regions A1, A2. The result of this is that the surfaces adjacent to the air flow passages A1, A2 only expose one side of the rectangle (e.g., slightly over 25%) to the cooling air. In contrast, the curvature of the circular turns 6140 in the example in FIG. 23A results in cooling surface areas adjacent regions A1, A2 that are non-linear. This exposes more of the turn surface area (e.g., slightly under 50%) to the cooling air. Overall, the example in FIG. 23B has a slightly higher packing factor and slot current density, resulting in slightly greater torque production. However, the example in FIG. 23A has superior cooling due to the greater cooling surface area adjacent the air passages A1, A2.

In accordance with the present disclosure, the effective cooling surface area may be at least 25% of the overall surface area of the coil. Values of between 35% and 70% may strike a particularly good balance between cooling and torque production in a transverse flux motor.

For completeness, Table 13 summarizes the configuration and properties of a transverse flux electrical machine that is optimized for the use in the EPU of a VTOL aircraft. This is merely one example and does not limit the present disclosure to an electrical machine of this configuration.

TABLE 13

| | Air-cooled 150 KW Dual-Lane Transverse Flux Motor |
|---|---|
| Air gap configuration | Double rotor, axial air gap |
| Lane Configuration | Two lanes, axially stacked active parts |
| Cooling system type | Direct air cooling |
| Continuous rated power ($P_{cont}$) | 150 kW |
| Peak rated power ($P_{peak}$) | 175 kW |
| Maximum continuous rated torque | 1300 Nm |
| Peak rated torque | 1440 Nm |
| Hover torque | 975 Nm |
| Rotor speed at maximum continuation rated torque ($\omega_{max,cont}$) | 120 rads$^{-1}$ |
| Rotor speed at hover ($\omega_{hover}$) | 96 rads$^{-1}$ |
| EPU tip speed ($v_{tip}$) | 171 ms$^{-1}$ |
| Efficiency ($\eta$) | 0.94 (94%) |
| Maximum continuous rated current | 200 A (RMS) |
| Peak rated current | 230 A (RMS) |
| Steady-state terminal short circuit current | 174 A (RMS) |
| Slot current density (peak) | 8.1 A/(mm)$^2$ |
| Continuous rated voltage | 900 V |
| Active parts diameter | 0.46 meters |
| Air gap | 0.7 mm |
| Active parts mass | 15.2 kg |
| Cooling system mass | 4.2 kg |
| Total motor mass | 56 kg |
| Conductor volume | 38.8 cm$^3$ |
| Iron volume | 61.1 cm$^3$ |
| Pole pair number $\left(\frac{N_P}{2}\right)$ | 80 |
| Pole pitch $\left(P_\theta = \frac{2\pi}{N_P}\right)$ | 0.039 radians (2 degrees) |
| Pole arc length $\left(P_L = \frac{P_\theta \times D_{Act}}{2}\right)$ | 8.97 mm |
| Machine inductance | 43 μH |
| Power Factor (cos (∅)) | 0.72 |
| Max. electrical frequency ($f_{max}$) | 1.4 kHz |
| Insulation rated temperature ($\theta_{ins, max}$) | 475 K |
| Coolant specific heat capacity ($C_p$) | 1006 Jkg$^{-1}$K$^{-1}$ |
| Required mass flow rate at $\tau_{max,cont}$ ($\dot{m}_{max,cont}$) | 0.27 kg |
| $C_{max,cont} = C_p \times \dot{m}_{max,cont}$ | 272 JK$^{-1}$ |
| $\rho_{act} = \frac{\tau_{peak}}{m_{act}}$ | 94.7 Nmkg$^{-1}$ |
| $\rho_{act+cool} = \frac{\tau_{peak}}{m_{act} + m_{cool}}$ | 74.2 Nmkg$^{-1}$ |
| $\Lambda = \frac{\tau_{peak}}{m_{act} \times J_{slot,peak}}$ | 11.7 μNm$^3$kg$^{-1}$A$^{-1}$ |
| $\Lambda^* = \frac{\tau_{peak}}{(m_{act} + m_{cool}) \times J_{slot,peak}}$ | 9.3 μNm$^3$kg$^{-1}$A$^{-1}$ |
| $\Gamma = \frac{V_{conductor}}{V_{iron}}$ | 0.64 |
| $\Delta = \frac{\rho_{act}}{\cos(\emptyset)}$ | 132 Nmkg$^{-1}$ |
| $\Delta^* = \frac{\tau_{peak}}{(m_{act} + m_{cool}) \times \cos(\emptyset)}$ | 103 Nmkg$^{-1}$ |
| $Y = P_\theta \times G_{Air}$ | 27.3 micro radian-meters |
| $Y^* = P_L \times G_{Air}$ | 6.3 μm$^2$ |

TABLE 13-continued

| | Air-cooled 150 KW Dual-Lane Transverse Flux Motor |
|---|---|
| $\Pi = \dfrac{P_L}{f_{max}}$ | 6.4 µms |
| $\nabla = \dfrac{\tau_{max,cont}}{m_{act} \times C_{max,cont}}$ | 0.31 Kskg$^{-1}$ |
| $\nabla^* = \dfrac{\tau_{max,cont}}{(m_{act} + m_{cool}) \times C_{max,cont}}$ | 0.24 Kskg$^{-1}$ |
| $Z = \dfrac{\cos(\emptyset) \times m_{act}}{\eta}$ | 11.6 kg |
| $Z^* = \dfrac{\cos(\emptyset) \times (m_{act} + m_{cool})}{\eta}$ | 14.9 kg |
| $\xi = \dfrac{I_{SC}}{I_{peak}}$ | 0.76 |
| $\zeta = \dfrac{\theta_{ins,cont}(I_{SC})}{\theta_{ins,cont}(I_{cont})}$ | 0.94 |
| $\beta = L_{machine} \times \rho_{act}$ | 4.1 mHNkg$^{-1}$ |
| $\lambda = \dfrac{\eta \times L_{machine}}{m_{act}}$ | 2.7 µHkg$^{-1}$ |
| $\lambda^* = \dfrac{\eta \times L_{machine}}{(m_{act} + m_{cool})}$ | 2.1 µHkg$^{-1}$ |
| F (see Equation (22)) | 6.2 |
| F* (see Equation (23)) | 4.9 |
| $\chi = \dfrac{v_{tip} \times m_{act}}{\tau_{peak}}$ | 1.8 sm$^{-1}$ |
| $\chi^* = \dfrac{v_{tip} \times (m_{act} + m_{cool})}{\tau_{peak}}$ | 2.3 sm$^{-1}$ |
| $\Psi = \dfrac{\tau_{hover}}{\omega_{hover}}$ | 10.2 Nmsrad$^{-1}$ |
| Effective cooling surface area | 42% |
| Slot fill factor | 28% |

Various examples have been described, each of which features various combinations of features. It will be appreciated by those skilled in the art that, except where clearly mutually exclusive, any of the features may be employed separately or in combination with any other features, and the disclosure extends to and includes all combinations and sub-combinations of one or more features described herein.

It is to be understood that the elements and features recited in the appended claims may be combined in different ways to produce new claims that likewise fall within the scope of the present disclosure. Thus, whereas the dependent claims appended below depend on only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. An electrical propulsion unit (EPU) for a vertical take-off and landing (VTOL) aircraft, the EPU comprising:
a propeller or a fan; and
an electric motor comprising:
a stator comprising coils configured to carry current; and
a rotor arranged to interact with the stator, wherein the rotor is configured to generate a torque for driving rotation of the propeller or the fan,
wherein the coils of the stator have a cumulated conductor volume $V_{conductor}$,
wherein the stator, the rotor, or the stator and the rotor comprise a flux guiding iron material configured to guide magnetic flux generated by the coils of the stator,
wherein the flux guiding iron material has a cumulated iron volume $V_{iron}$, and
wherein the electric motor has a machine parameter Γ that is greater than or equal to 0.25, Γ being defined as:

$$\Gamma = \dfrac{V_{conductor}}{V_{iron}}.$$

2. The EPU of claim 1, wherein the machine parameter Γ is less than or equal to 3.0.

3. The EPU of claim 1, wherein the machine parameter Γ is in a range of 0.3 to 1.0.

4. The EPU of claim 1, wherein the machine parameter Γ is in a range of 0.35 to 0.9.

5. The EPU of claim 1, wherein the electric motor is a transverse flux electric motor.

6. The EPU of claim 5, wherein the rotor of the transverse flux electric motor is ironless.

7. The EPU of claim 5, wherein the rotor of the transverse flux electric motor is a dual rotor comprising a first rotor portion and a second rotor portion spaced apart from the first rotor portion, the first rotor portion comprising a first set of permanent magnets and the second rotor portion comprising a second set of permanent magnets, and
wherein the stator is located between the first rotor portion and the second rotor portion.

8. The EPU of claim 7, wherein the first rotor portion and the second rotor portion are axially spaced apart, and the stator is provided axially between the first rotor portion and the second rotor portion.

9. The EPU of claim 5, wherein the stator of the transverse flux electric motor comprises the flux guiding iron material defining one or more stator slots housing the coils,
wherein each respective stator slot of the one or more stator slots is a circumferentially extending slot, a respective coil of the coils of the stator being configured, such that current flows through the respective coil in a circumferential direction, and
wherein the rotor of the transverse flux electric motor comprises a plurality of permanent magnets circumferentially distributed about the rotor.

10. The EPU of claim 9, wherein, for each respective stator slot of the one or more stator slots, the flux guiding iron material comprises a plurality of circumferentially arranged stator elements.

11. The EPU of claim 10, wherein each stator element of the plurality of circumferentially arranged stator elements comprises an axially extending body portion and a pair of axially spaced and radially extending projections that project from the axially extending body portion.

12. The EPU of claim 5, wherein the transverse flux electric motor is a multi-lane transverse electric motor comprising a first sub-machine and a second sub-machine,
wherein the first sub-machine comprises a first stator having first coils configured to carry current and a first rotor arranged to interact with the first stator, such that a first torque for driving rotation of the propeller or the fan is produced, wherein the second sub-machine comprises a second stator having second coils configured to carry current and a second rotor arranged to interact with the second stator, such that a second torque for driving rotation of the propeller or the fan is produced, wherein the first stator and the first rotor are coaxial with and axially spaced apart from the second stator and the second rotor, wherein the cumulated conductor volume $V_{conductor}$ is a cumulated volume of the first coils of the first stator and the second coils of the second stator, and wherein the cumulated iron volume $V_{iron}$ is a cumulated volume of the flux guiding iron material of the first stator, the first rotor, the second stator, and the second rotor.

13. The EPU of claim 1, wherein the cumulated conductor volume $V_{conductor}$ is in a range of 15 to 80 cm³.

14. The EPU of claim 1, wherein the cumulated iron volume $V_{iron}$ is in a range of 35 to 120 cm³.

15. The EPU of claim 1, wherein a peak rated power output of the electrical motor is in a range of 60 kW to 450 kW.

16. A vertical take-off and landing (VTOL) aircraft comprising:
an electrical propulsion unit (EPU) comprising:
a propeller or a fan; and
an electric motor comprising:
a stator comprising insulated conductive coils configured to carry current; and
a rotor arranged to interact with the stator and configured to generate a torque for driving rotation of the propeller or the fan,
wherein the insulated conductive coils have a cumulated conductor volume $V_{conductor}$,
wherein the stator, the rotor, or the stator and the rotor comprise an iron material configured to guide a magnetic flux generated by the insulated conductive coils of the stator,
wherein the iron material has a cumulated iron volume $V_{iron}$, and
wherein the electric motor has a machine parameter $\Gamma$ that is greater than or equal to 0.25, $\Gamma$ being defined as $$\Gamma = \frac{V_{conductor}}{V_{iron}}.$$

17. A transverse flux electric motor for an electrical propulsion unit (EPU) of an aircraft, the transverse flux electric motor comprising:
a stator comprising:
coils; and
a flux guiding iron material, wherein the coils are configured to carry current, wherein the coils have a cumulated conductor volume $V_{conductor}$, wherein the flux guiding iron material is configured to guide a magnetic flux generated by the coils, and wherein the flux guiding iron material has a cumulated iron volume $V_{iron}$; and
an ironless rotor comprising a plurality of permanent magnets circumferentially distributed about the ironless rotor and arranged to interact with the stator, such that a torque is generated,
wherein the transverse flux electric motor has a machine parameter $\Gamma$ that is greater than or equal to 0.25, $\Gamma$ being defined as:

$$\Gamma = \frac{V_{conductor}}{V_{iron}}.$$

* * * * *